(12) United States Patent
Pan et al.

(10) Patent No.: US 12,267,698 B2
(45) Date of Patent: Apr. 1, 2025

(54) INTERFERENCE CANCELLATION METHOD, APPARATUS, AND SYSTEM

(71) Applicant: Huawei Technologies Co., Ltd., Shenzhen (CN)

(72) Inventors: Dongcheng Pan, Nanjing (CN); Bo Yang, Nanjing (CN); Peng Chen, Nanjing (CN); Yinliang Hu, Nanjing (CN); Fangchao Yuan, Nanjing (CN); Wei Gu, Nanjing (CN); Jia Ke Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 324 days.

(21) Appl. No.: 17/825,512

(22) Filed: May 26, 2022

(65) Prior Publication Data

US 2022/0353704 A1 Nov. 3, 2022

Related U.S. Application Data

(63) Continuation of application No. PCT/CN2020/129843, filed on Nov. 18, 2020.

(30) Foreign Application Priority Data

Nov. 27, 2019 (CN) .......................... 201911184428.5

(51) Int. Cl.
- *H04W 24/02* (2009.01)
- *H04L 25/03* (2006.01)
- *H04W 24/08* (2009.01)

(52) U.S. Cl.
CPC ....... *H04W 24/02* (2013.01); *H04L 25/03006* (2013.01); *H04W 24/08* (2013.01)

(58) Field of Classification Search
CPC .................. H04W 24/02; H04W 24/08; H04L 25/03006; H04L 25/03305;
(Continued)

(56) References Cited

U.S. PATENT DOCUMENTS

| 10,389,414 B1 | 8/2019 | Qi et al. |
| 2008/0310534 A1 | 12/2008 | Egashira et al. |

(Continued)

FOREIGN PATENT DOCUMENTS

| CN | 106027450 A | 10/2016 |
| CN | 108111186 A | 6/2018 |

OTHER PUBLICATIONS

Mahmoud H.A., et al., "IQ Imbalance Correction for OFDMA Uplink Systems", IEEE International Conference on Communications, Jun. 14-18, 2009, 5 pages.

(Continued)

*Primary Examiner* — Ayaz R Sheikh
*Assistant Examiner* — Mang Boi Thawng
(74) *Attorney, Agent, or Firm* — Slater Matsil, LLP

(57) ABSTRACT

In an embodiment an interference cancellation method includes generating, by a first device, a first packet, wherein the first packet comprises a first group of elements, a second group of elements, and user data, the first group of elements being different from the second group of elements and sending, by the first device, the first packet to a second device by using at least one pair of subcarriers, wherein two subcarriers in the at least one pair of subcarriers are symmetrical with respect to a direct current subcarrier, and wherein the first packet is usable by the second device to cancel interference in the user data based on the first group of elements and the second group of elements.

16 Claims, 13 Drawing Sheets

(58) Field of Classification Search
CPC .... H04L 2025/03426; H04L 25/03159; H04B 7/0413
See application file for complete search history.

(56) References Cited

U.S. PATENT DOCUMENTS

| | | |
|---|---|---|
| 2015/0288399 A1 | 10/2015 | Pratt |
| 2016/0142229 A1 | 5/2016 | Bevan et al. |
| 2017/0373812 A1* | 12/2017 | Berggren .............. H04L 5/0053 |
| 2019/0253111 A1* | 8/2019 | Zheng ................. H04B 17/318 |
| 2020/0266865 A1* | 8/2020 | Gao .................... H04B 17/345 |

OTHER PUBLICATIONS

IEEE P802.11ax™/D3.2, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE, Oct. 2018, 698 pages.

Wang, J., et al., "Effect of Channel Estimation Error on the Mutual Information of MIMO Fading Channels," IEEE Oct. 2008, 4 pages.

Yoo T., et al., "Capacity of Fading MIMO Channels with Channel Estimation Error," IEEE Communications Society Jan. 1, 2004, 6 pages.

* cited by examiner

INTERFERENCE CANCELLATION METHOD, APPARATUS, AND SYSTEM

CROSS-REFERENCE TO RELATED APPLICATIONS

This application is a continuation of International Application No. PCT/CN2020/129843, filed on Nov. 18, 2020, which claims priority to Chinese Patent Application No. 201911184428.5, filed on Nov. 27, 2019. The disclosures of the aforementioned applications are hereby incorporated by reference in their entireties.

TECHNICAL FIELD

This application relates to the communications field, and in particular, to an interference cancellation method, apparatus, and system.

BACKGROUND

A zero intermediate frequency (ZIF) architecture has advantages of lowest costs, lowest power consumption, a minimum size, and the like, and is currently a mainstream architecture of radio frequency transmitters and radio frequency receivers of wireless devices. However, in the ZIF architecture, the wireless device generates interference signals on one pair of subcarriers centered on a direct current subcarrier. In this case, when a transmitting device sends data by using the pair of subcarriers, interference signals are generated on the pair of subcarriers in a radio frequency transmitter of the transmitting device. Therefore, the pair of subcarriers sent by the transmitting device includes the interference signals. A radio frequency receiver of a receiving device receives the pair of subcarriers, and interference signals are also generated on the pair of subcarriers in the radio frequency receiver. In this case, data obtained by the receiving device from the pair of subcarriers includes the interference signals generated on a transmitting device side and the interference signals generated on a receiving device side.

Currently, to cancel the interference signals generated on the pair of subcarriers, a hardware circuit configured to cancel an interference signal is disposed in the transmitting device, and a hardware circuit configured to cancel an interference signal is also disposed in the receiving device. When sending the data by using the pair of subcarriers centered on the direct current subcarrier, the transmitting device first uses the hardware circuit included in the transmitting device to cancel the interference signals generated on the pair of subcarriers on the transmitting device side, and then sends the pair of subcarriers. The pair of subcarriers includes data in which the interference signals generated on the transmitting device side are canceled. The receiving device receives the pair of subcarriers, uses the hardware circuit included in the receiving device to cancel the interference signals generated on the pair of subcarriers on the receiving device side, and then obtains, from the pair of subcarriers, the data in which the interference signals are canceled.

In a process of implementing this application, the inventor finds that the conventional technology has at least the following problems:

In the current solution, the hardware circuit configured to cancel an interference signal needs to be disposed in the transmitting device, and the hardware circuit configured to cancel an interference signal needs to be disposed in the receiving device, increasing costs and power consumption of the devices.

SUMMARY

Embodiments of this application provide an interference cancellation method, apparatus, and system, to reduce costs and power consumption of a device.

According to a first aspect, this application provides an interference cancellation method. In the method, a first device generates a first packet. The first packet includes a first group of elements, a second group of elements, and user data, and the first group of elements is different from the second group of elements. The first device sends the first packet to a second device by using at least one pair of subcarriers. Two subcarriers in any pair of subcarriers are symmetrical with respect to a direct current subcarrier, and the first packet is used by the second device to cancel interference in the user data based on the first group of elements and the second group of elements. Because the first packet includes the first group of elements and the second group of elements, after receiving the first packet, the second device performs interference cancellation on the user data in the first packet based on the first group of elements and the second group of elements in the first packet. In addition, the interference cancellation operation may be performed by a processor of the second device. Therefore, hardware circuits configured to cancel interference may not need to be disposed in the first device and the second device, so that costs and power consumption of the devices can be reduced. Because the interference in the user data can be canceled, accuracy of receiving the user data by the second device can be further improved.

In a possible implementation, there are a plurality of second devices. A joint interference cancellation coefficient of the at least one pair of subcarriers is obtained. For any one of the plurality of second devices, spatial mapping is performed, based on the joint interference cancellation coefficient, on a first group of elements, a second group of elements, and user data that are to be sent to the any second device. A first packet to be sent to the any second device is generated. The first packet includes the first group of elements, the second group of elements, and the user data that are obtained after the spatial mapping. When there are a plurality of second devices, spatial mapping is performed on the first group of elements, the second group of elements, and the user data by using the joint interference cancellation coefficient, so that after receiving the first packet, the second device can successfully cancel image interference signals on two subcarriers in one pair of subcarriers.

In another possible implementation, a spatial mapping matrix is obtained based on the joint interference cancellation coefficient, and spatial mapping is performed, based on the spatial mapping matrix, on the first group of elements, the second group of elements, and the user data that are to be sent to the any second device. Spatial mapping is performed on the first group of elements, the second group of elements, and the user data by using the spatial mapping matrix, so that after receiving the first packet, the second device can successfully cancel image interference signals on two subcarriers in one pair of subcarriers.

In another possible implementation, the joint interference cancellation coefficient includes an interference cancellation coefficient between the first device and each second device. A second packet is generated. The second packet includes a third group of elements and a fourth group of elements, and the third group of elements is different from the fourth group of elements. The second packet is sent to each second device by using the at least one pair of subcarriers. The second packet is used to indicate each second device to obtain an interference cancellation coefficient between the second device and the first device based on the third group of elements and the fourth group of elements. The interference cancellation coefficient that is sent by each second device and that is between the second device and the first device is received. In this way, interference cancellation coefficients that are sent by the second devices and that are between the second devices and the first device can be combined into the joint interference cancellation coefficient.

In another possible implementation, a joint channel between the first device and the plurality of second devices is measured. The joint interference cancellation coefficient of the at least one pair of subcarriers is obtained based on the joint channel. In this way, the joint interference cancellation coefficient can be obtained.

In another possible implementation, for any one of the plurality of second devices, a third packet sent by the any second device is received by using the at least one pair of subcarriers. The third packet includes a third group of elements and a fourth group of elements. The joint channel between the first device and the plurality of second devices is determined based on the third group of elements and the fourth group of elements that are included in the third packet sent by each of the plurality of second devices. In this way, the joint channel on which interference is canceled can be measured by using the third group of elements and the fourth group of elements.

In another possible implementation, the first device is a network side device, and the second device is a terminal device; or the first device is a terminal device, and the second device is a network side device.

In another possible implementation, the network side device is an access point or a base station.

In another possible implementation, for a first subcarrier and a second subcarrier that are included in any one of the at least one pair of subcarriers, a matrix including at least one element that is in the first group of elements and that corresponds to the first subcarrier, at least one element that is in the first group of elements and that corresponds to the second subcarrier, at least one element that is in the second group of elements and that corresponds to the first subcarrier, and at least one element that is in the second group of elements and that corresponds to the second subcarrier has an inverse matrix.

In another possible implementation, the at least one element that is in the first group of elements and that corresponds to the first subcarrier is the same as or different from the at least one element that is in the second group of elements and that corresponds to the first subcarrier, and the at least one element that is in the first group of elements and that corresponds to the second subcarrier is different from the at least one element that is in the second group of elements and that corresponds to the second subcarrier.

In another possible implementation, a symbol of the at least one element that is in the first group of elements and that corresponds to the first subcarrier is opposite to a symbol of the at least one element that is in the second group of elements and that corresponds to the first subcarrier; and/or a symbol of the at least one element that is in the first group of elements and that corresponds to the second subcarrier is opposite to a symbol of the at least one element that is in the second group of elements and that corresponds to the second subcarrier.

According to a second aspect, this application provides an interference cancellation method. In the method, a second device receives, by using at least one pair of subcarriers, a first packet sent by a first device. The first packet includes a first group of elements, a second group of elements, and user data, and two subcarriers in one pair of subcarriers are symmetrical with respect to a direct current subcarrier. The second device performs interference cancellation on the user data based on the first group of elements and the second group of elements. Because the first packet includes the first group of elements and the second group of elements, after receiving the first packet, the second device performs interference cancellation on the user data in the first packet based on the first group of elements and the second group of elements in the first packet. In addition, the interference cancellation operation may be performed by a processor of the second device. Therefore, a hardware circuit configured to cancel interference may not need to be disposed in the second device, so that costs and power consumption of the device can be reduced. Because the interference in the user data can be canceled, accuracy of receiving the user data can be further improved.

In a possible implementation, a second packet sent by the first device is received by using the at least one pair of subcarriers. The second packet includes a third group of elements and a fourth group of elements. An interference cancellation coefficient between the second device and the first device is determined based on the third group of elements and the fourth group of elements. The interference cancellation coefficient is sent to the first device. In this way, the first device can obtain a joint interference cancellation coefficient.

In another possible implementation, a third packet is sent to the first device by using the at least one pair of subcarriers. The third packet includes a third group of elements and a fourth group of elements, and the third group of elements is different from the fourth group of elements.

In another possible implementation, the first device is a network side device, and the second device is a terminal device; or the first device is a terminal device, and the second device is a network side device.

In another possible implementation, the network side device is an access point or a base station.

In another possible implementation, for any one of the at least one pair of subcarriers, the first group of elements includes an element corresponding to each subcarrier in the any pair of subcarriers, and the second group of elements includes an element corresponding to each subcarrier in the any pair of subcarriers.

In another possible implementation, the first group of elements is an LTF, and the second group of elements is an LTF.

According to a third aspect, this application provides an interference cancellation method. In the method, a first device generates a packet. The packet includes a first group of elements and a second group of elements of at least one pair of subcarriers, two subcarriers in one pair of subcarriers are symmetrical with respect to a direct current subcarrier, an element that is in the first group of elements and that corresponds to one subcarrier in the pair of subcarriers is the same as an element that is in the second group of elements and that corresponds to the subcarrier, and a symbol of an element that is in the first group of elements and that corresponds to the other subcarrier in the pair of subcarriers is opposite to a symbol of an element that is in the second group of elements and that corresponds to the other subcarrier. The first device sends the packet to a second device by using the at least one pair of subcarriers. The packet is used to indicate the second device to calculate channels on which interference is canceled on the at least one pair of subcarriers. Because an element that is in the first group of elements and that corresponds to one subcarrier in one pair of subcarriers is the same as an element that is in the second group of elements and that corresponds to the subcarrier, and a symbol of an element that is in the first group of elements and that corresponds to the other subcarrier in the pair of subcarriers is opposite to a symbol of an element that is in the second group of elements and that corresponds to the other subcarrier, the channels on which interference is canceled on the at least one pair of subcarriers may be calculated by using the first group of elements and the second group of elements, and the calculation process may be implemented by using a computing resource such as a processor of the device. Therefore, no hardware circuit needs to be separately disposed in the device to cancel interference on a channel, so that costs and power consumption of the device are reduced. Because interference can be canceled, accuracy of calculating the channel by the second device can be further improved.

According to a fourth aspect, this application provides an interference cancellation method. In the method, a second device receives a packet by using at least one pair of subcarriers. The packet includes a first group of elements and a second group of elements, and two subcarriers in one pair of subcarriers are symmetrical with respect to a direct current subcarrier. The second device calculates, based on the first group of elements and the second group of elements, channels on which interference is canceled on the at least one pair of subcarriers. The second device may calculate, by using the first group of elements and the second group of elements, the channels on which interference is canceled on the at least one pair of subcarriers, and the calculation process may be implemented by using a computing resource such as a processor of the second device. Therefore, no hardware circuit needs to be separately disposed in the second device to cancel interference on a channel, so that costs and power consumption of the second device are reduced. Because interference can be canceled, accuracy of calculating the channel can be further improved.

In a possible implementation, for any one of the at least one pair of subcarriers, a channel $H_k$ on which interference is canceled on a first subcarrier included in the any pair of subcarriers and a channel $H_{-k}$ on which interference is canceled on a second subcarrier included in the any pair of subcarriers are calculated according to the following formula:

$$\begin{cases} H_k = (R_{k(LTF1)} + R_{k(LTF2)})/(2S_k) \\ H_{-k} = (R_{-k(LTF1)} - R_{-k(LTF2)})/(2S_{-k}) \end{cases}$$

k represents the first subcarrier, −k represents the second subcarrier, $S_k$ represents a locally prestored element corresponding to the first subcarrier, $S_{-k}$ represents a locally prestored element corresponding to the second subcarrier, $R_{k(LTF1)}$ represents an element that is in the first group of elements and that corresponds to the first subcarrier, $R_{k(LTF2)}$ represents an element that is in the second group of elements and that corresponds to the first subcarrier, $R_{-k(LTF1)}$ represents an element that is in the first group of elements and that corresponds to the second subcarrier, and $R_{-k(LTF2)}$ represents an element that is in the second group of elements and that corresponds to the second subcarrier. In this way, the channel on which interference is canceled on the first subcarrier and the channel on which interference is canceled on the second subcarrier can be calculated according to the foregoing first formula.

In another possible implementation, the second device receives, by using the at least one pair of subcarriers, a first packet sent by a first device and a second packet sent by a third device. The first packet includes one half of the first group of elements and one half of the second group of elements, the second packet includes the other half of the first group of elements and the other half of the second group of elements, the first device occupies one subcarrier in each pair of subcarriers, and the third device occupies the other subcarrier in each pair of subcarriers.

In another possible implementation, subcarriers that are symmetrical with respect to the direct current subcarrier are allocated to the first device and the third device.

According to a fifth aspect, this application provides an interference cancellation apparatus, configured to perform the method in any one of the first aspect and the possible implementations of the first aspect. Specifically, the apparatus includes units configured to perform the method in any one of the first aspect and the possible implementations of the first aspect.

According to a sixth aspect, this application provides an interference cancellation apparatus, configured to perform the method in any one of the second aspect and the possible implementations of the second aspect. Specifically, the apparatus includes units configured to perform the method in any one of the second aspect and the possible implementations of the second aspect.

According to a seventh aspect, this application provides an interference cancellation apparatus, configured to perform the method in the third aspect. Specifically, the apparatus includes units configured to perform the method in the third aspect.

According to an eighth aspect, this application provides an interference cancellation apparatus, configured to perform the method in any one of the fourth aspect and the possible implementations of the fourth aspect. Specifically, the apparatus includes units configured to perform the method in any one of the fourth aspect and the possible implementations of the fourth aspect.

According to a ninth aspect, an embodiment of this application provides an interference cancellation apparatus. The apparatus includes a processor, a memory, and a transceiver. The processor, the memory, and the transceiver may be connected by using a bus system. The memory is configured to store one or more programs, and the processor is configured to execute the one or more programs in the memory to complete the method in any one of the first aspect and the possible implementations of the first aspect.

According to a tenth aspect, an embodiment of this application provides an interference cancellation apparatus. The apparatus includes a processor, a memory, and a transceiver. The processor, the memory, and the transceiver may be connected by using a bus system. The memory is configured to store one or more programs, and the processor is configured to execute the one or more programs in the memory to complete the method in any one of the second aspect and the possible implementations of the second aspect.

According to an eleventh aspect, an embodiment of this application provides an interference cancellation apparatus. The apparatus includes a processor, a memory, and a transceiver. The processor, the memory, and the transceiver may be connected by using a bus system. The memory is configured to store one or more programs, and the processor is configured to execute the one or more programs in the memory to complete the method in the third aspect.

According to a twelfth aspect, an embodiment of this application provides an interference cancellation apparatus. The apparatus includes a processor, a memory, and a transceiver. The processor, the memory, and the transceiver may be connected by using a bus system. The memory is configured to store one or more programs, and the processor is configured to execute the one or more programs in the memory to complete the method in any one of the fourth aspect and the possible implementations of the fourth aspect.

According to a thirteenth aspect, this application provides a computer-readable storage medium. The computer-readable storage medium stores program code, and when the program code runs on a device, the device performs the method in any one of the first aspect, the second aspect, the third aspect, the fourth aspect, the possible implementations of the first aspect, the possible implementations of the second aspect, and the possible implementations of the fourth aspect.

According to a fourteenth aspect, this application provides a computer program product including program code. When the computer program product runs on a device, the device performs the method in any one of the first aspect, the second aspect, the third aspect, the fourth aspect, the possible implementations of the first aspect, the possible implementations of the second aspect, and the possible implementations of the fourth aspect.

According to a fifteenth aspect, this application provides an interference cancellation system. The system includes the apparatus according to the fifth aspect and the apparatus according to the sixth aspect, or the system includes the apparatus according to the seventh aspect and the apparatus according to the eighth aspect, or the system includes the apparatus according to the ninth aspect and the apparatus according to the tenth aspect, or the system includes the apparatus according to the eleventh aspect and the apparatus according to the twelfth aspect.

BRIEF DESCRIPTION OF THE DRAWINGS

FIG. 17 is a schematic diagram of a structure of a user information field according to an embodiment of this application;

DETAILED DESCRIPTION OF ILLUSTRATIVE EMBODIMENTS

Figure 1:
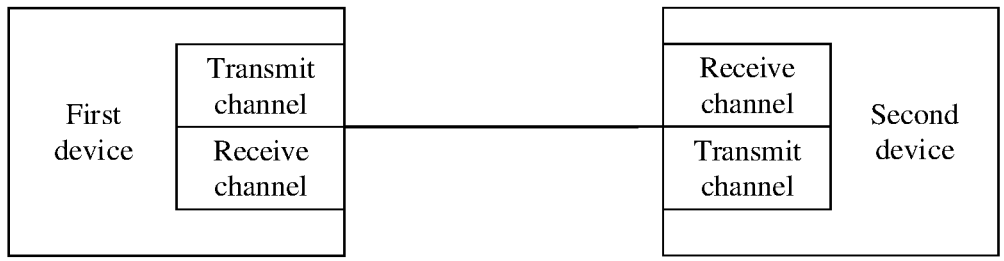
FIG. 1 is a schematic diagram of a system architecture according to an embodiment of this application.

The following further describes in detail implementations of this application with reference to accompanying drawings.

The following lists meanings of some important concepts in embodiments of this application.

For a direct current subcarrier, the direct current subcarrier is a subcarrier located in the middle of a frequency band, and the frequency band may be a frequency band such as 20 MHz, 40 MHz, 80 MHz, or 160 MHz.

For at least one pair of subcarriers, the frequency band includes the at least one pair of subcarriers, any one of the at least one pair of subcarriers includes a first subcarrier and a second subcarrier, and the first subcarrier and the second subcarrier are symmetrical with respect to the direct current subcarrier.

For a first group of elements, the first group of elements includes at least one element corresponding to the first subcarrier and at least one element corresponding to the second subcarrier in the any pair of subcarriers.

For a second group of elements, the second group of elements includes at least one element corresponding to the first subcarrier and at least one element corresponding to the second subcarrier in the any pair of subcarriers.

An element is a value or a complex number. For example, the element may be a value 1, −1, 0, 2, or −2, or the element may be a complex number i+j or −i−j. The element may also be referred to as an element of sequence.

The first group of elements is different from the second group of elements. For a first subcarrier and a second subcarrier that are included in any pair of subcarriers, a matrix including at least one element that is in the first group of elements and that corresponds to the first subcarrier, at least one element that is in the first group of elements and that corresponds to the second subcarrier, at least one element that is in the second group of elements and that corresponds to the first subcarrier, and at least one element that is in the second group of elements and that corresponds to the second subcarrier has an inverse matrix.

The at least one element that is in the first group of elements and that corresponds to the first subcarrier may be the same as or different from the at least one element that is in the second group of elements and that corresponds to the first subcarrier. The at least one element that is in the first group of elements and that corresponds to the second subcarrier is different from the at least one element that is in the second group of elements and that corresponds to the second subcarrier.

Optionally, all of the at least one element that is in the first group of elements and that corresponds to the first subcarrier may be the same or different. All of the at least one element that is in the second group of elements and that corresponds to the first subcarrier may be the same or different. All of the at least one element that is in the first group of elements and that corresponds to the second subcarrier may be the same or different. All of the at least one element that is in the second group of elements and that corresponds to the second subcarrier may be the same or different.

Optionally, a symbol of the at least one element that is in the first group of elements and that corresponds to the first subcarrier is opposite to a symbol of the at least one element that is in the second group of elements and that corresponds to the first subcarrier; and/or a symbol of the at least one element that is in the first group of elements and that corresponds to the second subcarrier is opposite to a symbol of the at least one element that is in the second group of elements and that corresponds to the second subcarrier.

Optionally, the at least one element that is in the first group of elements and that corresponds to the first subcarrier and the at least one element that is in the second group of elements and that corresponds to the first subcarrier are opposite numbers; and/or the at least one element that is in the first group of elements and that corresponds to the second subcarrier and the at least one element that is in the second group of elements and that corresponds to the second subcarrier are opposite numbers.

Referring to FIG. 1, an embodiment of this application provides a network architecture. The network architecture includes a first device and a second device.

The first device may send a packet to the second device by using at least one pair of subcarriers, and the second device may receive, by using the at least one pair of subcarriers, the packet sent by the first device.

Two subcarriers included in any one of the at least one pair of subcarriers are symmetrical with respect to a direct current subcarrier.

The first device includes one or more transmit channels and one or more receive channels. The second device includes one or more transmit channels and one or more receive channels. The transmit channel may include a transmitter circuit, and the receive channel may include a receiver circuit.

Optionally, the first device may be a network side device, and the second device may be a terminal device; or the first device may be a terminal device, and the second device may be a network side device.

Optionally, the network side device may be an access point (AP), a base station, or the like. The terminal device may be a station (STA) or the like.

The network architecture may be applied to a multiple-input multiple-output (MIMO) scenario or a non-MIMO scenario.

In the case of application to the non-MIMO scenario, referring to the network architecture shown in FIG. 1, the network architecture may include one first device and one second device, and both the first device and the second device work in an orthogonal frequency division multiplexing (OFDM) mode. The first device occupies the at least one pair of subcarriers, and the second device also occupies the at least one pair of subcarriers. The first device sends, on one transmit channel included in the first device, a packet to the second device by using the at least one pair of subcarriers, and the second device receives, on one receive channel included in the second device, the packet by using the at least one pair of subcarriers.

Figure 2:
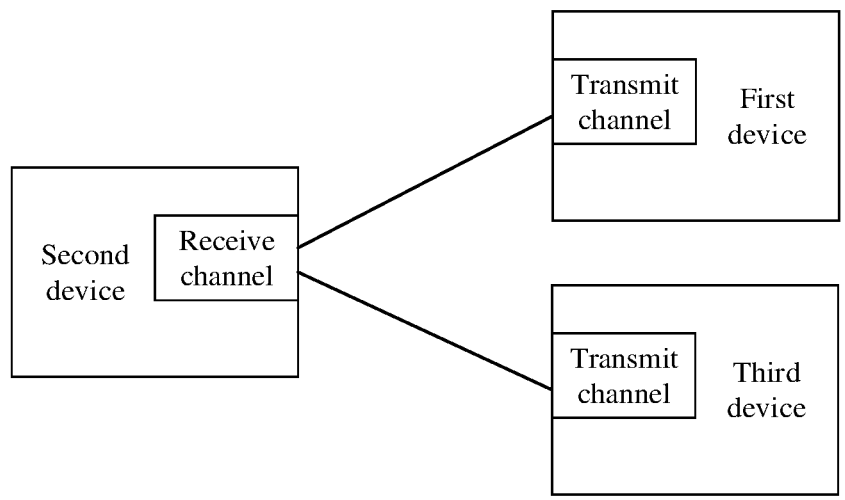
FIG. 2 is a schematic diagram of another system architecture according to an embodiment of this application.

Alternatively, referring to a network architecture shown in FIG. 2, the network architecture includes one second device, at least one first device, and at least one third device. The second device, the at least one first device, and the at least one third device all work in an OFDMA mode. The second device allocates, to the at least one first device and the at least one third device, subcarriers that are symmetrical with respect to the direct current subcarrier. In other words, for two subcarriers, which are referred to as a first subcarrier and a second subcarrier for ease of description, included in any one of the at least one pair of subcarriers, the at least one first device occupies the first subcarrier in the any pair of subcarriers, and the at least one third device occupies the second subcarrier in the any pair of subcarriers. In this case, each first device may send, on a transmit channel included in the first device, a packet to the second device by using a first subcarrier in each pair of subcarriers, and each third device may send, on a transmit channel included in the third device, a packet to the second device by using a second subcarrier in each pair of subcarriers. The second device receives, on one receive channel included in the second device and by using the at least one pair of subcarriers, the packet sent by each first device and the packet sent by each third device.

Figure 3:
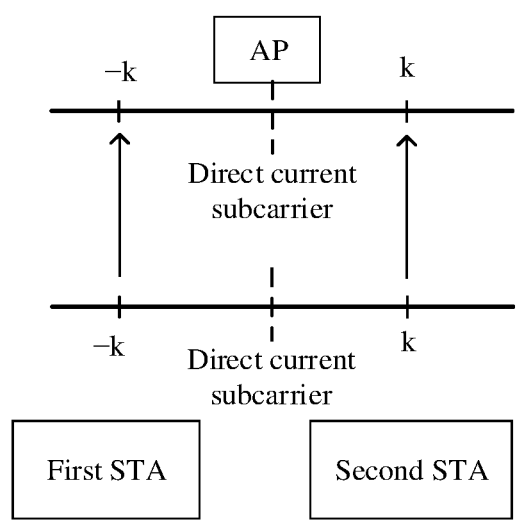
FIG. 3 is a schematic diagram of another system architecture according to an embodiment of this application.

For example, referring to FIG. 3, assuming that the second device is an AP, and both the first device and the third device are STAs, a network architecture shown in FIG. 3 includes one AP, a first STA, and a second STA. In FIG. 3, k represents a first subcarrier, and −k represents a second subcarrier, and the first subcarrier and the second subcarrier are a pair of subcarriers that are symmetrical with respect to the direct current subcarrier. The AP may allocate the first subcarrier k to the second STA and allocate the second subcarrier −k to the first STA.

In the case of application to the MIMO scenario, the scenario includes a single-user multiple-input multiple-output (SU-MIMO) network architecture and a multi-user multiple-input multiple-output (MU-MIMO) network architecture.

Figure 4:
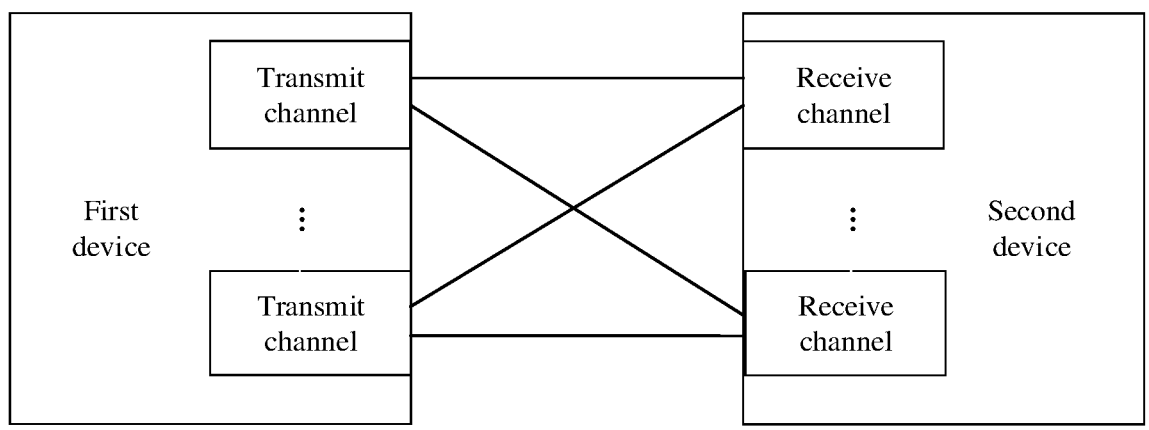
FIG. 4 is a schematic diagram of another system architecture according to an embodiment of this application.

Referring to FIG. 4, the network architecture may be an SU-MIMO network architecture. The SU-MIMO network architecture may include one first device and one second device. The first device includes a plurality of transmit channels, and the second device includes a plurality of receive channels. The first device may send, on each transmit channel included in the first device, a packet to the second device by using the at least one pair of subcarriers. The second device may receive, on each receive channel included in the second device, the packet by using the at least one pair of subcarriers.

Figure 5:
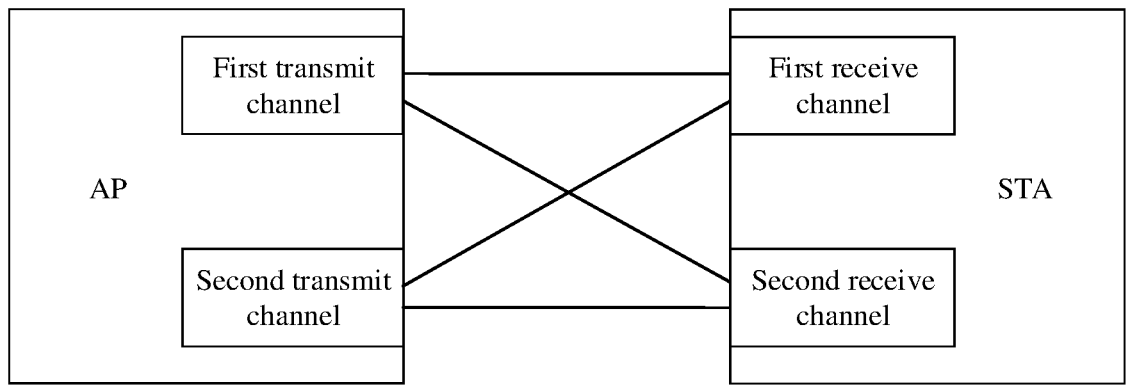
FIG. 5 is a schematic diagram of another system architecture according to an embodiment of this application.

For example, referring to FIG. 5, the first device is an AP, and the second device is a STA. The network architecture shown in FIG. 5 includes one AP and one STA. In this example, the AP includes a first transmit channel and a second transmit channel, and the STA includes a first receive channel and a second receive channel. The AP generates two first packets, and sends the two first packets to the STA on the first transmit channel and the second transmit channel by using the at least one pair of subcarriers. The STA receives the two first packets on the first receive channel and the second receive channel by using the at least one pair of subcarriers.

Figure 6:
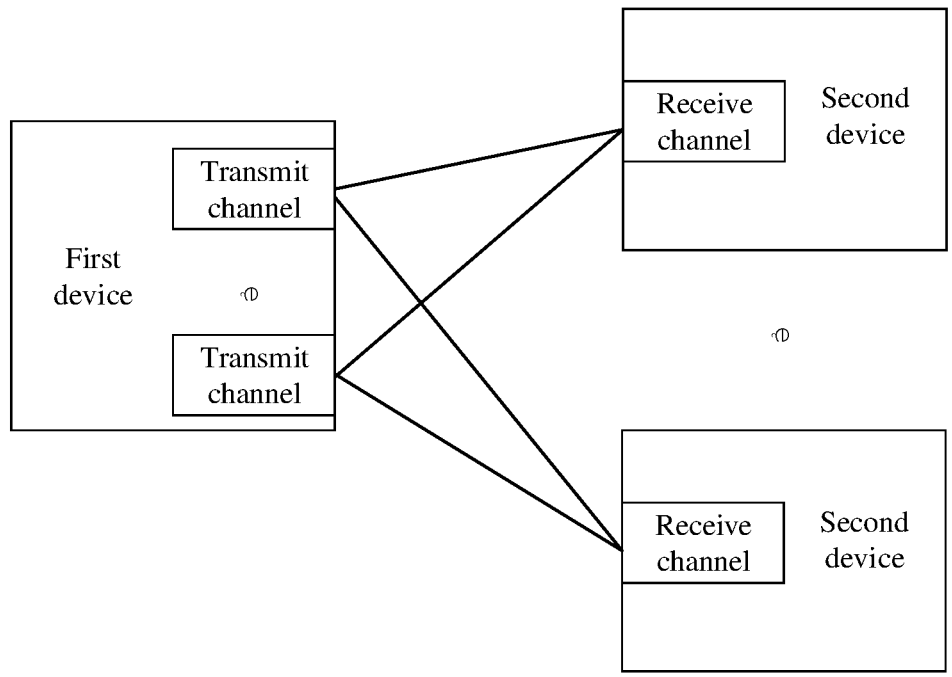
FIG. 6 is a schematic diagram of another system architecture according to an embodiment of this application.

Referring to FIG. 6, the network architecture may be a MU-MIMO network architecture. The MU-MIMO network architecture may include one first device and a plurality of second devices. The first device includes a plurality of transmit channels, and the second device includes one or more receive channels. A quantity of transmit channels included in the first device is greater than or equal to a total quantity of transmit channels included in the plurality of second devices. For any second device, the first device generates a first packet to be sent to the any second device, and the first device sends, on each transmit channel included in the first device, the first packet to the any second device by using the at least one pair of subcarriers. The any second device receives, on each receive channel included in the any second device and by using the at least one pair of subcarriers, the first packet sent to the any second device.

Figure 7:
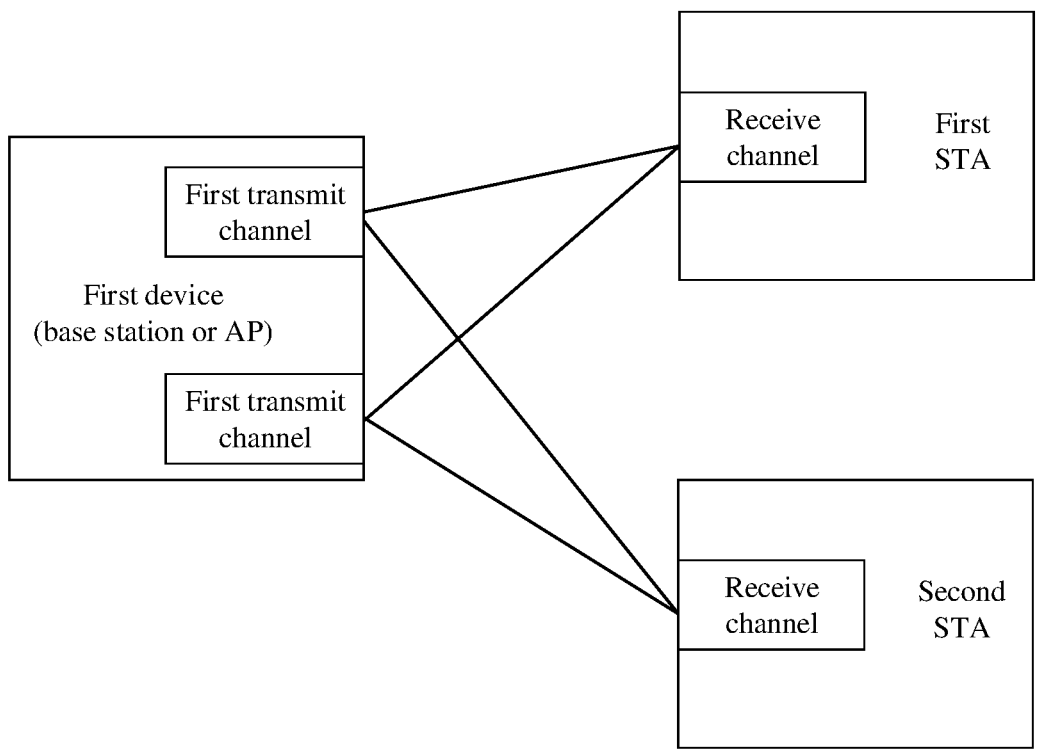
FIG. 7 is a schematic diagram of another system architecture according to an embodiment of this application.

For example, referring to FIG. 7, the first device is a base station or an AP, and the second device is a STA. The network architecture shown in FIG. 7 includes a first device, a first STA, and a second STA. In this example, the first device includes a first transmit channel and a second transmit channel, the first STA includes one receive channel, and the second STA includes one receive channel. The first device generates a first packet P1 to be sent to the first STA and a first packet P2 to be sent to the second STA, sends the first packet P1 to the first STA on the first transmit channel and the second transmit channel by using the at least one pair of subcarriers, and sends the first packet P2 to the second STA on the first transmit channel and the second transmit channel by using the at least one pair of subcarriers. The first STA receives, on the receive channel included in the first STA, the first packet P1 by using the at least one pair of subcarriers, and the second STA receives, on the receive channel included in the second STA, the first packet P2 by using the at least one pair of subcarriers.

Figure 8:
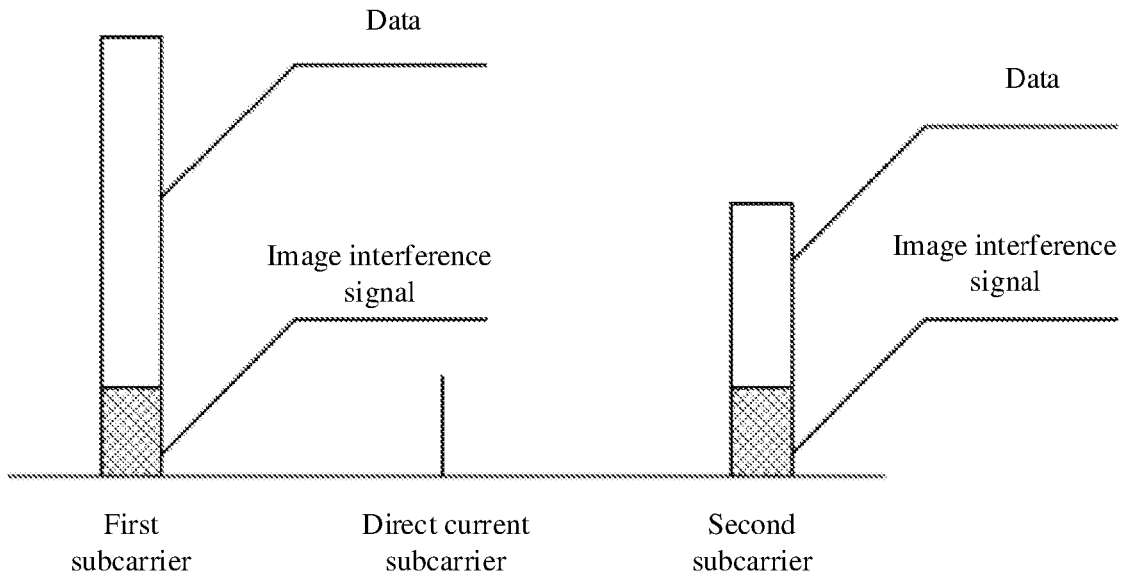
FIG. 8 is a schematic diagram of generating image interference between a first subcarrier and a second subcarrier according to an embodiment of this application.

Referring to FIG. 8, for a first subcarrier and a second subcarrier that are included in any one of the at least one pair of subcarriers, because the first subcarrier and the second subcarrier are symmetrical with respect to the direct current subcarrier, when packets are sent on any transmit channel of the first device by using the first subcarrier and the second subcarrier, a first image interference signal is generated between the first subcarrier and the second subcarrier. When the first subcarrier and the second subcarrier are received on any receive channel of the second device, a second image interference signal is generated between the first subcarrier and the second subcarrier. In addition, after the first device sends data, a spatial interference signal is also generated on the first subcarrier and the second subcarrier by wireless transmission space between the first device and the second device.

In this case, interference signals exist in a packet that is sent by the first device and that is received by the second device by using the at least one pair of subcarriers, and the interference signals may include three parts: a first image interference signal generated between a first subcarrier and a second subcarrier that are included in each pair of subcarriers on the transmit channel of the first device, a spatial interference signal generated in the packet by the wireless transmission space between the first device and the second device, and a second image interference signal generated between the first subcarrier and the second subcarrier that are included in each pair of subcarriers on the receive channel of the second device.

In this application, the interference signal in the packet received by the second device can be canceled by using any one of the following embodiments. For a detailed implementation process, refer to any one of the following embodiments. Details are not described herein.

Figure 9:
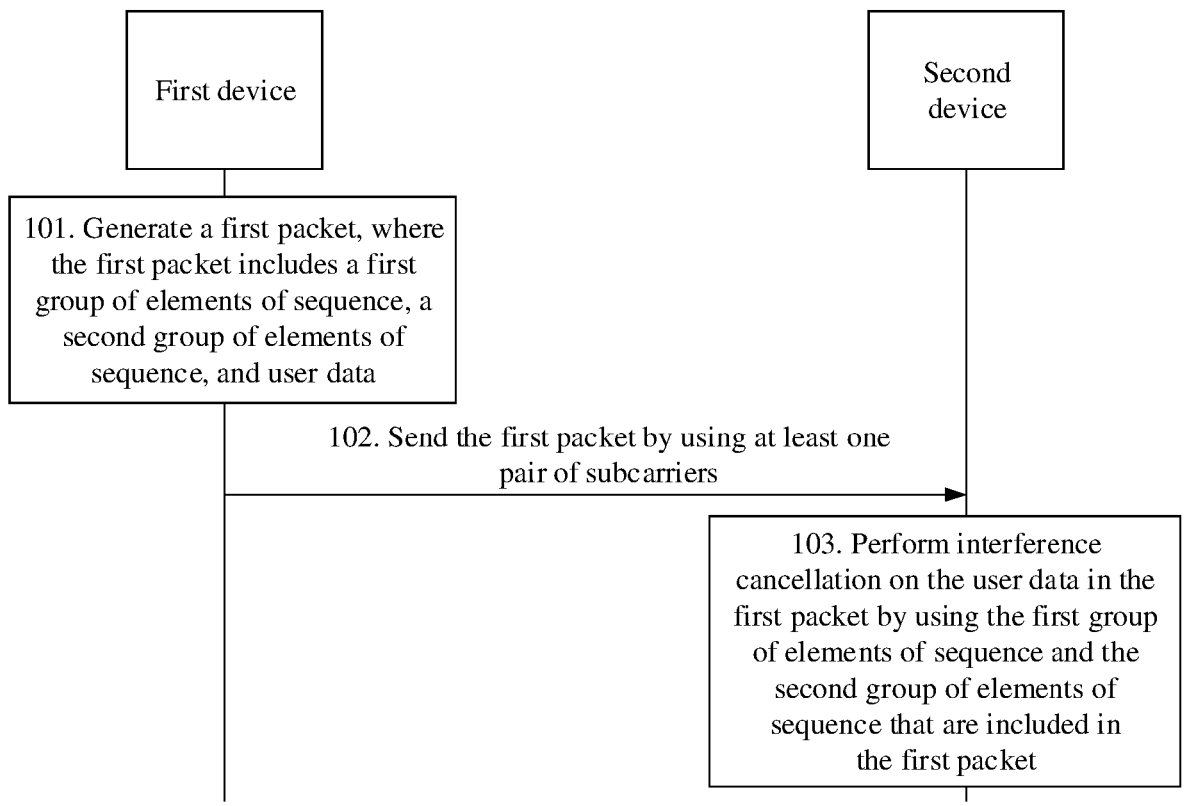
FIG. 9 is a flowchart of an interference cancellation method according to an embodiment of this application.

Referring to FIG. 9, an embodiment of this application provides an interference cancellation method. The method is applicable to the SU-MIMO or MU-MIMO network architectures shown in FIG. 4 to FIG. 7. The method procedure includes the following steps.

Step 101: A first device generates a first packet, where the first packet includes a first group of elements, a second group of elements, and user data, and the first group of elements is different from the second group of elements.

The first group of elements includes an element corresponding to each subcarrier in at least one pair of subcarriers, and the second group of elements includes an element corresponding to each subcarrier in the at least one pair of subcarriers. The user data includes user data corresponding to each subcarrier.

The first group of elements may include one or more long training fields (LTF), and the second group of elements may also include one or more LTFs. Any LTF includes an element corresponding to each subcarrier.

In this step, the first device obtains the first group of elements, and generates the second group of elements based on the first group of elements.

Optionally, an operation of generating the second group of elements may be as follows: Any one of the at least pair of subcarriers includes a first subcarrier and a second subcarrier. An element that is included in the first group of elements and that corresponds to the first subcarrier is copied to obtain an element that is in the second group of elements and that corresponds to the first subcarrier. An opposite number of an element that is included in the first group of elements and that corresponds to the second subcarrier is obtained, and the opposite number of the element corresponding to the second subcarrier is used as an element that is in the second group of elements and that corresponds to the second subcarrier. In this way, the second group of elements is generated based on the first group of elements.

Optionally, in the case of application to the SU-MIMO network architecture, one first device communicates with one second device in the network architecture. The first device may include N transmit channels, the second device includes N receive channels, and N is an integer greater than or equal to 1. The first device generates a first packet corresponding to each transmit channel, and each first packet includes a first group of elements, a second group of elements, and user data. For a first subcarrier and a second subcarrier that are included in any pair of subcarriers, the first group of elements includes N elements corresponding to the first subcarrier and N elements corresponding to the second subcarrier, and the second group of elements includes N elements corresponding to the first subcarrier and N elements corresponding to the second subcarrier. Optionally, a detailed implementation process in which the first device generates the first packet is described in detail in the following embodiment shown in FIG. 10.

Optionally, all first packets include different user data, all the first packets include a same first group of elements or different first groups of elements, and all the first packets include a same second group of elements or different second group of elements.

Optionally, in the case of application to the MU-MIMO network architecture, one first device communicates with a plurality of second devices in the network architecture. The first device generates a first packet corresponding to each second device, and a first packet corresponding to any second device includes a first group of elements, a second group of elements, and user data that are to be sent to the any second device. First packets corresponding to the second devices include a same first group of elements or different first groups of elements, and the first packets corresponding to the second devices include a same second group of elements or different second groups of elements.

Optionally, for a first subcarrier and a second subcarrier that are included in any pair of subcarriers, the first group of elements includes at least one element corresponding to the first subcarrier and at least one element corresponding to the second subcarrier, and the second group of elements includes at least one element corresponding to the first subcarrier and at least one element corresponding to the second subcarrier. In the first group of elements, a quantity of elements corresponding to the first subcarrier is equal to a quantity of receive channels included in the second device, and a quantity of elements corresponding to the second subcarrier is equal to the quantity of receive channels included in the second device. In the second group of elements, a quantity of elements corresponding to the first subcarrier is equal to the quantity of receive channels included in the second device, and a quantity of elements corresponding to the second subcarrier is equal to the quantity of receive channels included in the second device.

In the case of application to the MU-MIMO network architecture, interference may be different on channels between the second devices and the first device. Before generating the first packet, the first device needs to obtain a joint interference cancellation coefficient of the at least one pair of subcarriers. The joint interference cancellation coefficient is used to reflect the interference on the channels between the plurality of second devices and the first device.

Therefore, in this step, for any one of the plurality of second devices, the first device performs, based on the obtained joint interference cancellation coefficient, spatial mapping on a first group of elements, a second group of elements, and user data that are to be sent to the any second device, and generates a first packet to be sent to the any second device. The first packet includes the first group of elements, the second group of elements, and the user data that are obtained after the spatial mapping. Optionally, a detailed implementation process in which the first device generates the first packet is described in detail in the following embodiment shown in FIG. 11 or FIG. 12.

Optionally, the first packet may be a physical layer protocol data unit (PPDU) packet.

The joint interference cancellation coefficient may be obtained in the following two manners, and the two manners are as follows:

In a first manner, the first device generates a second packet, where the second packet includes a third group of elements and a fourth group of elements, and the third group of elements is different from the fourth group of elements, and sends the second packet to each second device by using the at least one pair of subcarriers. Any second device receives the second packet by using the at least one pair of subcarriers, determines an interference cancellation coefficient between the second device and the first device based on the third group of elements and the fourth group of elements, and sends the interference cancellation coefficient to the first device. The first device receives an interference cancellation coefficient sent by each second device, and combines interference cancellation coefficients of the second devices into the joint interference cancellation coefficient of the at least one pair of subcarriers. Optionally, a detailed implementation process of the first manner is described in detail in the following embodiment shown in FIG. 11.

Optionally, for a first subcarrier and a second subcarrier that are included in any pair of subcarriers, the third group of elements includes M elements corresponding to the first subcarrier and M elements corresponding to the second subcarrier, the fourth group of elements includes M elements corresponding to the first subcarrier and M elements corresponding to the second subcarrier, M is a total quantity of receive channels included in the second devices, and M is an integer greater than 1.

Optionally, the first device includes M transmit channels, and each second device includes at least one receive channel. The first device sends, on each transmit channel included in the first device, the second packet to each second device by using the at least one pair of subcarriers. Each second device receives, on the receive channel included in the second device, the second packet by using the at least one pair of subcarriers.

Because mutual image interference exists between a first subcarrier and a second subcarrier that are included in any pair of subcarriers on the transmit channel of the first device, spatial interference is generated on the first subcarrier and the second subcarrier by wireless transmission space between the first device and the second device, and mutual image interference exists between the first subcarrier and the second subcarrier on the receive channel of the second device, after the first device sends the second packet to the second device by using the at least one pair of subcarriers, the second device receives the second packet by using the at least one pair of subcarriers, and interference exists in a third group of elements and a fourth group of elements in the received second packet. Consequently, the third group of elements and the fourth group of elements that are included in the received second packet are respectively different from the third group of elements and the fourth group of elements that are included in the second packet sent by the first device.

In the second manner, any one of the plurality of second devices sends a third packet to the first device by using the at least one pair of subcarriers. The third packet includes a third group of elements and a fourth group of elements. The first device receives, by using the at least one pair of subcarriers, the third packet sent by the any second device. In this way, the first device can receive third packets sent by the second devices, then determine a joint channel between the first device and the plurality of second devices based on the third group of elements and the fourth group of elements that are included in the third packet sent by each second device, and determine the joint interference cancellation coefficient of the at least one pair of subcarriers based on the joint channel. Optionally, a detailed implementation process of the second manner is described in detail in the following embodiment shown in FIG. 12.

The any second device includes at least one transmit channel, and the first device includes at least one receive channel. The any second device sends the third packet to the first device on the transmit channel included in the any second device, and the first device receives the third packet on the receive channel included in the first device.

Because mutual image interference exists between a first subcarrier and a second subcarrier that are included in any pair of subcarriers on the transmit channel of the second device, spatial interference is generated on the first subcarrier and the second subcarrier by wireless transmission space between the first device and the second device, and mutual image interference exists between the first subcarrier and the second subcarrier on the receive channel of the first device, after the any second device sends the third packet by using the at least one pair of subcarriers, interference exists in a third group of elements and a fourth group of elements that are included in the third packet received by the first device by using the at least one pair of subcarriers. Consequently, the third group of elements and the fourth group of elements that are included in the received third packet are respectively different from the third group of elements and the fourth group of elements that are included in the third packet sent by the second device.

Optionally, the third group of elements includes M third elements corresponding to each subcarrier in the at least one pair of subcarriers, and the fourth group of elements includes M fourth elements corresponding to each subcarrier.

Step 102: The first device sends the first packet to the second device by using the at least one pair of subcarriers.

Optionally, in the case of application to the SU-MIMO network architecture, the first device sends, to the second device on any transmit channel included in the first device and by using the at least one pair of subcarriers, a first packet corresponding to the any transmit channel.

Optionally, in the case of application to the MU-MIMO network architecture, the first device sends, on each transmit channel included in the first device, the first packet corresponding to each second device.

Step 103: The second device receives the first packet by using the at least one pair of subcarriers, and performs interference cancellation on the user data in the first packet based on the first group of elements and the second group of elements that are included in the first packet.

Optionally, in the case of application to the SU-MIMO network architecture, the network architecture includes one first device and one second device, and the second device receives, on each receive channel included in the second device and by using the at least one pair of subcarriers, a first packet sent by the first device.

Because first packets sent by the first device on transmit channels of the first device are different, the second device receives at least one first packet. Each received first packet includes a first group of elements, a second group of elements, and user data in which interference exists. The second device locally prestores a first group of elements and a second group of elements that are included in each first packet generated by the first device, and the second device performs, based on the locally prestored first group of elements and second group of elements that are included in each first packet generated by the first device and the first group of elements and the second group of elements in which interference exists and that are included in each received first packet, interference cancellation on the user data included in each received first packet. Optionally, a detailed implementation process in which the second device performs interference cancellation in the SU-MIMO network architecture is described in detail in the following embodiment shown in FIG. 10.

Optionally, in the case of application to the MU-MIMO network architecture, the network architecture includes one first device and a plurality of second devices, and any one of the plurality of second devices receives, on each receive channel included in the any second device and by using the at least one pair of subcarriers, a first packet sent to the any second device by the first device. The second device also locally prestores a first group of elements and a second group of elements that are included in the first packet generated by the first device, and the second device performs, based on the locally prestored first group of elements and second group of elements that are included in the first packet generated by the first device and a first group of elements and a second group of elements in which interference exists and that are included in the received first packet, interference cancellation on user data included in the received first packet. Optionally, a detailed implementation process in which the second device performs interference cancellation in the MU-MIMO network architecture is described in detail in the following embodiment shown in FIG. 11 or FIG. 12.

In this embodiment of this application, the first device generates the first packet, where the first packet includes the first group of elements, the second group of elements, and the user data, and sends the first packet to the second device by using the at least one pair of subcarriers. The second device receives the first packet by using the at least one pair of subcarriers, and performs interference cancellation on the user data in the first packet based on the first group of elements and the second group of elements that are included in the first packet. Because the second device can cancel, by using the first group of elements and the second group of elements, interference in the user data included in the first packet, and an implementation process of interference cancellation may be implemented by using a computing resource such as a second device processor, hardware circuits configured to cancel interference do not need to be disposed in the first device and the second device, so that costs and power consumption of the first device and the second device are reduced. Because the second device can cancel the interference in the user data, accuracy of receiving the user data can be further improved.

Figure 10:
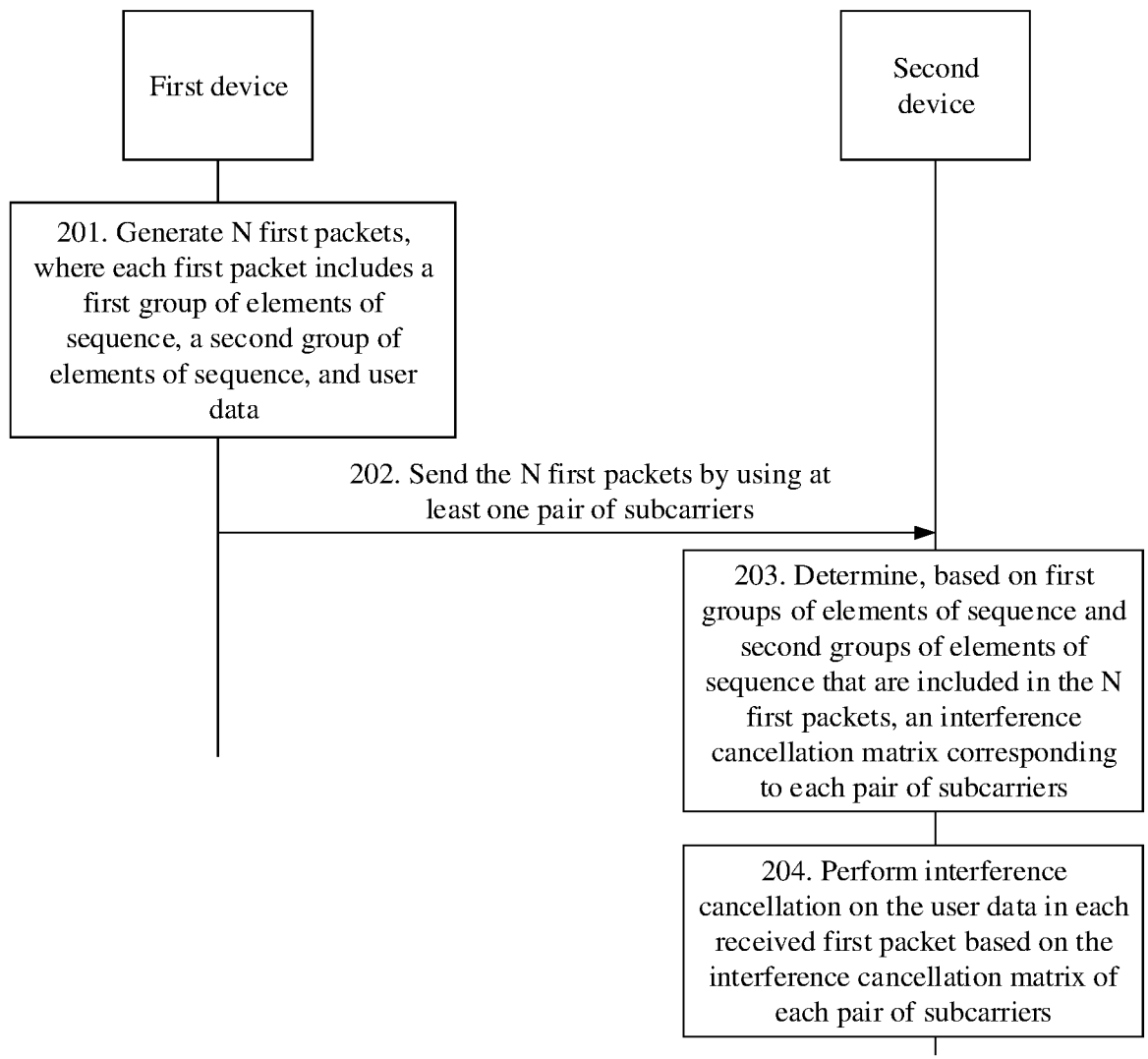
FIG. 10 is a flowchart of another interference cancellation method according to an embodiment of this application.

For the interference cancellation method shown in FIG. 9, this application describes an example in which the method is applied to the SU-MIMO network architecture shown in FIG. 4 or FIG. 5. In this example, the SU-MIMO network architecture includes one first device and one second device. In this example, the first device includes N transmit channels, and the second device includes N receive channels. N is an integer greater than or equal to 1. The first device may be a network side device, and the second device may be a terminal device; or the first device may be a terminal device, and the second device may be a network side device. Referring to FIG. 10, the interference cancellation method in this example includes the following steps.

Step 201: The first device generates a first packet corresponding to each transmit channel, to obtain N first packets, where each of the N first packets includes a first group of elements, a second group of elements, and user data, and the N first packets include different user data.

In this step, for ease of description, the N first packets are referred to as first packets P1, P2, . . . , and PN. Any pair of subcarriers includes a first subcarrier and a second subcarrier. The first group of elements in each first packet includes N elements corresponding to the first subcarrier and N elements corresponding to the second subcarrier. The second group of elements in each first packet includes N elements corresponding to the first subcarrier and N elements corresponding to the second subcarrier. The user data in each first packet includes user data corresponding to the first subcarrier and user data corresponding to the second subcarrier. A first group of elements and a second group of elements that are included in any first packet are different. User data in the first packets is different.

In this step, N=2 is used as an example for description. In other words, the first device includes two transmit channels, which are a first transmit channel and a second transmit channel, and the second device includes two receive channels, which are a first receive channel and a second receive channel. The first device generates two first packets, which are a first packet P1 corresponding to the first transmit channel and a first packet P2 corresponding to the second transmit channel.

For the first packet P1 corresponding to the first transmit channel, a first group of elements in the first packet P1 includes two elements, represented as $s_1^k$ and $s_1^k$, corresponding to the first subcarrier. A second group of elements in the first packet P1 includes two elements, represented as $s_1^k$ and $s_1^k$, corresponding to the first subcarrier. The first group of elements in the first packet P1 includes two elements, represented as $s_1^{-k}$ and $s_1^{-k}$, corresponding to the second subcarrier. The second group of elements in the first packet P1 includes two elements, represented as $-s_1^{-k}$ and $-s_1^{-k}$, corresponding to the second subcarrier. User data in the first packet P1 includes user data corresponding to the first subcarrier and user data corresponding to the second subcarrier, and the user data corresponding to the first subcarrier and the user data corresponding to the second subcarrier are respectively represented as $Ds_1^k$ and $Ds_1^{-k}$. In $s_1^k$, $s_1^{-k}$, $Ds_1^k$, and $Ds_1^{-k}$, 1 represents the first transmit channel, k represents the first subcarrier, and −k represents the second subcarrier.

For the first packet P2 corresponding to the second transmit channel, a first group of elements in the first packet P2 includes two elements, represented as $s_2^k$ and $-s_2^k$, corresponding to the first subcarrier. A second group of elements in the first packet P2 includes two elements, represented as $s_2^k$ and $-s_2^k$, corresponding to the first subcarrier. The first group of elements in the first packet P2 includes two elements, represented as $s_2^{-k}$ and $-s_2^{-k}$, corresponding to the second subcarrier. The second group of elements in the first packet P2 includes two elements, represented as $-s_2^{-k}$ and $s_2^{-k}$, corresponding to the second subcarrier. User data in the first packet P2 includes user data corresponding to the first subcarrier and user data corresponding to the second subcarrier, and the user data corresponding to the first subcarrier and the user data corresponding to the second subcarrier are respectively represented as $Ds_2^k$ and $Ds_2^{-k}$. In $s_2^k$, $-s_2^k$, $Ds_2^k$, and $Ds_2^{-k}$, 2 represents the second transmit channel.

Step 202: The first device sends the N first packets to the second device by using at least one pair of subcarriers.

In this step, the first device sends, on each transmit channel included in the first device and by using the at least one pair of subcarriers, a first packet corresponding to the transmit channel.

For example, the first device sends the first packet P1 corresponding to the first transmit channel to the second device on the first transmit channel by using the at least one pair of subcarriers, and sends the first packet P2 corresponding to the second transmit channel to the second device on the second transmit channel by using the at least one pair of subcarriers.

For any first packet, a process in which the first device sends the first packet to the second device is essentially sending the at least one pair of subcarriers to the second device. A first subcarrier included in any pair of subcarriers carries an element and user data, and a second subcarrier included in the any pair of subcarriers carries an element and user data. The element and the user data that are carried on the first subcarrier are respectively an element and user data that correspond to the first subcarrier, and the element and the user data that are carried on the second subcarrier are respectively an element and user data that correspond to the second subcarrier.

On the transmit channel of the first device, because a first image interference signal is generated between the first subcarrier and the second subcarrier, a first packet corresponding to the transmit channel includes the first image interference signal, which may be represented as $[\xi_t]$. A spatial interference signal is also generated on the first subcarrier and the second subcarrier by wireless transmission space between the first device and the second device. Therefore, the first packet includes the spatial interference signal, which may be represented as $[h]$. The second device receives the first packet by using the receive channel included in the second device. A mutual second image interference signal is also generated between the first subcarrier and the second subcarrier on the receive channel. Therefore, the first packet also includes the second image interference signal, which may be represented as $[\xi_r]$. Therefore, the first packet is transmitted from the first device to the second device, and a first packet received by the second device includes three interference signals. Data in the first packet received by the second device may be shown in a first formula. The first formula is $[r]=[\xi_r][h][\xi_t] \cdot [s]$, where $[r]$ represents the data in the first packet received by the second device, and $[s]$ represents data in the first packet sent by the first device.

Step 203: The second device receives the N first packets by using the at least one pair of subcarriers, and determines, based on first groups of elements and second groups of elements that are included in the N first packets, an interference cancellation matrix corresponding to each pair of subcarriers.

For ease of description, the N received first packets are represented as first packets R1, R2, . . . , and RN. In this step, the second device receives, on the receive channels included in the second device, the N first packets by using the at least one pair of subcarriers. For example, assuming that N=2, the second device receives the first packets R1 and R2 on the first receive channel and the second receive channel by using the at least one pair of subcarriers.

The first packet R1 includes a first group of elements, a second group of elements, and user data in which interference exists. The first group of elements in which interference exists is different from the first group of elements in the first packet P1 generated by the first device, and the second group of elements in which interference exists is different from the second group of elements in the first packet P1 generated by the first device.

The first packet R2 includes a first group of elements, a second group of elements, and user data in which interference exists. The first group of elements in which interference exists is different from the first group of elements in the first packet P2 generated by the first device, and the second group of elements in which interference exists is different from the second group of elements in the first packet P2 generated by the first device.

For a first subcarrier and a second subcarrier that are included in any pair of subcarriers, the first packet R1 received by the second device includes the first group of elements and the second group of elements in which interference exists. The first group of elements in which interference exists includes two elements corresponding to the first subcarrier, interference exists in the two elements, and the two elements are represented as $r_{1,1}^{k}$ and $r_{1,3}^{k}$. The second group of elements in which interference exists includes two elements corresponding to the first subcarrier, interference exists in the two elements, and the two elements are represented as $r_{1,2}^{k}$ and $r_{1,4}^{k}$. The first group of elements in which interference exists includes two elements corresponding to the second subcarrier, interference exists in the two elements, and the two elements are represented as $r_{1,1}^{-k}$ and $r_{1,3}^{-k}$. The second group of elements in which interference exists includes two elements corresponding to the second subcarrier, interference exists in the two elements, and the two elements are represented as $r_{1,2}^{-k}$ and $r_{1,4}^{-k}$. The first packet R1 includes the user data in which interference exists, the user data includes user data in which interference exists and that corresponds to the first subcarrier and user data in which interference exists and that corresponds to the second subcarrier, and the user data in which interference exists and that corresponds to the first subcarrier and the user data in which interference exists and that corresponds to the second subcarrier are respectively represented as $Dr_{1}^{k}$ and $Dr_{1}^{-k}$.

The first packet R2 received by the second device also includes the first group of elements and the second group of elements in which interference exists. The first group of elements in which interference exists includes two elements corresponding to the first subcarrier, interference exists in the two elements, and the two elements are represented as $r_{2,1}^{k}$ and $r_{2,3}^{k}$. The second group of elements in which interference exists includes two elements corresponding to the first subcarrier, interference exists in the two elements, and the two elements are represented as $r_{2,2}^{k}$ and $r_{2,4}^{k}$. The first group of elements in which interference exists includes two elements corresponding to the second subcarrier, interference exists in the two elements, and the two elements are represented as $r_{2,1}^{-k}$ and $r_{2,3}^{-k}$. The second group of elements in which interference exists includes two elements corresponding to the second subcarrier, interference exists in the two elements, and the two elements are represented as $r_{2,2}^{-k}$ and $r_{2,4}^{-k}$. The first packet R2 includes the user data in which interference exists, the user data includes user data in which interference exists and that corresponds to the first subcarrier and user data in which interference exists and that corresponds to the second subcarrier, and the user data in which interference exists and that corresponds to the first subcarrier and the user data in which interference exists and that corresponds to the second subcarrier are respectively represented as $Dr_{2}^{k}$ and $Dr_{2}^{-k}$.

An interference cancellation matrix of any pair of subcarriers is determined in the following process:

An element included in a first packet received by the second device by using the any pair of subcarriers may also be represented as the foregoing first formula: $[r]=[\xi_{r}][h][\xi_{r}]\cdot[s]$.

In the first formula, [r] is a receiving matrix, including elements received by the second device by using a first subcarrier and a second subcarrier. For a first group of elements and a second group of elements that are included in each first packet received by the second device, the received elements include N elements that are in each first group of elements and that correspond to the first subcarrier, N elements that are in each first group of elements and that correspond to the second subcarrier, N elements that are in each second group of elements and that correspond to the first subcarrier, and N elements that are in each second group of elements and that correspond to the second subcarrier.

[s] is a sending matrix prestored by the second device, and includes elements sent by the first device by using the first subcarrier and the second subcarrier. For the first group of elements and the second group of elements that are included in each first packet sent by the first device, the sent elements include N elements that are in each first group of elements and that correspond to the first subcarrier, N elements that are in each first group of elements and that correspond to the second subcarrier, N elements that are in each second group of elements and that correspond to the first subcarrier, and N elements that are in each second group of elements and that correspond to the second subcarrier.

In this step, N=2 is used as an example. The second device receives the first packets R1 and R2, and the first group of elements in the first packet R1 includes the elements $r_{1,1}^{k}$ and $r_{1,3}^{k}$ in which interference exists and that correspond to the first subcarrier and the elements $r_{1,1}^{-k}$ and $r_{1,3}^{-k}$ in which interference exists and that correspond to the second subcarrier. The second group of elements in the first packet R1 includes the elements $r_{1,2}^{k}$ and $r_{1,4}^{k}$ in which interference exists and that correspond to the first subcarrier and the elements $r_{1,2}^{-k}$ and $r_{1,4}^{-k}$ in which interference exists and that correspond to the second subcarrier. The first group of elements in the first packet R2 includes the elements $r_{2,1}^{k}$ and $r_{2,3}^{k}$ in which interference exists and that correspond to the first subcarrier and the elements $r_{2,1}^{-k}$ and $r_{2,3}^{-k}$ corresponding to the second subcarrier. The second group of elements in the first packet R2 includes the elements $r_{2,2}^{k}$ and $r_{2,4}^{k}$ corresponding to the first subcarrier and the elements $r_{2,2}^{-k}$ and $r_{2,4}^{-k}$ in which interference exists and that correspond to the second subcarrier. Therefore, the receiving matrix [r] may be represented as follows:

$$[r] = \begin{bmatrix} r_{1,1}^{k} & r_{1,2}^{k} & r_{1,3}^{k} & r_{1,4}^{k} \\ r_{1,1}^{-k*} & r_{1,2}^{-k*} & r_{1,3}^{-k*} & r_{1,4}^{-k*} \\ r_{2,1}^{k} & r_{2,2}^{k} & r_{2,3}^{k} & r_{2,4}^{k} \\ r_{2,1}^{-k*} & r_{2,2}^{-k*} & r_{2,3}^{-k*} & r_{2,4}^{-k*} \end{bmatrix}.$$

[s] may be a sending matrix of the first device, and the second device prestores the sending matrix [s]. The first group of elements in the first packet P1 sent by the first device includes elements $s_{1}^{k}$ and $s_{1}^{k}$ (which are respectively located in the first column and the third column of the first row in the sending matrix) corresponding to the first subcarrier and elements $s_{1}^{-k}$ and $s_{1}^{-k}$ (which are respectively located in the first column and the third column of the second row in the sending matrix) corresponding to the second subcarrier. The second group of elements in the first packet P1 includes elements $s_{1}^{k}$ and $s_{1}^{k}$ (which are respectively located in the second column and the fourth column of the first row in the sending matrix) corresponding to the first subcarrier and elements $-s_{1}^{-k}$ and $-s_{1}^{-k}$ (which are respectively located in the second column and the fourth column of the second row in the sending matrix) corresponding to the second subcarrier. The first group of elements in the first packet P2 sent by the first device includes elements $s_2^k$ and $-s_2^k$ (which are respectively located in the first column and the third column of the third row in the sending matrix) corresponding to the first subcarrier and elements $s_2^{-k}$ and $-s_2^{-k}$ (which are respectively located in the first column and the third column of the fourth row in the sending matrix) corresponding to the second subcarrier. The second group of elements in the first packet P2 includes elements $s_2^k$ and $-s_2^k$ (which are respectively located in the second column and the fourth column of the third row in the sending matrix) corresponding to the first subcarrier and elements $-s_2^{-k}$ and $s_2^{-k}$ (which are respectively located in the second column and the fourth column of the fourth row in the sending matrix) corresponding to the second subcarrier. Therefore, the sending matrix [s] may be represented as follows:

$$[s] = \begin{bmatrix} s_1^k & s_1^k & s_1^k & s_1^k \\ s_1^{-k*} & -s_1^{-k*} & s_1^{-k*} & -s_1^{-k*} \\ s_2^k & s_2^k & -s_2^k & -s_2^k \\ s_2^{-k*} & -s_2^{-k*} & -s_2^{-k*} & s_2^{-k*} \end{bmatrix},$$

where the first image interference signal is $$[\xi_t] = \begin{bmatrix} 1 & \xi_{1,t}^{-k} & 0 & 0 \\ \xi_{1,t}^{k*} & 1 & 0 & 0 \\ 0 & 0 & 1 & \xi_{2,t}^{-k} \\ 0 & 0 & \xi_{2,t}^{k*} & 1 \end{bmatrix};$$

the spatial interference signal is $$[h] = \begin{bmatrix} h_{11}^k & 0 & h_{12}^k & 0 \\ 0 & h_{11}^{-k*} & 0 & h_{12}^{-k*} \\ h_{21}^k & 0 & h_{22}^k & 0 \\ 0 & h_{21}^{-k*} & 0 & h_{22}^{-k*} \end{bmatrix};$$

and the second image interference signal is $$[\xi_r] = \begin{bmatrix} 1 & \xi_{1,r}^{-k} & 0 & 0 \\ \xi_{1,r}^{k*} & 1 & 0 & 0 \\ 0 & 0 & 1 & \xi_{2,r}^{-k} \\ 0 & 0 & \xi_{2,r}^{k*} & 1 \end{bmatrix}.$$

The second device locally prestores all elements in the foregoing sending matrix [s]. Therefore, based on the first formula, a receiving matrix of the second device may be shown in Formula (1):

$$\begin{bmatrix} r_{1,1}^k & r_{1,2}^k & r_{1,3}^k & r_{1,4}^k \\ r_{1,1}^{-k*} & r_{1,2}^{-k*} & r_{1,3}^{-k*} & r_{1,4}^{-k*} \\ r_{2,1}^k & r_{2,2}^k & r_{2,3}^k & r_{2,4}^k \\ r_{2,1}^{-k*} & r_{2,2}^{-k*} & r_{2,3}^{-k*} & r_{2,4}^{-k*} \end{bmatrix} = \begin{bmatrix} 1 & \xi_{1,r}^{-k} & 0 & 0 \\ \xi_{1,r}^{k*} & 1 & 0 & 0 \\ 0 & 0 & 1 & \xi_{2,r}^{-k} \\ 0 & 0 & \xi_{2,r}^{k*} & 1 \end{bmatrix} \quad (1)$$

-continued $$\begin{bmatrix} h_{11}^k & 0 & h_{12}^k & 0 \\ 0 & h_{11}^{-k*} & 0 & h_{12}^{-k*} \\ h_{21}^k & 0 & h_{22}^k & 0 \\ 0 & h_{21}^{-k*} & 0 & h_{22}^{-k*} \end{bmatrix} \begin{bmatrix} 1 & \xi_{1,t}^{-k} & 0 & 0 \\ \xi_{1,t}^{k*} & 1 & 0 & 0 \\ 0 & 0 & 1 & \xi_{2,t}^{-k} \\ 0 & 0 & \xi_{2,t}^{k*} & 1 \end{bmatrix}.$$

$$\begin{bmatrix} s_1^k & s_1^k & s_1^k & s_1^k \\ s_1^{-k*} & -s_1^{-k*} & s_1^{-k*} & -s_1^{-k*} \\ s_2^k & s_2^k & -s_2^k & -s_2^k \\ s_2^{-k*} & -s_2^{-k*} & -s_2^{-k*} & s_2^{-k*} \end{bmatrix}$$

In Formula (1), ( )* represents a conjugate signal of a signal or a conjugate coefficient of a coefficient. For example, $r_{1,1}^{-k*}$ is a conjugate signal of the element $r_{1,1}^{-k}$, and the conjugate signal is a signal obtained after a conjugate operation is performed on the element $r_{1,1}^{-k}$. $\xi_{1,t}^{-k}$ is a first image interference signal generated on the second subcarrier $-k$ on the first transmit channel of the first device, $\xi_{1,t}^{k*}$ is a conjugate signal of a first image interference signal generated on the first subcarrier k on the first transmit channel of the first device, and the conjugate signal is a signal obtained after a conjugate operation is performed on the first image interference signal. A meaning of a conjugate signal appearing in other content of embodiments of this application is the same, and details are not described again. $\xi_{2,t}^{-k}$ is a first image interference signal generated on the second subcarrier $-k$ on the second transmit channel of the first device, and $\xi_{2,t}^{k*}$ is a conjugate signal of a first image interference signal generated on the first subcarrier k on the second transmit channel of the first device.

$\xi_{1,r}^{-k}$ is a second image interference signal generated on the second subcarrier $-k$ on the first receive channel of the second device, and $\xi_{1,r}^{k*}$ is a conjugate signal of a second image interference signal generated on the first subcarrier k on the first receive channel of the second device. $\xi_{2,r}^{-k}$ is a second image interference signal generated on the second subcarrier $-k$ on the second receive channel of the second device, and $\xi_{2,r}^{k*}$ is a conjugate signal of a second image interference signal generated on the first subcarrier k on the second receive channel of the second device.

$h_{11}^k$ is a spatial interference signal generated on the first subcarrier k by a channel between the first transmit channel and the first receive channel. $h_{12}^k$ is a spatial interference signal generated on the first subcarrier k by a channel between the first transmit channel and the second receive channel. $h_{11}^{-k*}$ is a conjugate signal of a spatial interference signal generated on the second subcarrier $-k$ by the channel between the first transmit channel and the first receive channel. $h_{12}^{-k*}$ is a conjugate signal of a spatial interference signal generated on the second subcarrier $-k$ by a channel between the first transmit channel and the second receive channel. $h_{21}^k$ is a spatial interference signal generated on the first subcarrier k by a channel between the second transmit channel and the first receive channel. $h_{22}^k$ is a spatial interference signal generated on the first subcarrier k by a channel between the second transmit channel and the second receive channel. $h_{21}^{-k*}$ is a conjugate signal of a spatial interference signal generated on the second subcarrier $-k$ by the channel between the second transmit channel and the first receive channel. $h_{22}^{-k*}$ is a conjugate signal of a spatial interference signal generated on the second subcarrier $-k$ by the channel between the second transmit channel and the second receive channel.

The interference cancellation matrix W in Formula (1) is obtained through decomposition, and the obtained interference cancellation matrix W is shown in Formula (2):

$$W = \begin{bmatrix} 1 & \xi_{1,r}^{-k} & 0 & 0 \\ \xi_{1,r}^{k*} & 1 & 0 & 0 \\ 0 & 0 & 1 & \xi_{2,r}^{-k} \\ 0 & 0 & \xi_{2,r}^{k*} & 1 \end{bmatrix} \quad (2)$$

$$\begin{bmatrix} h_{11}^k & 0 & h_{12}^k & 0 \\ 0 & h_{11}^{-k*} & 0 & h_{12}^{-k*} \\ h_{21}^k & 0 & h_{22}^k & 0 \\ 0 & h_{21}^{-k*} & 0 & h_{22}^{-k*} \end{bmatrix} \begin{bmatrix} 1 & \xi_{1,t}^{-k} & 0 & 0 \\ \xi_{1,t}^{k*} & 1 & 0 & 0 \\ 0 & 0 & 1 & \xi_{2,t}^{-k} \\ 0 & 0 & \xi_{2,t}^{k*} & 1 \end{bmatrix} = \begin{bmatrix} r_{1,1}^k & r_{1,2}^k & r_{1,3}^k & r_{1,4}^k \\ r_{1,1}^{-k*} & r_{1,2}^{-k*} & r_{1,3}^{-k*} & r_{1,4}^{-k*} \\ r_{2,1}^k & r_{2,2}^k & r_{2,3}^k & r_{2,4}^k \\ r_{2,1}^{-k*} & r_{2,2}^{-k*} & r_{2,3}^{-k*} & r_{2,4}^{-k*} \end{bmatrix} \cdot$$

$$\begin{bmatrix} s_1^k & s_1^k & s_1^k & s_1^k \\ s_1^{-k*} & -s_1^{-k*} & s_1^{-k*} & -s_1^{-k*} \\ s_2^k & s_2^k & -s_2^k & -s_2^k \\ s_2^{-k*} & -s_2^{-k*} & -s_2^{-k*} & s_2^{-k*} \end{bmatrix}^{-1}$$

Step 204: The second device performs interference cancellation on the user data in each received first packet based on the interference cancellation matrix of each pair of subcarriers.

In this step, for a first subcarrier and a second subcarrier that are included in any pair of subcarriers, an interference cancellation matrix corresponding to the any pair of subcarriers is inverted to obtain an inverse matrix, and interference cancellation is performed on a first data matrix based on the inverse matrix, to obtain a second data matrix in which interference is canceled. The first data matrix includes user data that is in each received first packet and that corresponds to the first subcarrier and user data that is in each received first packet and that corresponds to the second subcarrier.

For example, taking N=2 as an example, an interference cancellation matrix corresponding to any pair of subcarriers is inverted to obtain an inverse matrix. According to Formula (3), the inverse matrix is left-multiplied by a first data matrix to obtain a second data matrix in which interference is canceled. The first data matrix includes the user data $Dr_1^k$ in which interference exists and that corresponds to the first subcarrier in the first packet R1, the user data $Dr_1^{-k}$ in which interference exists and that corresponds to the second subcarrier in the first packet R1, the user data $Dr_2^k$ in which interference exists and that corresponds to the first subcarrier in the first packet R2, and the user data $Dr_2^{-k}$ in which interference exists and that corresponds to the second subcarrier in the first packet R2.

The second data matrix includes user data $Ds_1^k$ in which interference is canceled and that corresponds to the first subcarrier in the first packet R1, user data $Ds_1^{-k}$ in which interference is canceled and that corresponds to the second subcarrier in the first packet R1, user data $Ds_2^k$ in which interference is canceled and that corresponds to the first subcarrier in the first packet R2, and user data $Ds_2^{-k}$ in which interference is canceled and that corresponds to the second subcarrier in the first packet R2.

$$\begin{bmatrix} Ds_1^k \\ Ds_1^{-k*} \\ Ds_2^k \\ Ds_2^{-k*} \end{bmatrix} = W^{-1} \cdot \begin{bmatrix} Dr_1^k \\ Dr_1^{-k*} \\ Dr_2^k \\ Dr_2^{-k*} \end{bmatrix} \quad (3)$$

In this embodiment of this application, the first device generates the N first packets, where each first packet includes the first group of element, the second group of elements, and the user data, and sends the first packets to the second device on the transmit channels by using the at least one pair of subcarriers. The second device receives the N first packets by using the at least one pair of subcarriers, and performs interference cancellation on the user data in the N first packets based on first groups of elements and second groups of elements in which interference exists and that are included in the N first packets. Because the second device can cancel, by using the first group of elements and the second group of elements that are included in each first packet, interference in the user data included in each first packet, and the cancellation operation may be implemented by a processor of the second device, in other words, the interference in the user data may be canceled by using software, hardware circuits configured to cancel interference do not need to be disposed in the first device and the second device, so that costs of the first device and the second device are reduced. Because the second device can cancel the interference in the user data, image interference generated on symmetrical subcarriers can be canceled, and accuracy of receiving the user data can be improved.

Figure 11:
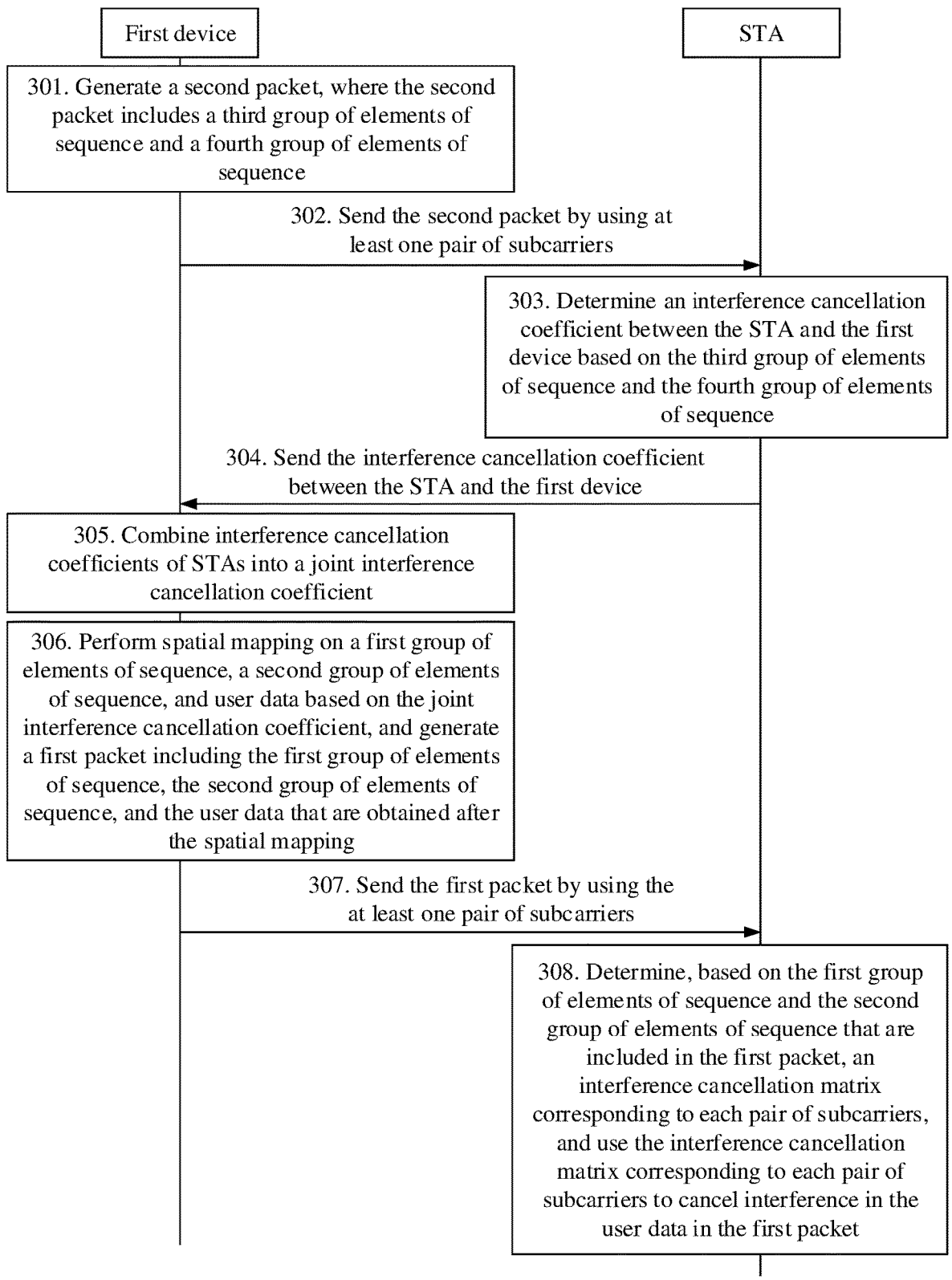
FIG. 11 is a flowchart of another interference cancellation method according to an embodiment of this application.

For the interference cancellation method shown in FIG. 9, this application describes an example in which the method is applied to the MU-MIMO network architecture shown in FIG. 6 or FIG. 7. The MU-MIMO network architecture includes one first device and a plurality of second devices. The first device includes M transmit channels, and a total quantity of receive channels of the plurality of second devices is equal to M. For example, in this embodiment of this application, there is one first device and two second devices. The two second devices may be a first STA and a second STA, and the first device may be an AP, a base station, or the like. In the MU-MIMO network architecture, before sending user data to each STA, the first device needs to first obtain a joint interference cancellation coefficient of at least one pair of subcarriers, and then send the user data to each STA based on the joint interference cancellation coefficient. In this example, each STA measures an interference cancellation coefficient between the STA and the first device, and the first device combines interference cancellation coefficients of the STAs into the joint interference cancellation coefficient. Referring to FIG. 11, the interference cancellation method provided in this example includes the following steps.

Step 301: The first device generates M second packets, where each second packet includes a third group of elements and a fourth group of elements, and the third group of elements is different from the fourth group of elements.

The M second packets respectively correspond to the M transmit channels of the first device. For a first subcarrier and a second subcarrier that are included in any pair of subcarriers, the third group of elements includes M elements corresponding to the first subcarrier and M elements corresponding to the second subcarrier. The fourth group of elements includes M elements corresponding to the first subcarrier and M elements corresponding to the second subcarrier.

In this step, it is assumed that the first device includes two transmit channels, in other words, M=2. The first device includes two transmit channels, which are a first transmit channel and a second transmit channel, and each STA includes one receive channel. The first device generates a second packet Q1 corresponding to the first transmit channel and a second packet Q2 corresponding to the second transmit channel. The second packet Q1 includes a third group of elements and a fourth group of elements. For a first subcarrier and a second subcarrier that are included in any pair of subcarriers, the third group of elements in the second packet Q1 includes elements $s_1^k$ and $s_1^k$ corresponding to the first subcarrier and elements $s_1^{-k}$ and $s_1^{-k}$ corresponding to the second subcarrier. The fourth group of elements in the second packet Q1 includes elements $S_1^k$ and $s_1^k$ corresponding to the first subcarrier and elements $-s_1^{-k}$ and $-S_1^{-k}$ corresponding to the second subcarrier. The second packet Q2 includes a third group of elements and a fourth group of elements. The third group of elements in the second packet Q2 includes elements $s_2^k$ and $-s_2^k$ corresponding to the first subcarrier and elements $s_2^{-k}$ and $-s_2^{-k}$ corresponding to the second subcarrier. The fourth group of elements in the second packet Q2 includes elements $s_2^k$ and $-s_2^k$ corresponding to the first subcarrier and elements $-s_2^{-k}$ and corresponding to the second subcarrier.

Optionally, the second packet may be a null data packet (NDP), and the NDP includes a third group of elements and a fourth group of elements.

Step 302: The first device sends the M second packets to each STA on the M transmit channels by using the at least one pair of subcarriers.

A process in which the first device sends the second packets to each STA is essentially sending the at least one pair of subcarriers to each STA. A first subcarrier included in any pair of subcarriers carries an element, and a second subcarrier included in the any pair of subcarriers carries an element.

Referring to FIG. 7, the first device separately sends the second packets Q1 and Q2 to each STA on the first transmit channel and the second transmit channel. The second packet Q1 sent from the first transmit channel and the second packet Q2 sent from the second transmit channel are superposed into one second packet, so that each STA receives one second packet.

Step 303: Either STA receives a second packet, and determines an interference cancellation coefficient between the STA and the first device based on a third group of elements and a fourth group of elements that are included in the second packet.

For a second packet received by the first STA and a first subcarrier k and a second subcarrier −k that are included in any pair of subcarriers, the first STA obtains, from a third group of elements in the second packet, two elements in which interference exists and that correspond to the first subcarrier k, and the two elements are represented as $rr_{1,1}^k$ and $rr_{1,3}^k$. The first STA obtains two elements corresponding to the first subcarrier k from a fourth group of elements in the second packet, and the two elements are represented as $rr_{1,2}^k$ and $rr_{1,4}^k$. The first STA obtains, from the third group of elements in the second packet, two elements in which interference exists and that correspond to the second subcarrier −k, and the two elements are represented as $rr_{1,1}^{-k}$ and $rr_{1,3}^{-k}$. The first STA obtains two elements corresponding to the second subcarrier −k from the fourth group of elements in the second packet, and the two elements are represented as $rr_{1,2}^{-k}$ and $rr_{1,4}^{-k}$.

The first STA prestores a third group of elements and a fourth group of elements in each second packet sent by the first device. In other words, the second device prestores two elements $s_1^k$ and $S_1^k$ corresponding to the first subcarrier k and two elements $s_1^{-k}$ and $s_1^{-k}$ corresponding to the second subcarrier −k that are in a third group of elements included in the second packet Q1, and prestores two elements $s_1^k$ and $s_1^k$ corresponding to the first subcarrier k and two elements $-s_1^{-k}$ and $-s_1^{-k}$ corresponding to the second subcarrier that are in a fourth group of elements included in the second packet Q1. The second device prestores two elements $s_2^k$ and $-s_2^k$ corresponding to the first subcarrier k and two elements $s_2^{-k}$ and $-s_2^{-k}$ corresponding to the second subcarrier −k that are in a third group of elements included in the second packet Q2 and two elements $s_2^k$ and $-s_2^k$ corresponding to the first subcarrier k and two elements $-s_2^{-k}$ and $s_2^{-k}$ corresponding to the second subcarrier that are in a fourth group of elements included in the second packet Q2.

The first STA obtains an interference cancellation coefficient $H_1$ between the first device and the first STA based on the prestored elements $s_1^k$, $s_1^k$, $s_1^{-k}$, $s_1^{-k}$, $s_1^k$, $s_1^k$, $-s_1^{-k}$, $-s_1^{-k}$, $s_2^k$, $-s_2^k$, $s_2^{-k}$, $-s_2^{-k}$, $s_2^k$, $-s_2^k$, $-s_2^{-k}$, and $s_2^{-k}$ and the received elements $rr_{1,1}^k$, $rr_{1,3}^k$, $rr_{1,1}^{-k}$, $rr_{1,3}^{-k}$, $rr_{1,2}^k$, $rr_{1,4}^k$, $rr_{1,2}^{-k}$, and $rr_{1,4}^{-k}$ according to Formula (4).

The interference cancellation coefficient $H_1$ includes a first image interference signal [$\xi_t$] generated between the first subcarrier and the second subcarrier on the first transmit channel and the second transmit channel of the first device, a spatial interference signal [h] generated on the first subcarrier and the second subcarrier by wireless transmission space between the first device and the first STA, and a second image interference signal [$\xi_{r,1}$] generated between the first subcarrier and the second subcarrier on a receive channel of the first STA.

$$H_1 = \begin{bmatrix} 1 & \xi_{1,r}^{-k} \\ \xi_{1,r}^{k*} & 1 \end{bmatrix} \begin{bmatrix} h_{11}^k & 0 & h_{12}^k & 0 \\ 0 & h_{11}^{-k*} & 0 & h_{12}^{-k*} \end{bmatrix} \begin{bmatrix} 1 & \xi_{1,t}^{-k} & 0 & 0 \\ \xi_{1,t}^{k*} & 1 & 0 & 0 \\ 0 & 0 & 1 & \xi_{2,t}^{-k} \\ 0 & 0 & \xi_{2,t}^{k*} & 1 \end{bmatrix} = [\xi_{r,1}][h][\xi_t] = \quad (4)$$

$$\begin{bmatrix} r_{1,1}^k & r_{1,2}^k & r_{1,3}^k & r_{1,4}^k \\ r_{1,1}^{-k*} & r_{1,2}^{-k*} & r_{1,3}^{-k*} & r_{1,4}^{-k*} \end{bmatrix} \begin{bmatrix} s_1^k & s_1^k & s_1^k & s_1^k \\ s_1^{-k*} & -s_1^{-k*} & s_1^{-k*} & -s_1^{-k*} \\ s_2^k & s_2^k & -s_2^k & s_2^k \\ s_2^{-k*} & -s_2^{-k*} & -s_2^{-k*} & s_2^{-k*} \end{bmatrix}^{-1}$$

In Formula (4), $\xi_{1,r}^{k*}$ is a conjugate signal of an image interference signal generated on the first subcarrier k on the receive channel of the first STA, and $\xi_{1,r}^{-k}$ is an image interference signal generated on the second subcarrier −k on the receive channel of the first STA. $\xi_{1,t}^{k*}$ is a conjugate signal of an image interference signal generated on the first subcarrier k on the first transmit channel of the first device, $\xi_{1,t}^{-k}$ is an image interference signal generated on the second subcarrier −k on the first transmit channel of the first device, $\xi_{2,t}^{k*}$ is a conjugate signal of an image interference signal generated on the first subcarrier k on the second transmit channel of the first device, and $\xi_{2,t}^{-k}$ is an image interference signal generated on the second subcarrier $-k$ on the second transmit channel of the first device.

$h_{11}^k$ is a spatial interference signal generated on the first subcarrier k by a channel between the first transmit channel and the first STA. $h_{12}^k$ is a spatial interference signal generated on the first subcarrier k by a channel between the second transmit channel and the first STA. $h_{11}^{-k*}$ is a conjugate signal of a spatial interference signal generated on the second subcarrier $-k$ by the channel between the first transmit channel and the first STA. $h_{12}^{-k*}$ is a conjugate signal of a spatial interference signal generated on the second subcarrier $-k$ by the channel between the second transmit channel and the first STA. $h_{21}^k$ is a spatial interference signal generated on the first subcarrier k by a channel between the first transmit channel and the second STA. $h_{22}^k$ is a spatial interference signal generated on the first subcarrier k by a channel between the second transmit channel and the second STA. $h_{21}^{-k*}$ is a conjugate signal of a spatial interference signal generated on the second subcarrier $-k$ by the channel between the first transmit channel and the second STA. $h_{22}^{-k*}$ is a conjugate signal of a spatial interference signal generated on the second subcarrier $-k$ by the channel between the second transmit channel and the second STA.

The first STA may repeat the foregoing process to obtain an interference cancellation coefficient corresponding to each pair of subcarriers.

For a second packet received by the second STA and a first subcarrier k and a second subcarrier $-k$ that are included in any pair of subcarriers, the second STA obtains, from a third group of elements in the second packet, two elements in which interference exists and that correspond to the first subcarrier k, and the two elements are $rr_{2,1}^k$ and $rr_{2,3}^k$. The second STA obtains two elements corresponding to the first subcarrier k from a fourth group of elements in the second packet, and the two elements are represented as $rr_{2,2}^k$ and $rr_{2,4}^k$. The second STA obtains, from the third group of elements in the second packet, two elements in which interference exists and that correspond to the second subcarrier $-k$, and the two elements are represented as $rr_{2,1}^{-k}$ and $rr_{2,3}^{-k}$. The second STA obtains two elements corresponding to the second subcarrier $-k$ from the fourth group of elements in the second packet, and the two elements are represented as $rr_{2,2}^{-k}$ and $rr_{2,4}^{-k}$. The second STA also prestores elements $s_1^k$, $s_1^k$, $s_1^{-k}$, $s_1^{-k}$, $s_1^k$, $s_1^k$, $-s_1^{-k}$, $-s_1^{-k}$, $s_2^k$, $-s_2^k$, $s_2^{-k}$, $-s_2^{-k}$, $s_2^k$, $-s_2^k$, $s_2^{-k}$, $-s_2^{-k}$, $s_2^k$, $-s_2^k$, $-s_2^{-k}$, and $s_2^{-k}$.

The second STA obtains an interference cancellation coefficient $H_2$ between the first device and the second STA based on the received elements $rr_{2,1}^k$, $rr_{2,3}^k$, $rr_{2,2}^k$, $rr_{2,4}^k$, $rr_{2,1}^{-k}$, $rr_{2,3}^{-k}$, $rr_{2,2}^{-k}$, and $rr_{2,4}^{-k}$ and the prestored elements $s_1^k$, $s_1^k$, $s_1^{-k}$, $s_1^{-k}$, $s_1^k$, $s_1^k$, $-s_1^{-k}$, $-s_1^{-k}$, $s_2^k$, $-s_2^k$, $s_2^{-k}$, $-s_2^{-k}$, $s_2^k$, $-s_2^k$, $-s_2^{-k}$, and $s_2^{-k}$ according to Formula (5).

The interference cancellation coefficient $H_2$ includes a first image interference signal $[\xi_t]$ generated between the first subcarrier and the second subcarrier on the first transmit channel and the second transmit channel of the first device, a spatial interference signal $[h]$ generated on the first subcarrier and the second subcarrier by wireless transmission space between the first device and the second STA, and a second image interference signal $[\xi_{r,2}]$ generated between the first subcarrier and the second subcarrier on a receive channel of the second STA.

$$H_2 = \begin{bmatrix} 1 & \xi_{2,r}^{-k} \\ \xi_{2,r}^{k*} & 1 \end{bmatrix} \begin{bmatrix} h_{21}^k & 0 & h_{22}^k & 0 \\ 0 & h_{21}^{-k*} & 0 & h_{22}^{-k*} \end{bmatrix} \begin{bmatrix} 1 & \xi_{1,t}^{-k} & 0 & 0 \\ \xi_{1,t}^{k*} & 1 & 0 & 0 \\ 0 & 0 & 1 & \xi_{2,t}^{-k} \\ 0 & 0 & \xi_{2,t}^{k*} & 1 \end{bmatrix} = [\xi_{r,2}][h][\xi_t] = \tag{5}$$

$$\begin{bmatrix} r_{2,1}^k & r_{2,2}^k & r_{2,3}^k & r_{2,4}^k \\ r_{2,1}^{-k*} & r_{2,2}^{-k*} & r_{2,3}^{-k*} & r_{2,4}^{-k*} \end{bmatrix} \begin{bmatrix} s_1^k & s_1^k & s_1^k & s_1^k \\ s_1^{-k*} & -s_1^{-k*} & s_1^{-k*} & -s_1^{-k*} \\ s_2^k & s_2^k & -s_2^k & s_2^k \\ s_2^{-k*} & -s_2^{-k*} & -s_2^{-k*} & s_2^{-k*} \end{bmatrix}^{-1}$$

In Formula (5), $\xi_{2,r}^{k*}$ is a conjugate signal of an image interference signal generated on the first subcarrier k on the receive channel of the second STA, and $\xi_{2,r}^{-k}$ is an image interference signal generated on the second subcarrier $-k$ on the receive channel of the second STA.

The second STA may repeat the foregoing process to obtain an interference cancellation coefficient corresponding to each pair of subcarriers.

Step 304: The STA sends the interference cancellation coefficient between the STA and the first device to the first device.

Optionally, the interference cancellation coefficient between the STA and the first device includes an interference cancellation coefficient of each pair of subcarriers.

The first STA sends an interference cancellation coefficient $H_1$ of any pair of subcarriers to the first device, where $H_1=[\xi_{r,1}][h][\xi_t]$. The second STA sends an interference cancellation coefficient $H_2$ of any pair of subcarriers to the first device, where $H_2=[\xi_{r,2}][h][\tau_t]$.

Step 305: The first device receives an interference cancellation coefficient sent by each STA, and combines received interference cancellation coefficients into the joint interference cancellation coefficient of the at least one pair of subcarriers.

The joint interference cancellation coefficient of the at least one pair of subcarriers includes an interference cancellation coefficient of each pair of subcarriers. A joint interference cancellation coefficient of any pair of subcarriers is:

$$H = \begin{bmatrix} H_1 \\ H_2 \end{bmatrix} = \begin{bmatrix} [\xi_{r,1}][h][\xi_t] \\ [\xi_{r,2}][h][\xi_t] \end{bmatrix} = [\xi_r][h][\xi_t], \text{ where}$$

$$[\xi_r] = \begin{bmatrix} 1 & \xi_{1,r}^{-k} & 0 & 0 \\ \xi_{1,r}^{k*} & 1 & 0 & 0 \\ 0 & 0 & 1 & \xi_{2,r}^{-k} \\ 0 & 0 & \xi_{2,r}^{k*} & 1 \end{bmatrix}.$$

Step 306: For the either STA, the first device performs, based on the joint interference cancellation coefficient, spatial mapping on a first group of elements, a second group of elements, and user data that are to be sent to the STA, and generates a first packet to be sent to the STA, where the first packet includes the first group of elements, the second group of elements, and the user data that are obtained after the spatial mapping.

In this step, a spatial mapping matrix is obtained based on the joint interference cancellation coefficient, and spatial mapping is performed, based on the spatial mapping matrix, on the first group of elements, the second group of elements, and the user data that are to be sent to the either STA. The first packet to be sent to the either STA is generated. The first packet includes the first group of elements, the second group of elements, and the user data that are obtained after the spatial mapping.

Optionally, the joint interference cancellation coefficient is a matrix, and an inverse operation is performed on the matrix to obtain an inverse matrix. The inverse matrix is a spatial mapping matrix. For example, an inverse operation is performed on a joint interference cancellation coefficient H of any pair of subcarriers to obtain a spatial mapping matrix $H^{-1} = [\xi_r]^{-1}[h]^{-1}[\xi_r]^{-1}$.

For example, for a first subcarrier k and a second subcarrier −k that are included in any pair of subcarriers and a first group of elements, a second group of elements, and user data that are to be sent to the first STA, the first group of elements includes an element $s_1^k$ corresponding to the first subcarrier k and an element $s_1^{-k}$ corresponding to the second subcarrier −k, the second group of elements includes an element $s_1^k$ corresponding to the first subcarrier k and an element $-s_1^{-k}$ corresponding to the second subcarrier −k, and the user data includes first user data $Ds_{STA1}^k$ corresponding to the first subcarrier k and second user data $Ds_{STA1}^{-k}$ corresponding to the second subcarrier −k. In the elements $s_1^k$ and $s_1^{-k}$, 1 represents the first transmit channel. For a first group of elements, a second group of elements, and user data that are to be sent to the second STA, it is assumed that the first group of elements includes an element $s_2^k$ corresponding to the first subcarrier k and an element $s_2^{-k}$ corresponding to the second subcarrier −k, the second group of elements includes an element $s_2^k$ corresponding to the first subcarrier k and an element $-s_2^{-k}$ corresponding to the second subcarrier −k, and the user data includes first user data $Ds_{STA2}^k$ corresponding to the first subcarrier k and second user data $Ds_{STA2}^{-k}$ corresponding to the second subcarrier −k. In the elements $s_2^k$ and $s_2^{-k}$, 2 represents the second transmit channel.

Spatial mapping is performed, by using the spatial mapping matrix $[\xi_r]^{-1}[h]^{-1}[\xi_r]^{-1}$, on the elements $s_1^k$, $s_1^{-k}$, $s_1^k$, and $-s_1^{-k}$, the first user data $Ds_{STA1}^k$, and the second user data $Ds_{STA1}^{-k}$ that are to be sent to the first STA and the elements $s_2^k$, $s_2^{-k}$, $s_2^k$, and $-s_2^{-k}$, the first user data $Ds_{STA2}^k$, and the second user data $Ds_{STA2}^{-k}$ that are to be sent to the second STA. Data obtained after the spatial mapping is shown in the following second formula.

The second formula is $$H^{-1} \cdot \left[ \begin{bmatrix} s_1^k & s_1^k \\ s_1^{-k} & -s_1^{-k} \\ s_2^k & s_2^k \\ s_2^{-k} & -s_2^{-k} \end{bmatrix}, \begin{bmatrix} Ds_{STA1}^k \\ Ds_{STA1}^{-k} \\ Ds_{STA2}^k \\ Ds_{STA2}^{-k} \end{bmatrix} \right] =$$

$$[\xi_r]^{-1}[h]^{-1}[\xi_r]^{-1} \cdot \left[ \begin{bmatrix} s_1^k & s_1^k \\ s_1^{-k} & -s_1^{-k} \\ s_2^k & s_2^k \\ s_2^{-k} & -s_2^{-k} \end{bmatrix}, \begin{bmatrix} Ds_{STA1}^k \\ Ds_{STA1}^{-k} \\ Ds_{STA2}^k \\ Ds_{STA2}^{-k} \end{bmatrix} \right].$$

A first packet P1 to be sent to the first STA is generated. The first packet P1 includes the first group of elements, the second group of elements, and the user data that are obtained after the spatial mapping and that are to be sent to the first STA. A first packet P2 to be sent to the second STA is generated. The first packet P2 includes the first group of elements, the second group of elements, and the user data that are obtained after the spatial mapping and that are to be sent to the second STA.

Step 307: The first device sends the first packet to the STA by using the at least one pair of subcarriers.

The first device sends, to the either STA on the transmit channel included in the first device, the first packet to be sent to the either STA.

For example, for the first packet P1 to be sent to the first STA and the first packet P2 to be sent to the second STA, the first device respectively sends the first packets P1 and P2 to the first STA and the second STA on the first transmit channel and the second transmit channel by using the at least one pair of subcarriers. The first packets P1 and P2 include the data that is obtained after the spatial mapping and that is shown in the second formula.

Step 308: The STA receives the first packet, determines, based on the first group of elements and the second group of elements that are included in the first packet, an interference cancellation matrix corresponding to each pair of subcarriers, and uses the interference cancellation matrix corresponding to each pair of subcarriers to cancel interference in the user data in the first packet.

A gain of the first device remains unchanged. Therefore, when the first device sends data at different moments by using a first subcarrier and a second subcarrier that are included in any pair of subcarriers, a first image interference signal generated between the first subcarrier and the second subcarrier on each transmit channel of the first device remains unchanged, in other words, the first image interference signal is still $[\xi_r]$.

For the first STA, in this step, a spatial interference signal generated on the first subcarrier and the second subcarrier by the wireless transmission space between the first device and the first STA at different moments remains unchanged, in other words, the spatial interference signal is still [h]. However, a reception gain of the first STA changes. Consequently, a second image interference signal generated between the first subcarrier and the second subcarrier on the receive channel of the first STA in this step is different from the second image interference signal $[\xi_{r,1}]$ generated in step 303. The second image interference signal generated in this step may be represented as $[\xi_{r,1\_new}]$, where $$[\xi_{r,1\_new}] = \begin{bmatrix} 1 & \xi_{1,r\_new}^{-k} \\ \xi_{1,r\_new}^{-k*} & 1 \end{bmatrix}.$$

For the second STA, in this step, a spatial interference signal generated on the first subcarrier and the second subcarrier by the wireless transmission space between the first device and the second STA at different moments remains unchanged, in other words, the spatial interference signal is still [h]. However, a reception gain of the second STA changes. Consequently, a second image interference signal generated between the first subcarrier and the second subcarrier on the receive channel of the second STA in this step is different from the second image interference signal $[\xi_{r,2}]$ generated in step 303. The second image interference signal generated in this step may be represented as $[\xi_{r,2\_new}]$, where $$[\xi_{r,2\_new}] = \begin{bmatrix} 1 & \xi^{-k}_{2,r\_new} \\ \xi^{k*}_{2,r\_new} & 1 \end{bmatrix}.$$

After the first device sends the first packets P1 and P2, the first image interference signal $[\xi_r]$, the spatial interference signal $[h]$, the new second image interference signals $[\xi_{r,1\_new}]$ and $[\xi_{r,2\_new}]$ are generated in the first packets P1 and P2. The first image interference signal $[\xi_r]$, the spatial interference signal $[h]$, and the new second image interference signals $[\xi_{r,1\_new}]$ and $[\xi_{r,2\_new}]$ are superposed into the data that is included in the first packets P1 and P2 and that is shown in the second formula. The data obtained after the superposition may be shown in the following third formula.

The third formula is $$\begin{bmatrix} \xi_{r,1\_new} & 0 \\ 0 & \xi_{r,2\_new} \end{bmatrix}[h][\xi_r] \cdot [\xi_r]^{-1}[h]^{-1}[\xi_r]^{-1} \cdot \begin{bmatrix} \begin{bmatrix} s^k_1 & s^k_1 \\ s^{-k}_1 & -s^{-k}_1 \\ s^k_2 & s^k_2 \\ s^{-k}_2 & -s^{-k}_2 \end{bmatrix} \begin{bmatrix} Ds^k_{STA1} \\ Ds^{-k}_{STA1} \\ Ds^k_{STA2} \\ Ds^{-k}_{STA2} \end{bmatrix} \end{bmatrix} =$$

$$\begin{bmatrix} \xi_{r,1\_new} & 0 \\ 0 & \xi_{r,2\_new} \end{bmatrix}[\xi_r]^{-1} \cdot \begin{bmatrix} \begin{bmatrix} s^k_1 & s^k_1 \\ s^{-k}_1 & -s^{-k}_1 \\ s^k_2 & s^k_2 \\ s^{-k}_2 & -s^{-k}_2 \end{bmatrix}, \begin{bmatrix} Ds^k_{STA1} \\ Ds^{-k}_{STA1} \\ Ds^k_{STA2} \\ Ds^{-k}_{STA2} \end{bmatrix} \end{bmatrix} =$$

$$\begin{bmatrix} 1 & \xi^{-k}_{1,r\_new} & 0 & 0 \\ \xi^{k*}_{1,r\_new} & 1 & 0 & 0 \\ 0 & 0 & 1 & \xi^{-k}_{2,r\_new} \\ 0 & 0 & \xi^{k*}_{2,r\_new} & 1 \end{bmatrix}$$

$$\begin{bmatrix} 1 & \xi^{-k}_{1,r} & 0 & 0 \\ \xi^{k*}_{1,r} & 1 & 0 & 0 \\ 0 & 0 & 1 & \xi^{-k}_{2,r} \\ 0 & 0 & \xi^{k*}_{2,r} & 1 \end{bmatrix}^{-1} \cdot \begin{bmatrix} \begin{bmatrix} s^k_1 & s^k_1 \\ s^{-k}_1 & -s^{-k}_1 \\ s^k_2 & s^k_2 \\ s^{-k}_2 & -s^{-k}_2 \end{bmatrix}, \begin{bmatrix} Ds^k_{STA1} \\ Ds^{-k}_{STA1} \\ Ds^k_{STA2} \\ Ds^{-k}_{STA2} \end{bmatrix} \end{bmatrix}.$$

In the third formula, $\xi_{1,r\_new}^{k*}$ is a conjugate signal of an image interference signal newly generated on the first subcarrier k on the receive channel of the first STA, and $\xi_{1,r\_new}^{-k}$ is an image interference signal generated on the second subcarrier $-k$ on the receive channel of the first STA. $\xi_{2,r\_new}^{k*}$ is a conjugate signal of an image interference signal newly generated on the first subcarrier k on the receive channel of the second STA, and $\xi_{2,r\_new}^{-k}$ is an image interference signal generated on the second subcarrier $-k$ on the receive channel of the second STA.

It can be learned from the foregoing third formula that $$\begin{bmatrix} \xi_{r,1\_new} & 0 \\ 0 & \xi_{r,2\_new} \end{bmatrix}$$

is a block diagonal matrix and $[\xi_r]$ is also a block diagonal matrix. In this case, data in a first packet R1 received by the first STA may be shown in the following fourth formula.

The fourth formula is $$\begin{bmatrix} 1 & \xi^{-k}_{1,r\_new} \\ \xi^{k*}_{1,r\_new} & 1 \end{bmatrix} \begin{bmatrix} 1 & \xi^{-k}_{1,r} \\ \xi^{k*}_{1,r} & 1 \end{bmatrix}^{-1} \cdot \begin{bmatrix} \begin{bmatrix} s^k_1 & s^k_1 \\ s^{-k*}_1 & -s^{-k*}_1 \end{bmatrix}, \begin{bmatrix} Ds^k_{STA1} \\ Ds^{-k}_{STA1} \end{bmatrix} \end{bmatrix}.$$

Data in a first packet R2 received by the second STA may be shown in the following fifth formula.

The fifth formula is $$\begin{bmatrix} 1 & \xi^{-k}_{2,r\_new} \\ \xi^{k*}_{2,r\_new} & 1 \end{bmatrix} \begin{bmatrix} 1 & \xi^{-k}_{2,r} \\ \xi^{k*}_{2,r} & 1 \end{bmatrix}^{-1} \cdot \begin{bmatrix} \begin{bmatrix} s^k_2 & s^k_2 \\ s^{-k*}_2 & -s^{-k*}_2 \end{bmatrix}, \begin{bmatrix} Ds^k_{STA2} \\ Ds^{-k}_{STA2} \end{bmatrix} \end{bmatrix}.$$

As shown in the foregoing fourth formula, the data in the first packet R1 received by the first STA includes a first group of elements, a second group of elements, and user data in which interference exists. For a first subcarrier k and a second subcarrier $-k$ that are included in any pair of subcarriers, the first group of elements includes an element $r_{1,1}^k$ in which interference exists and that corresponds to the first subcarrier k and an element $r_{1,1}^{-k}$ in which interference exists and that corresponds to the second subcarrier $-k$, the second group of elements includes an element $r_{1,2}^k$ in which interference exists and that corresponds to the first subcarrier k and an element $r_{1,2}^{-k}$ in which interference exists and that corresponds to the second subcarrier $-k$, and the user data includes first user data $Ds_{STA1}^k$ in which interference exists and that corresponds to the first subcarrier k and second user data $Ds_{STA1}^{-k}$ in which interference exists and that corresponds to the second subcarrier $-k$.

The elements $r_{1,1}^k$, $r_{1,2}^k$, $r_{1,1}^{-k}$, and $r_{1,2}^{-k}$ in which interference exists and that are received by the first STA, the element $s_1^k$ corresponding to the first subcarrier k and the element $s_1^{-k}$ corresponding to the second subcarrier $-k$ that are in the first group of elements prestored by the first STA, and the element $S_1^k$ corresponding to the first subcarrier and the element $-S_1^{-k}$ corresponding to the second subcarrier $-k$ that are in the second group of elements prestored by the first STA may meet a relationship shown in Formula (6):

$$\begin{bmatrix} r^k_{1,1} & r^k_{1,2} \\ r^{-k*}_{1,1} & r^{-k*}_{1,2} \end{bmatrix} = \begin{bmatrix} 1 & \xi^{-k}_{1,r\_new} \\ \xi^{k*}_{1,r\_new} & 1 \end{bmatrix} \begin{bmatrix} 1 & \xi^{-k}_{1,r} \\ \xi^{k*}_{1,r} & 1 \end{bmatrix}^{-1} \begin{bmatrix} s^k_2 & s^k_2 \\ s^{-k*}_2 & -s^{-k*}_2 \end{bmatrix} \quad (6)$$

An interference cancellation matrix $W_{STA1}$ corresponding to the any pair of subcarriers of the first STA may be obtained based on Formula (6). The interference cancellation matrix $W_{STA1}$ is shown in Formula (7):

(7)

$$W_{STA1} =$$

$$\begin{bmatrix} 1 & \xi^{-k}_{1,r\_new} \\ \xi^{k*}_{1,r\_new} & 1 \end{bmatrix} \begin{bmatrix} 1 & \xi^{-k}_{1,r} \\ \xi^{k*}_{1,r} & 1 \end{bmatrix}^{-1} = \begin{bmatrix} r^k_{1,1} & r^k_{1,2} \\ r^{-k*}_{1,1} & r^{-k*}_{1,2} \end{bmatrix} \begin{bmatrix} s^k_1 & s^k_1 \\ s^{-k*}_1 & -s^{-k*}_1 \end{bmatrix}^{-1}$$

The first STA left-multiplies an inverse matrix $W_{STA1}^{-1}$ of the interference cancellation matrix by a first data matrix in which interference exists and that is included in the first packet received by the first STA, to obtain a second data matrix in which interference is canceled. The first data matrix includes the first user data $Dr_{STA1}^k$ and the second user data $Dr_{STA1}^{-k}$ in which interference exists, and the second data matrix includes first user data $Ds_{STA1}^k$ and second user data $Ds_{STA1}^{-k}$ in which interference is canceled. This is shown in Formula (8):

$$\begin{bmatrix} Ds_{STA1}^{k} \\ Ds_{STA1}^{-k*} \end{bmatrix} = W_{STA1}^{-1} \cdot \begin{bmatrix} Dr_{STA1}^{k} \\ Dr_{STA1}^{-k*} \end{bmatrix} \quad (8)$$

The first STA performs the foregoing processing on each pair of subcarriers in the foregoing manner, to cancel interference in each piece of user data in the first packet received by the first STA.

As shown in the foregoing fifth formula, the data in the first packet R2 received by the second STA includes a first group of elements, a second group of elements, and user data in which interference exists. The first group of elements includes an element $r_{2,1}^{k}$ in which interference exists and that corresponds to the first subcarrier k and an element $r_{2,1}^{-k}$ in which interference exists and that corresponds to the second subcarrier −k, the second group of elements includes an element $r_{2,2}^{k}$ in which interference exists and that corresponds to the first subcarrier k and an element $r_{2,2}^{-k}$ in which interference exists and that corresponds to the second subcarrier −k, and the user data includes first user data $Ds_{STA2}^{k}$ in which interference exists and that corresponds to the first subcarrier k and second user data $Ds_{STA2}^{-1}$ in which interference exists and that corresponds to the second subcarrier −k.

The elements $r_{2,1}^{k}$, $r_{2,2}^{k}$, $r_{2,1}^{-k}$, and $r_{2,2}^{-k}$ in which interference exists and that are in the first packet received by the second STA, the element $s_2^{k}$ corresponding to the first subcarrier k and the element $s_2^{-k}$ corresponding to the second subcarrier −k that are in the first group of elements prestored by the second STA, and the element $S_2^{k}$ corresponding to the first subcarrier k and the element $-s_2^{-k}$ corresponding to the second subcarrier −k that are in the second group of elements prestored by the second STA meet a relationship shown in Formula (9):

$$\begin{bmatrix} r_{2,1}^{k} & r_{2,2}^{k} \\ r_{2,1}^{-k*} & r_{2,2}^{-k*} \end{bmatrix} = \begin{bmatrix} 1 & \xi_{2,r\_new}^{-k} \\ \xi_{2,r\_new}^{k*} & 1 \end{bmatrix} \begin{bmatrix} 1 & \xi_{2,r}^{-k} \\ \xi_{2,r}^{k*} & 1 \end{bmatrix} \begin{bmatrix} s_2^{k} & s_2^{k} \\ s_2^{-k*} & -s_2^{-k*} \end{bmatrix} \quad (9)$$

An interference cancellation matrix $W_{STA2}$ of the second STA may be obtained based on Formula (9). The interference cancellation matrix $W_{STA2}$ of the second STA is shown in Formula (10):

$$W_{STA2} = \begin{bmatrix} 1 & \xi_{2,r\_new}^{-k} \\ \xi_{2,r\_new}^{k*} & 1 \end{bmatrix} \begin{bmatrix} 1 & \xi_{2,r}^{-k} \\ \xi_{2,r}^{k*} & 1 \end{bmatrix}^{-1} = \begin{bmatrix} r_{2,1}^{k} & r_{2,2}^{k} \\ r_{2,1}^{-k*} & r_{2,2}^{-k*} \end{bmatrix} \begin{bmatrix} s_2^{k} & s_2^{k} \\ s_2^{-k*} & -s_2^{-k*} \end{bmatrix}^{-1} \quad (10)$$

Then the second STA left-multiplies an inverse matrix $W_{STA2}^{-1}$ of the interference cancellation matrix by a first data matrix in which interference exists and that is included in the first packet received by the second STA, to obtain a second data matrix in which interference is canceled. The first data matrix includes the first user data $Dr_{STA2}^{k}$ and the second user data $Dr_{STA2}^{-k}$ in which interference exists, and the second data matrix includes first user data $Ds_{STA2}^{k}$ and second user data $Ds_{STA2}^{-k}$ in which interference is canceled. This is shown in Formula (11):

$$\begin{bmatrix} Ds_{STA2}^{k} \\ Ds_{STA2}^{-k*} \end{bmatrix} = W_{STA2}^{-1} \cdot \begin{bmatrix} Dr_{STA2}^{k} \\ Dr_{STA2}^{-k*} \end{bmatrix} \quad (11)$$

The second STA performs the foregoing processing on each pair of subcarriers in the foregoing manner, to cancel interference in each piece of user data in the first packet received by the second STA.

In this embodiment of this application, the first device generates the second packet, where the second packet includes the third group of elements and the fourth group of elements, so that each STA measures an interference cancellation coefficient between the STA and the first device based on the third group of elements and the fourth group of elements in the second packet. The first device combines the interference cancellation coefficients measured by the STAs into the joint interference cancellation coefficient, performs, based on the joint interference cancellation coefficient, spatial mapping on the first group of elements, the second group of elements, and the user data that are to be sent to the either STA, generates the first packet including the first group of elements, the second group of elements, and the user data that are obtained after the spatial mapping, and sends the first packet to the either STA by using the at least one pair of subcarriers. In this case, after receiving the first packet, the STA performs interference cancellation on the user data in the first packet based on the first group of elements and the second group of elements in which interference exists and that are included in the first packet. Because spatial mapping is performed, by using the joint interference cancellation coefficient, on the first group of elements, the second group of elements, and the user data that are to be sent to the either STA, in the MU-MIMO scenario, the STA can successfully use the first group of elements and the second group of elements to cancel the interference in the user data. Because the STA can cancel, by using the first group of elements and the second group of elements, the interference in the user data included in the first packet, in other words, the interference in the user data can be canceled without hardware, a hardware circuit configured to cancel interference does not need to be disposed in the STA, so that costs of the STA are reduced. Because the STA can cancel the interference in the user data, accuracy of receiving the user data can be further improved.

Figure 12:
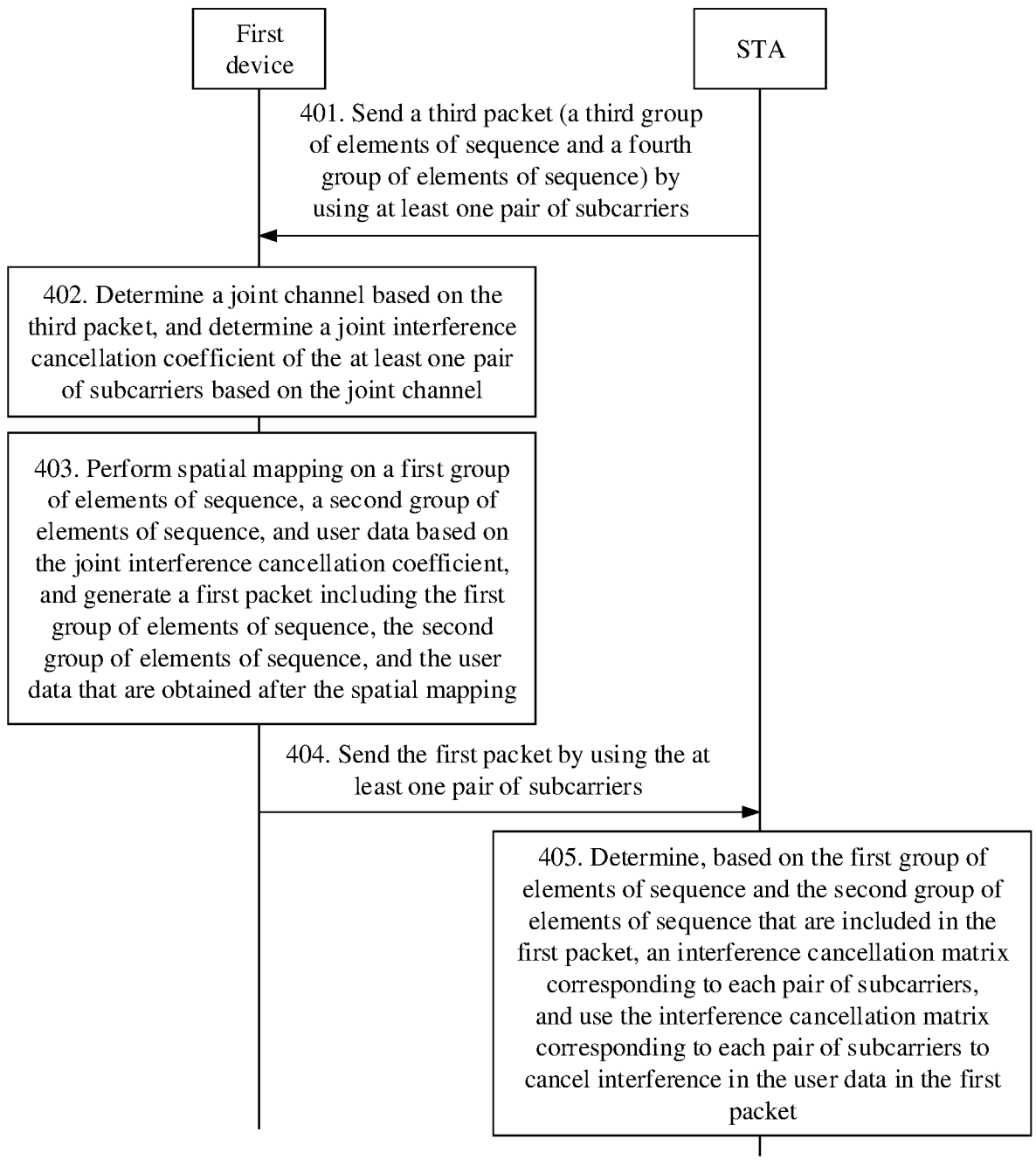
FIG. 12 is a flowchart of another interference cancellation method according to an embodiment of this application.

For the interference cancellation method shown in FIG. 9, this application describes an example in which the method is applied to the MU-MIMO network architecture shown in FIG. 7. In this example, the MU-MIMO network architecture includes a first device, a first STA, and a second STA. The first device is a network side device. It is assumed that the first device includes a first transmit channel and a second transmit channel, the first STA includes one receive channel, and the second STA includes one receive channel. In the MU-MIMO network architecture, before sending user data to the first STA and the second STA, the first device determines a joint channel between the first device and both the first STA and the second STA, determines a joint interference cancellation coefficient of at least one pair of subcarriers based on the joint channel, and then sends the user data to the first STA and the second STA based on the joint interference cancellation coefficient. Referring to FIG. 12, the interference cancellation method in this example includes the following steps.

Step 401: Either of the two STAs sends a third packet to the first device by using the at least one pair of subcarriers, where the third packet includes a third group of elements and a fourth group of elements, and the third group of elements is different from the fourth group of elements.

The third packet may be an NDP, and the NDP includes a third group of elements and a fourth group of elements.

For the first STA, in this step, the first STA generates a third packet. The third packet includes a third group of elements and a fourth group of elements. For a first subcarrier k and a second subcarrier −k that are included in any pair of subcarriers, the third group of elements includes an element corresponding to the first subcarrier k and an element corresponding to the second subcarrier −k, and the fourth group of elements includes an element corresponding to the first subcarrier k and an element corresponding to the second subcarrier −k. The first STA sends the third packet to the first device by using the at least one pair of subcarriers.

For example, the third group of elements includes an element $s_1^k$ corresponding to the first subcarrier k and an element $s_1^{-k}$ corresponding to the second subcarrier −k, and the fourth group of elements includes an element $s_1^{-k}$ corresponding to the first subcarrier k and an element $-s_1^{-k}$ corresponding to the second subcarrier −k. The first STA sends the third packet including the elements $s_1^k$, $s_1^{-k}$, $s_1^k$, and $-s_1^{-1}$ to the first device by using the at least one pair of subcarriers.

For the second STA, in this step, the second STA generates a third packet. The third packet includes a third group of elements and a fourth group of elements. For a first subcarrier k and a second subcarrier −k that are included in any pair of subcarriers, the third group of elements includes an element $s_2^k$ corresponding to the first subcarrier k and an element $s_2^{-k}$ corresponding to the second subcarrier −k, and the fourth group of elements includes an element $s_2^k$ corresponding to the first subcarrier k and an element $-s_2^{-k}$ corresponding to the second subcarrier −k. The second STA sends the third packet including the elements $s_2^k$, $s_2^{-k}$, $s_2^k$, and $-s_2^{-k}$ to the first device by using the at least one pair of subcarriers.

Step 402: The first device receives a third packet sent by each STA, determines the joint channel between the first device and the two STAs based on each third packet, and determines the joint interference cancellation coefficient of the at least one pair of subcarriers based on the joint channel.

For the third packet sent by the first STA and a first subcarrier k and a second subcarrier −k that are included in any pair of subcarriers, the first device receives a third packet R11 on a first receive channel by using the at least one pair of subcarriers, and receives a third packet R12 on a second receive channel by using the at least one pair of subcarriers. The third packet R11 includes a third group of elements and a fourth group of elements in which interference exists. The first device obtains, from the third group of elements included in the third packet R11, an element $rr_{1,1,1}^k$ in which interference exists and that corresponds to the first subcarrier k and an element $rr_{1,1,1}^{-k}$ in which interference exists and that corresponds to the second subcarrier −k, and obtains, from the fourth group of elements included in the third packet R11, an element $rr_{1,1,2}^k$ corresponding to the first subcarrier k and an element $rr_{1,1,2}^{-k}$ in which interference exists and that corresponds to the second subcarrier −k. In addition, the first device prestores elements $s_1^k$, $s_1^k$, $s_1^{-k}$, and $-s_1^{-k}$ respectively corresponding to the elements $rr_{1,1,1}^k$, $rr_{1,1,2}^k$, $rr_{1,1,1}^{-k}$, and $rr_{1,1,2}^{-k}$ in which interference exists. The third packet R12 includes a third group of elements and a fourth group of elements in which interference exists. The first device obtains, from the third group of elements included in the third packet R12, an element $rr_{1,2,1}^k$ in which interference exists and that corresponds to the first subcarrier k and an element $rr_{1,2,1}^{-k}$ in which interference exists and that corresponds to the second subcarrier −k, and obtains, from the fourth group of elements included in the third packet R12, an element $rr_{1,2,2}^k$ corresponding to the first subcarrier k and an element $rr_{1,2,2}^{-k}$ in which interference exists and that corresponds to the second subcarrier −k. In addition, the elements $rr_{1,2,1}^k$, $rr_{1,2,1}^{-k}$, $rr_{1,2,2}^k$, and $rr_{1,2,2}^{-k}$ in which interference exists respectively correspond to the elements $s_1^k$, $s_1^k$, $s_1^{-k}$, and $-s_1^{-k}$.

For the third packet sent by the second STA and a first subcarrier k and a second subcarrier −k that are included in any pair of subcarriers, the first device receives a third packet R21 on the first receive channel by using the at least one pair of subcarriers, and receives a third packet R22 on the second receive channel by using the at least one pair of subcarriers. The third packet R21 includes a third group of elements and a fourth group of elements in which interference exists. The first device obtains, from the third group of elements in the third packet R21, an element $rr_{2,1,1}^k$ in which interference exists and that corresponds to the first subcarrier k and an element $rr_{2,1,1}^{-k}$ in which interference exists and that corresponds to the second subcarrier −k, and obtains, from the fourth group of elements in the third packet, an element $rr_{2,1,2}^k$ corresponding to the first subcarrier k and an element $rr_{2,1,2}^{-k}$ in which interference exists and that corresponds to the second subcarrier −k. In addition, the first device prestores elements $s_2^k$, $s_2^k$, $s_2^{-k}$, and $-s_2^{-k}$ respectively corresponding to the elements $rr_{2,1,1}^k$, $rr_{2,1,2}^k$, $rr_{2,1,1}^{-k}$, and $rr_{2,1,2}^{-k}$. The first device obtains, from a third group of elements in the third packet R22, an element $rr_{2,2,1}^k$ in which interference exists and that corresponds to the first subcarrier k and an element $rr_{2,2,1}^{-k}$ in which interference exists and that corresponds to the second subcarrier −k, and obtains, from a fourth group of elements included in the third packet, an element $rr_{2,2,2}^k$ corresponding to the first subcarrier k and an element $rr_{2,2,2}^{-k}$ in which interference exists and that corresponds to the second subcarrier −k. In addition, the elements $rr_{2,2,1}^k$, $rr_{2,2,1}^{-k}$, $rr_{2,2,2}^k$, and $rr_{2,2,2}^{-k}$ respectively correspond to the elements $s_2^k$, $s_2^k$, $s_2^{-k}$, and $-s_2^{-k}$.

The first device may determine the joint channel $H_{up}$ between the first device and the two STAs (the first STA and the second STA), as shown in Formula (12):

$$H_{up} = \begin{bmatrix} h_{11up}^k & 0 & h_{12up}^k & 0 \\ 0 & h_{11up}^{-k*} & 0 & h_{12up}^{-k*} \\ h_{21up}^k & 0 & h_{22up}^k & 0 \\ 0 & h_{21up}^{-k*} & 0 & h_{22up}^{-k*} \end{bmatrix}^T \quad (12)$$

$[\ ]^T$ represents a transpose of a matrix. $H_{11up}^k$ is a spatial interference signal generated on the first subcarrier k by a channel between the first transmit channel and the first STA. $h_{11up}^{-k*}$ is a conjugate signal of a spatial interference signal generated on the second subcarrier −k by the channel between the first transmit channel and the first STA. $h_{11up}^k$ and $h_{11up}^{-k*}$ are respectively shown in the following formulas:

$$\begin{cases} h_{11up}^k = (rr_{1,1,1}^k + r_{1,1,2}^k)/(2s_1^k) \\ h_{11up}^{-k*} = (rr_{1,1,1}^{-k} - r_{1,1,2}^{-k})/(2s_1^{-k}) \end{cases}$$

$h_{12up}^k$ is a spatial interference signal generated on the first subcarrier k by a channel between the second transmit channel and the first STA. $h_{12up}^{-k*}$ is a conjugate signal of a spatial interference signal generated on the second subcarrier −k by the channel between the second transmit channel and the first STA. $h_{12up}^{k}$ and $h_{12up}^{-k*}$ are respectively shown in the following formulas:

$$\begin{cases} h_{12up}^{k} = (rr_{1,2,1}^{k} + r_{1,1,2}^{k})/(2s_1^k) \\ h_{12up}^{-k*} = (rr_{1,2,1}^{-k} - r_{1,2,2}^{-k})/(2s_1^{-k}) \end{cases}$$

$h_{21up}^{k}$ is a spatial interference signal generated on the first subcarrier k by a channel between the first transmit channel and the second STA. $h_{21up}^{-k*}$ is a conjugate signal of a spatial interference signal generated on the second subcarrier −k by the channel between the first transmit channel and the second STA. $h_{21up}^{k}$ and $h_{21up}^{-k*}$ are respectively shown in the following formulas:

$$\begin{cases} h_{21up}^{k} = (rr_{2,1,1}^{k} + r_{2,1,2}^{k})/(2s_2^k) \\ h_{21up}^{-k*} = (rr_{2,1,1}^{-k} - r_{2,1,2}^{-k})/(2s_2^{-k}) \end{cases}$$

$h_{22up}^{k}$ is a spatial interference signal generated on the first subcarrier k by a channel between the second transmit channel and the second STA. $h_{22up}^{-k*}$ is a conjugate signal of a spatial interference signal generated on the second subcarrier −k by the channel between the second transmit channel and the second STA. $h_{22up}^{k}$ and $h_{22up}^{-k*}$ are respectively shown in the following formulas:

$$\begin{cases} h_{22up}^{k} = (rr_{2,2,1}^{k} + r_{2,2,2}^{k})/(2s_2^k) \\ h_{2up}^{-k*} = (rr_{2,2,1}^{-k} - r_{2,2,2}^{-k})/(2s_2^{-k}) \end{cases}$$

Then the measured joint channel $H_{up}$ multiplied by an uplink-downlink calibration coefficient matrix to obtain the joint interference cancellation coefficient $H_{down}$.

Step 403: The first device performs, based on the joint interference cancellation coefficient, spatial mapping on a first group of elements, a second group of elements, and user data that are to be sent to the STA, and generates a first packet to be sent to the STA, where the first packet includes the first group of elements, the second group of elements, and the user data that are obtained after the spatial mapping.

In this step, a spatial mapping matrix is obtained based on the joint interference cancellation coefficient, and spatial mapping is performed, based on the spatial mapping matrix, on the first group of elements, the second group of elements, and the user data that are to be sent to the either STA. The first packet to be sent to the either STA is generated. The first packet includes the first group of elements, the second group of elements, and the user data that are obtained after the spatial mapping.

Optionally, the joint interference cancellation coefficient $H_{down}$ is a matrix, and an inverse operation is performed on the matrix $H_{down}$ to obtain an inverse matrix $H_{down}^{-1}$. The inverse matrix $H_{down}^{-1}$ is a spatial mapping matrix.

For example, for a first subcarrier k and a second subcarrier −k that are included in any pair of subcarriers and a first group of elements, a second group of elements, and user data that are to be sent to the first STA, the first group of elements includes an element $s_1^k$ corresponding to the first subcarrier k and an element $s_1^{-k}$ corresponding to the second subcarrier −k, the second group of elements includes an element $s_1^k$ corresponding to the first subcarrier k and an element $-s_1^{-k}$ corresponding to the second subcarrier −k, and the user data includes first user data $Ds_{STA1}^{k}$ corresponding to the first subcarrier −k and second user data $Ds_{STA1}^{-k}$ corresponding to the second subcarrier −k. In the elements $s_1^k$ and $s_1^{-k}$, 1 represents the first STA. For a first group of elements, a second group of elements, and user data that are to be sent to the second STA, it is assumed that the first group of elements includes an element $s_2^k$ corresponding to the first subcarrier k and an element $s_2^{-k}$ corresponding to the second subcarrier −k, the second group of elements includes an element $s_2^k$ corresponding to the first subcarrier k and an element $-s_2^{-k}$ corresponding to the second subcarrier −k, and the user data includes first user data $Ds_{STA2}^{k}$ corresponding to the first subcarrier k and second user data $Ds_{STA2}^{-k}$ corresponding to the second subcarrier −k. In the elements $s_2^k$ and $s_2^{-k}$, 2 represents the second STA.

Spatial mapping is performed, by using the spatial mapping matrix $H_{down}^{-1}$, on the elements $s_1^k$, $s_1^{-k}$, $s_1^k$, and $-s_1^{-k}$, the first user data $Ds_{STA1}^{k}$, and the second user data $Ds_{STA1}^{-k}$ that are to be sent to the first STA and the elements $s_2^k$, $s_2^{-k}$, $s_2^k$, and $-s_2^{-k}$, the first user data $Ds_{STA2}^{k}$, and the second user data $Ds_{STA2}^{-k}$ that are to be sent to the second STA. Data obtained after the spatial mapping is shown in the following sixth formula.

The sixth formula is $$H_{down}^{-1} \cdot \left[ \begin{bmatrix} s_1^k & s_1^k \\ s_1^{-k} & -s_1^{-k} \\ s_2^k & s_2^k \\ s_2^{-k} & -s_2^{-k} \end{bmatrix}, \begin{bmatrix} Ds_{STA1}^{k} \\ Ds_{STA1}^{-k} \\ Ds_{STA2}^{k} \\ Ds_{STA2}^{-k} \end{bmatrix} \right].$$

A first packet P1 to be sent to the first STA is generated. The first packet P1 includes the first group of elements, the second group of elements, and the user data that are obtained after the spatial mapping and that are to be sent to the first STA. A first packet P2 to be sent to the second STA is generated. The first packet P2 includes the first group of elements, the second group of elements, and the user data that are obtained after the spatial mapping and that are to be sent to the second STA.

Step 404: The first device sends the first packet to the STA by using the at least one pair of subcarriers.

Step 405: The STA receives the first packet, determines, based on the first group of elements and the second group of elements that are included in the first packet, an interference cancellation matrix corresponding to each pair of subcarriers, and uses the interference cancellation matrix corresponding to each pair of subcarriers to cancel interference in the user data in the first packet.

It should be noted that calibration compensation has been performed on the first transmit channel and the second transmit channel of the first device, and mutual image interference generated between the first subcarrier and the second subcarrier on the first transmit channel and the second transmit channel is relatively small, and can be ignored.

For the first STA and the second STA and a first subcarrier k and a second subcarrier −k that are included in any pair of subcarriers, a spatial interference signal generated on the first subcarrier k and the second subcarrier −k by wireless transmission space between the first device and both the first STA and the second STA at different moments remains unchanged, and the spatial interference signal may be represented as $[h_{down\_real}]$. A second image interference signal is generated between the first subcarrier k and the second subcarrier −k on the receive channel of the first STA. The second image interference signal may be represented as $[\xi_{r\_STA1}]$. The second image interference signal $[\xi_{r\_STA1}]$ includes a second image interference signal $\xi_{r\_STA1}^{k}$ generated on the first subcarrier k and a second image interference signal $\xi_{r\_STA1}^{-k}$ generated on the second subcarrier −k. For the second STA, a second image interference signal is generated between the first subcarrier and the second subcarrier on the receive channel of the second STA. The second image interference signal may be represented as $[\xi_{r\_STA2}]$. The second image interference signal $[\xi_{r\_STA2}]$ includes a second image interference signal $\xi_{r\_STA2}^{k}$ generated on the first subcarrier k and a second image interference signal $\xi_{r\_STA2}^{-k}$ generated on the second subcarrier −k.

After the first device sends the first packets P1 and P2, the spatial interference signal $[h_{down\_real}]$ and the second image interference signals $[\xi_{r\_STA1}]$ and $[\xi_{r\_STA2}]$ are generated in the first packets P1 and P2. The spatial interference signal [h] and the second image interference signals $[\xi_{r\_STA1}]$ and $[\xi_{r\_STA2}]$ are superposed into data included in the first packets P1 and P2. The data obtained after the superposition may be shown the following seventh formula:

The seventh formula is $$\begin{bmatrix} \xi_{r\_STA1} & 0 \\ 0 & \xi_{r\_STA2} \end{bmatrix} [h_{down\_real}] H_{down}^{-1} \cdot \begin{bmatrix} \begin{bmatrix} s_1^k & s_1^k \\ s_1^{-k} & -s_1^{-k} \end{bmatrix} \\ \begin{bmatrix} s_2^k & s_2^k \\ s_2^{-k} & -s_2^{-k} \end{bmatrix} \end{bmatrix},$$

$$\begin{bmatrix} \begin{bmatrix} Ds_{STA1}^k \\ Ds_{STA1}^{-k} \\ Ds_{STA2}^k \\ Ds_{STA2}^{-k} \end{bmatrix} \end{bmatrix} = \begin{bmatrix} \xi_{r\_STA1} & 0 \\ 0 & \xi_{r\_STA2} \end{bmatrix} \cdot \begin{bmatrix} \begin{bmatrix} s_1^k & s_1^k \\ s_1^{-k} & -s_1^{-k} \end{bmatrix}, \begin{bmatrix} Ds_{STA1}^k \\ Ds_{STA1}^{-k} \\ Ds_{STA2}^k \\ Ds_{STA2}^{-k} \end{bmatrix} \end{bmatrix} =$$

$$\begin{bmatrix} 1 & \xi_{r\_STA1}^{-k} & 0 & 0 \\ \xi_{r\_STA1}^{k*} & 1 & 0 & 0 \\ 0 & 0 & 1 & \xi_{r\_STA2}^{-k} \\ 0 & 0 & \xi_{r\_STA2}^{k*} & 1 \end{bmatrix} \cdot \begin{bmatrix} \begin{bmatrix} s_1^k & s_1^k \\ s_1^{-k} & -s_1^{-k} \end{bmatrix}, \begin{bmatrix} Ds_{STA1}^k \\ Ds_{STA1}^{-k} \\ Ds_{STA2}^k \\ Ds_{STA2}^{-k} \end{bmatrix} \end{bmatrix}.$$

In the foregoing seventh formula, $[h_{down\_real}] H_{down}^{-1}$ is a diagonal matrix, and does not affect reception of packets by the first STA and the second STA. Therefore, the diagonal matrix can be ignored. However, $$\begin{bmatrix} \xi_{r\_STA1} & 0 \\ 0 & \xi_{r\_STA2} \end{bmatrix}$$

is a block diagonal matrix, and therefore data in a first packet R1 received by the first STA may be shown in the following eighth formula.

The eighth formula is $$\begin{bmatrix} 1 & \xi_{r\_STA1}^{-k} \\ \xi_{r\_STA1}^{k*} & 1 \end{bmatrix} \cdot \begin{bmatrix} \begin{bmatrix} s_1^k & s_1^k \\ s_1^{-k} & -s_1^{-k} \end{bmatrix}, \begin{bmatrix} Ds_{STA1}^k \\ Ds_{STA1}^{-k} \end{bmatrix} \end{bmatrix}.$$

Data in a first packet R2 received by the second STA may be shown in the following ninth formula.

The ninth formula is $$\begin{bmatrix} 1 & \xi_{r\_STA2}^{-k} \\ \xi_{r\_STA2}^{k*} & 1 \end{bmatrix} \cdot \begin{bmatrix} \begin{bmatrix} s_2^k & s_2^k \\ s_2^{-k} & -s_2^{-k} \end{bmatrix}, \begin{bmatrix} Ds_{STA2}^k \\ Ds_{STA2}^{-k} \end{bmatrix} \end{bmatrix}.$$

As shown in the foregoing eighth formula, the data in the first packet R1 received by the first STA includes elements $r_{1,1}^{k}, r_{1,2}^{k}, r_{1,1}^{-k}$, and $r_{1,2}^{-k}$ in which interference exists. The element $s_1^k$ corresponding to the first subcarrier k and the element $s_1^{-k}$ corresponding to the second subcarrier −k that are in the first group of elements prestored by the first STA and the element $s_1^k$ corresponding to the first subcarrier k and the element $s_1^{-k}$ corresponding to the second subcarrier −k that are in the second group of elements prestored by the first STA meet a relationship shown in Formula (13):

$$\begin{bmatrix} r_{1,1}^k & r_{1,2}^k \\ r_{1,1}^{-k*} & -r_{1,2}^{-k*} \end{bmatrix} = \begin{bmatrix} 1 & \xi_{r\_STA1}^{-k} \\ \xi_{r\_STA1}^{k*} & 1 \end{bmatrix} \begin{bmatrix} s_1^k & s_1^k \\ s_1^{-k*} & -s_1^{-k*} \end{bmatrix} \quad (13)$$

An interference cancellation matrix $W_{STA1}$ of the first STA may be obtained based on Formula (13). The interference cancellation matrix $W_{STA1}$ of the first STA is shown in Formula (14):

$$W_{STA1} = \begin{bmatrix} 1 & \xi_{r\_STA1}^{-k} \\ \xi_{r\_STA1}^{k*} & 1 \end{bmatrix} = \begin{bmatrix} r_{1,1}^k & r_{1,2}^k \\ r_{1,1}^{-k*} & -r_{1,2}^{-k*} \end{bmatrix} \begin{bmatrix} s_1^k & s_1^k \\ s_1^{-k*} & -s_1^{-k*} \end{bmatrix}^{-1} \quad (14)$$

The first STA left-multiplies an inverse matrix $W_{STA1}^{-1}$ of the interference cancellation matrix by a first data matrix in which interference exists and that is included in the first packet received by the first STA, to obtain a second data matrix in which interference is canceled. The first data matrix includes the first user data $Dr_{STA1}^{k}$ and the second user data $Dr_{STA1}^{-k}$ in which interference exists, and the second data matrix includes first user data $Ds_{STA1}^{k}$ and second user data $Ds_{STA1}^{-k}$ in which interference is canceled. This is shown in Formula (15):

$$\begin{bmatrix} Ds_{STA1}^k \\ Ds_{STA1}^{-k*} \end{bmatrix} = W_{STA1}^{-1} \cdot \begin{bmatrix} Dr_{STA1}^k \\ Dr_{STA1}^{-k*} \end{bmatrix} \quad (15)$$

The first STA performs the foregoing processing on user data corresponding to each pair of subcarriers, to cancel interference in the user data in the first packet.

As shown in the foregoing ninth formula, data in the first packet R2 received by the second STA includes a first group of elements, a second group of elements, and user data in which interference exists. The first group of elements includes an element $r_{2,1}^{k}$ in which interference exists and that corresponds to the first subcarrier k and an element $r_{2,1}^{-k}$ in which interference exists and that corresponds to the second subcarrier −k, the second group of elements includes an element $r_{2,2}^{k}$ in which interference exists and that corresponds to the first subcarrier k and an element $r_{2,2}^{-k}$ in which interference exists and that corresponds to the second subcarrier −k, and the user data includes first user data $Ds_{STA2}^{k}$ in which interference exists and that corresponds to the first subcarrier k and second user data $Ds_{STA2}^{-k}$ in which interference exists and that corresponds to the second subcarrier −k.

The elements $r_{2,1}^k$, $r_{2,2}^k$, $r_{2,2}^{-k}$, and $r_{2,2}^{-k}$ in which interference exists and that are received by the second STA, the element $s_2^k$ corresponding to the first subcarrier k and the element $s_2^{-k}$ corresponding to the second subcarrier −k that are in the first group of elements prestored by the second STA, and the element $s_2^k$ corresponding to the first subcarrier k and the element $-s_2^{-k}$ corresponding to the second subcarrier −k that are in the second group of elements prestored by the second STA meet a relationship shown in Formula (17):

$$\begin{bmatrix} r_{2,1}^k & r_{2,2}^k \\ r_{2,1}^{-k} & -r_{2,2}^{-k} \end{bmatrix} = \begin{bmatrix} 1 & \xi_{r\_STA2}^{-k} \\ \xi_{r\_STA2}^{k*} & 1 \end{bmatrix} \begin{bmatrix} s_2^k & s_2^k \\ s_2^{-k*} & -s_2^{-k*} \end{bmatrix} \quad (17)$$

An interference cancellation matrix $W_{STA2}$ of the second STA may be obtained based on Formula (17). The interference cancellation matrix $W_{STA2}$ of the second STA is shown in Formula (18):

$$W_{STA2} = \begin{bmatrix} 1 & \xi_{r\_STA2}^{-k} \\ \xi_{r\_STA2}^{k*} & 1 \end{bmatrix} = \begin{bmatrix} r_{2,1}^k & r_{2,2}^k \\ r_{2,1}^{-k*} & r_{2,2}^{-k*} \end{bmatrix} \begin{bmatrix} s_2^k & s_2^k \\ s_2^{-k*} & -s_2^{-k*} \end{bmatrix}^{-1} \quad (18)$$

The second STA left-multiplies an inverse matrix $W_{STA2}^{-1}$ of the interference cancellation matrix of the second STA by a first data matrix in which interference exists and that is included in the first packet received by the second STA, to obtain a second data matrix in which interference is canceled. The first data matrix includes the first user data $Dr_{STA2}^k$ in which interference exists and that corresponds to the first subcarrier k and the second user data $Dr_{STA2}^{-k}$ in which interference exists and that corresponds to the second subcarrier −k, and the second data matrix includes first user data $Ds_{STA2}^k$ in which interference is canceled and that corresponds to the first subcarrier k and second user data $Ds_{STA2}^{-k}$ in which interference exists and that corresponds to the second subcarrier −k. This is shown in Formula (19):

$$\begin{bmatrix} Ds_{STA2}^k \\ Ds_{STA2}^{-k*} \end{bmatrix} = W_{STA2}^{-1} \cdot \begin{bmatrix} Dr_{STA2}^k \\ Dr_{STA2}^{-k*} \end{bmatrix} \quad (19)$$

In this embodiment of this application, the first device receives, by using the at least one pair of subcarriers, the third packet sent by each STA, where the third packet includes the third group of elements and the fourth group of elements, determines the joint channel between the first device and the plurality of STAs based on the third group of elements and the fourth group of elements that are included in the third packet sent by each of the plurality of second devices, and obtains the joint interference cancellation coefficient of the at least one pair of subcarriers based on the joint channel. The first device performs, based on the joint interference cancellation coefficient, spatial mapping on the first group of elements, the second group of elements, and the user data that are to be sent to the either STA, generates the first packet including the first group of elements, the second group of elements, and the user data that are obtained after the spatial mapping, and sends the first packet to the either STA by using the at least one pair of subcarriers. In this case, after receiving the first packet, the STA performs interference cancellation on the user data in the first packet based on the first group of elements and the second group of elements in which interference exists. Because the STA can cancel, by using the first group of elements and the second group of elements, the interference in the user data included in the first packet, in other words, the interference in the user data can be canceled without hardware, a hardware circuit configured to cancel interference does not need to be disposed in the STA, so that costs and power consumption of the STA are reduced. Because the STA can cancel the interference in the user data, accuracy of receiving the user data can be further improved.

Figure 13:
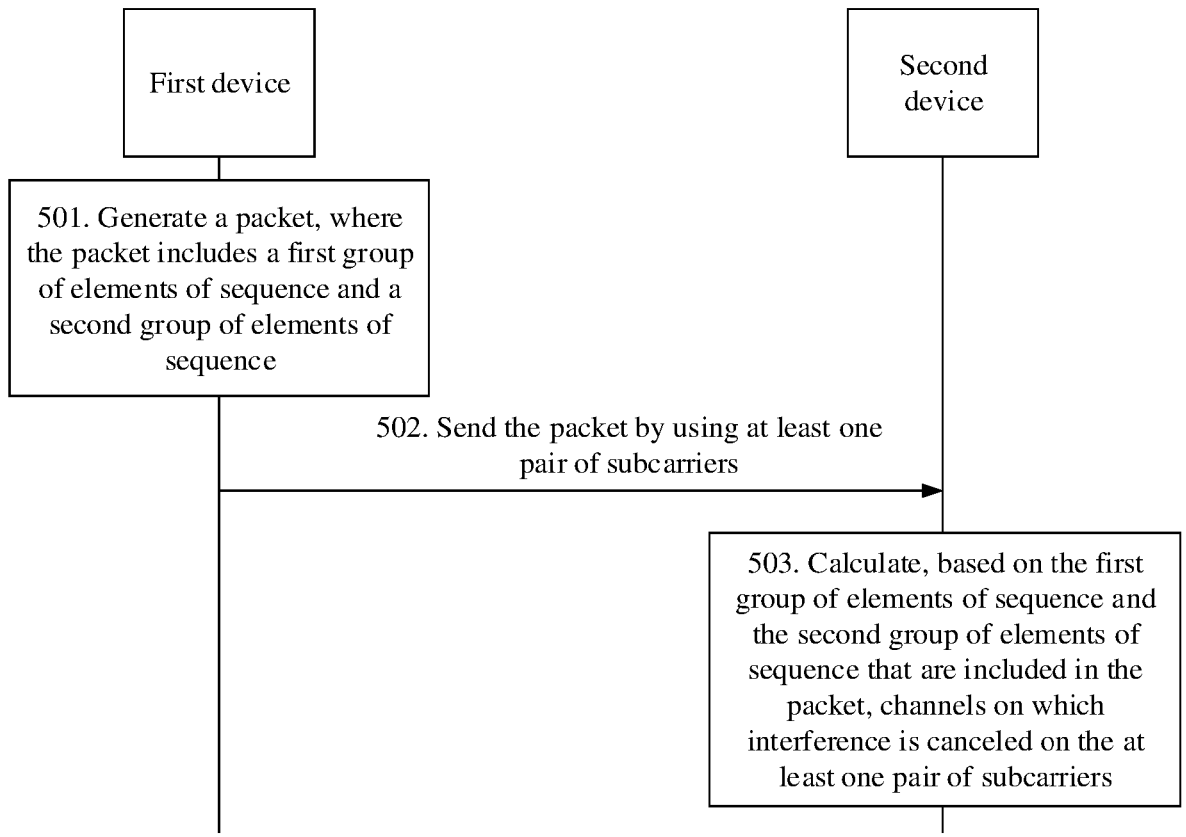
FIG. 13 is a flowchart of another interference cancellation method according to an embodiment of this application.

Referring to FIG. 13, an embodiment of this application provides an interference cancellation method. The method is applied to the network architectures shown in FIG. 1 to FIG. 3. In the method, a first device may measure a channel on which interference is canceled between the first device and a second device. Both the first device and the second device may work in an OFDM mode, the first device occupies each subcarrier in at least one pair of subcarriers, and the second device also occupies each subcarrier in the at least one pair of subcarriers. The first device may be a network side device, and the second device may be a terminal device; or the first device is a terminal device, and the second device is a network side device. Referring to FIG. 13, the method procedure includes the following steps.

Step 501: The first device generates a packet, where the packet includes a first group of elements and a second group of elements.

Any one of the at least one pair of subcarriers includes a first subcarrier and a second subcarrier, the first group of elements includes an element corresponding to the first subcarrier and an element corresponding to the second subcarrier, and the second group of elements includes an element corresponding to the first subcarrier and an element corresponding to the second subcarrier. The element that is in the first group of elements and that corresponds to the first subcarrier is the same as the element that is in the second group of elements and that corresponds to the first subcarrier, and a symbol of the element that is in the first group of elements and that corresponds to the second subcarrier is opposite to a symbol of the element that is in the second group of elements and that corresponds to the second subcarrier.

In this step, the first device may obtain the first group of elements. The first group of elements includes the element corresponding to the first subcarrier and the element corresponding to the second subcarrier. The first device copies the element that is in the first group of elements and that corresponds to the first subcarrier, to obtain the element that is in the second group of elements and that corresponds to the first subcarrier. The first device obtains an element whose symbol is opposite to that of the element that is in the first group of elements and that corresponds to the second subcarrier, and uses the obtained element as the element that is in the second group of elements and that corresponds to the second subcarrier.

For example, for a first subcarrier k and a second subcarrier −k that are included in any pair of subcarriers, the first group of elements obtained by the first device includes an element $S_k$ corresponding to the first subcarrier k and an element $S_{-k}$ corresponding to the second subcarrier −k. The second group of elements generated by the first device based on the first group of elements includes an element $S_k$ corresponding to the first subcarrier k and an element $-S_{-k}$ corresponding to the second subcarrier −k.

Optionally, the first device may be a network side device, and the second device may be a terminal device, or the first device is a terminal device, and the second device is a network side device. The network side device may be a base station, an AP, or the like, and the terminal device may be a STA or the like.

In this embodiment of this application, two channel measurement modes are defined: an implicit mode and an explicit mode.

When the implicit mode is used, the first device may be a terminal device (for example, a STA), and the second device may be a network side device (for example, an AP or a base station). Before step 501, the second device sends a trigger frame to the first device. The trigger frame includes measurement indication information, and the measurement indication information is used to indicate the first device to perform channel measurement. After receiving the trigger frame, the first device performs this step according to the indication of the measurement indication information in the trigger frame.

Figure 14:
FIG. 14 is a schematic diagram of a structure of a trigger frame according to an embodiment of this application.

Optionally, referring to a structure of a trigger frame shown in FIG. 14, the trigger frame includes a common information (Common Info) field or a user information field (User Info field), and the Common Info field or the User Info field includes the measurement indication information.

Optionally, the trigger frame may include at least one User Info field, and each User Info field corresponds to one first device. The second device may determine at least one first device that needs to perform channel measurement. A User Info field that is in the trigger frame and that corresponds to each first device includes the measurement indication information. In this case, the second device sends the trigger frame to each of the at least one first device. Any of the at least one first device receives the trigger frame, reads the measurement indication information from a User Info field that is in the trigger frame and that corresponds to the any first device, determines, according to an indication of the measurement indication information, to perform channel measurement, and starts to perform this step.

Figure 15:
FIG. 15 is a schematic diagram of a structure of a common information field according to an embodiment of this application.
Figure 16:
FIG. 16 is a schematic diagram of a value of a reserved field according to an embodiment of this application.

Optionally, referring to a structure of a Common Info field shown in FIG. 15, the Common Info field includes a trigger type field. Referring to FIG. 16, a Trigger Type field may indicate 16 values, and the 16 values are 0, 1, 2, . . . , and 15, where 8 to 15 are reserved values. In this step, a value may be selected from the values 8 to 15 as the measurement indication information.

Optionally, referring to a User Info field shown in FIG. 17, the User Info field includes a reserved field or a trigger dependent user information (Trigger Dependent User Info) field. The reserved field or the Trigger Dependent User Info field may be used to include the measurement indication information.

When the explicit mode is used, the first device may be a network device, and the second device may be a terminal device. Before step 501, the first device maintains function information of a second device accessing the first device, and sends an NDP announcement (NDPA) packet to a second device supporting channel measurement. The NDPA packet includes measurement indication information, and the measurement indication information is used to indicate the first device to send a packet in an interference cancellation mode to the second device after the first device sends the NDPA packet. The first device performs this step after sending the NDPA packet.

Optionally, the packet generated by the first device is an NDP. The NDP includes a first group of elements and a second group of elements.

Step 502: The first device sends the packet to the second device by using the at least one pair of subcarriers.

The first device may send, on a transmit channel included in the first device, the packet to the second device by using the at least one pair of subcarriers.

Step 503: The second device receives the packet by using the at least one pair of subcarriers, and calculates, based on the first group of elements and the second group of elements that are included in the packet, channels on which interference is canceled on the at least one pair of subcarriers.

The second device may receive, on a receive channel included in the second device, the packet by using the at least one pair of subcarriers.

For a first subcarrier k and a second subcarrier −k that are included in any pair of subcarriers, the packet received by the second device includes the first group of elements and the second group of elements in which interference exists. The first group of elements includes an element $R_{k(LTF1)}$ in which interference exists and that corresponds to the first subcarrier k and an element $R_{-k(LTF1)}$ in which interference exists and that corresponds to the second subcarrier −k, and the second group of elements includes an element $R_{k(LTF2)}$ corresponding to the first subcarrier k and an element $R_{-k(LTF2)}$ corresponding to the second subcarrier −k.

In this case, channels on which interference is canceled on the first subcarrier k and the second subcarrier −k are calculated based on the elements $R_{k(LTF1)}$ and $R_{k(LTF2)}$ corresponding to the first subcarrier k and the elements $R_{-k\ (LTF1)}$ and $R_{-k\ (LTF2)}$ corresponding to the second subcarrier −k and according to Formula (20):

$$\begin{cases} H_k = (R_{k(LTF1)} + R_{k(LTF2)})/(2S_k) \\ H_{-k} = (R_{-k(LTF1)} - R_{-k(LTF2)})/(2S_{-k}) \end{cases} \quad (20)$$

In Formula (20), $H_k$ is a channel on which interference is canceled on the first subcarrier k, $H_{-k}$ is a channel on which interference is canceled on the second subcarrier −k, $S_k$ is an element that corresponds to the first subcarrier k and that is prestored by the second device, and $S_{-k}$ is an element that corresponds to the second subcarrier −k and that is prestored by the second device.

For each other pair of subcarriers in the at least one pair of subcarriers, an operation of this step is performed on each other pair of subcarriers, so that a channel on which interference is canceled on a first subcarrier included in each pair of subcarriers and a channel on which interference is canceled on a second subcarrier included in the pair of subcarriers can be measured.

A relationship shown in Formula (20) is obtained according to the following principle:

For a first subcarrier k and a second subcarrier −k that are included in any pair of subcarriers and the first group of elements and the second group of elements in the packet sent by the first device, the second device prestores an element $S_k$ corresponding to the first subcarrier k and an element $S_{-k}$ corresponding to the second subcarrier −k that are in the first group of elements, and prestores an element $S_k$ corresponding to the first subcarrier k and an element $-S_{-k}$ corresponding to the second subcarrier −k that are included in the second group of elements.

The elements (two $S_{-k}$) sent on the first subcarrier k and the elements ($S_k$ and $-S_{-k}$) sent on the second subcarrier −k by the first device, and the two elements ($R_{k(LTF1)}$ and $R_{k(LTF2)}$) corresponding to the first subcarrier k and the two elements ($R_{-k(LTF1)}$ and $R_{-k\ (LTF2)}$) corresponding to the second subcarrier −k in the packet received by the second device meet a relationship shown in Formula (21):

$$\begin{bmatrix} R_{k(LTF1)} & R_{k(LTF2)} \\ R^*_{-k(LTF1)} & R^*_{-k(LTF2)} \end{bmatrix} = H \begin{bmatrix} S_k & S_k \\ S^*_{-k} & -S^*_{-k} \end{bmatrix} \quad (21)$$

In Formula (21), $R^*_{-k(LTF1)}$ is a conjugate signal of the element $R_{-k(LTF1)}$, and $S^*_{-k}$ is a conjugate signal of the element $S_{-k}$.

H represents an interference signal existing in the packet received by the second device, and may be shown in Formula (22):

$$H = \begin{bmatrix} 1 & \xi_{r,-k} \\ \xi^*_{r,k} & 1 \end{bmatrix} \begin{bmatrix} H_k & 0 \\ 0 & H^*_{-k} \end{bmatrix} \begin{bmatrix} 1 & \xi_{t,-k} \\ \xi^*_{t,k} & 1 \end{bmatrix} = \\ \begin{bmatrix} H_k + \xi^*_{t,-k}\xi_{r,k}H^*_{-k} & \xi_{t,-k}H^*_{-k} + \xi^*_{r,k}H^*_{-k} \\ \xi^*_{t,-k}H^*_{-k} + \xi^*_{r,-k}H_k & \xi_{t,k}\xi^*_{r,-k}H_k + H^*_{-k} \end{bmatrix} \quad (22)$$

In Formula (22), $\xi^*_{t,k}$ is a conjugate signal of a first image interference signal generated on the first subcarrier k on the transmit channel of the first device, and $\xi_{r,-k}$ is a first image interference signal generated on the second subcarrier −k on the transmit channel of the first device. $\xi^*_{r,k}$ is a conjugate signal of a second image interference signal generated on the first subcarrier k on the receive channel of the second device, and $\xi_{r,-k}$ is a second image interference signal generated on the second subcarrier −k on the receive channel of the second device.

Based on Formula (21) and Formula (22), Formula (23) is deduced to represent a relationship:

$$\begin{bmatrix} R_{k(LTF1)} & R_{k(LTF2)} \\ R^*_{-k(LTF1)} & R^*_{-k(LTF2)} \end{bmatrix} = \begin{bmatrix} H_k + \xi^*_{t,-k}\xi_{r,k}H^*_{-k} & \xi_{t,-k}H^*_{-k} + \xi^*_{r,k}H^*_{-k} \\ \xi^*_{t,-k}H^*_{-k} + \xi^*_{r,-k}H_k & \xi_{t,k}\xi^*_{r,-k}H_k + H^*_{-k} \end{bmatrix} \\ \begin{bmatrix} S_k & S_k \\ S^*_{-k} & -S^*_{-k} \end{bmatrix} \quad (23)$$

Generally, the image interference signal ξ in Formula (23) is a relatively small value, and a product of two image interference signals is an excessively small value, and can be ignored. Therefore, Formula (23) is simplified as Formula (24):

$$\begin{bmatrix} R_{k(LTF1)} & R_{k(LTF2)} \\ R^*_{-k(LTF1)} & R^*_{-k(LTF2)} \end{bmatrix} = \begin{bmatrix} H_k & \xi_{t,-k}H^*_{-k} + \xi_{r,k}H^*_{-k} \\ \xi^*_{t,-k}H^*_{-k} + \xi^*_{r,-k}H_k & H^*_{-k} \end{bmatrix} \\ \begin{bmatrix} S_k & S_k \\ S^*_{-k} & -S^*_{-k} \end{bmatrix} \quad (24)$$

Then Formula (24) is decomposed into the following two systems of equations:

$$\begin{cases} R_{k(LTF1)} = H_k S_k + \xi_{t,k} H_k S^*_{-k} + \xi_{r,k} H^*_{-k} S^*_{-k} & (25) \\ R_{-k(LTF1)} = \xi_{t,-k} H_{-k} S^*_k + \xi_{r,-k} H^*_k S^*_k + H_{-k} S_{-k} & (26) \end{cases}$$

$$\begin{cases} R_{k(LTF2)} = H_k S_k - \xi_{t,k} H_k S^*_{-k} - \xi_{r,k} H^*_{-k} S^*_{-k} & (27) \\ R_{-k(LTF2)} = \xi_{t,-k} H_{-k} S^*_k + \xi_{r,-k} H^*_k S^*_k - H_{-k} S_{-k} & (28) \end{cases}$$

(25)+(27) and (26)−(28) in the two systems of equations are performed to obtain a system of equations shown in Formula (29):

$$\begin{cases} R_{k(LTF1)} + R_{k(LTF2)} = 2H_k S_k \\ R_{-k(LTF1)} - R_{-k(LTF2)} = 2H_{-k} S_{-k} \end{cases} \quad (29)$$

The relationship shown in Formula (20) may be obtained based on the system of equations shown in Formula (29).

In this embodiment of this application, for any pair of subcarriers, because an element that is in the first group of elements and that corresponds to one subcarrier in the pair of subcarriers is the same as an element that is in the second group of elements and that corresponds to the subcarrier, and a symbol of an element that is in the first group of elements and that corresponds to the other subcarrier in the pair of subcarriers is opposite to a symbol of an element that is in the second group of elements and that corresponds to the other subcarrier. Therefore, the first device generates the packet including the first group of elements and the second group of elements, and sends the packet to the second device. The second device may calculate, by using the first group of elements and the second group of elements, the channels on which interference is canceled on the at least one pair of subcarriers, and the calculation process may be implemented by using a computing resource such as a processor of the second device. Therefore, no hardware circuits need to be separately disposed in the first device and the second device to cancel interference on a channel, so that costs and power consumption of the devices are reduced. Because interference can be canceled, accuracy of calculating the channel by the second device can be further improved.

Figure 18:
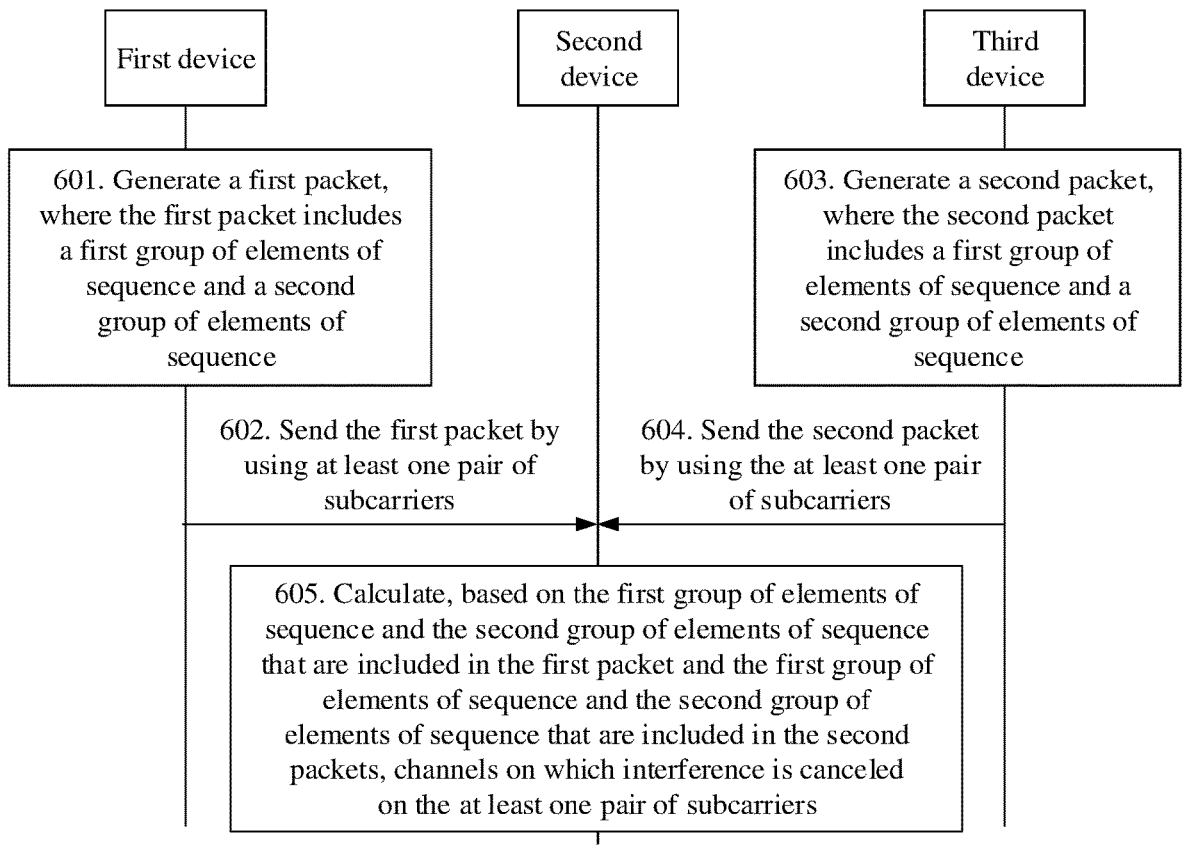
FIG. 18 is a flowchart of another interference cancellation method according to an embodiment of this application.

Referring to FIG. 18, an embodiment of this application provides an interference cancellation method. The method is applied to the network architectures shown in FIG. 1 to FIG. 3, and the network architecture includes one second device, at least one first device, and at least one third device. A first subcarrier and a second subcarrier that are included in each pair of subcarriers are symmetrical with respect to a direct current subcarrier. In the method, the second device may allocate, to the first device and the third device, subcarriers that are symmetrical with respect to the direct current subcarrier, to be specific, allocate the first subcarrier included in each pair of subcarriers to the at least one first device, and allocate the second subcarrier included in each pair of subcarriers to the at least one third device. Then the second device may measure a channel on which interference is canceled between the first device and the second device and a channel on which interference is canceled between the second device and the third device. The first device, the second device, and the third device may all work in an OFDMA mode. The first device and the third device may be terminal devices, and the second device may be a network side device. In the method, the first device may occupy a first subcarrier in at least one pair of subcarriers, and the third device occupies a second subcarrier in the at least one pair of subcarriers. The method procedure includes the following steps.

Step 601: The first device generates a first packet, where the first packet includes a first group of elements and a second group of elements.

For the first subcarrier k in the at least one pair of subcarriers, the first group of elements includes an element corresponding to the first subcarrier k, and the second group of elements includes an element corresponding to the first subcarrier k. The element that is in the first group of elements and that corresponds to the first subcarrier k is the same as the element that is in the second group of elements and that corresponds to the first subcarrier k.

In this step, the first device may obtain the first group of elements. The first group of elements includes the element corresponding to the first subcarrier k. The first device copies the element that is in the first group of elements and that corresponds to the first subcarrier k, to obtain the element that is in the second group of elements and that corresponds to the first subcarrier k.

For example, for a first subcarrier k included in any pair of subcarriers, the first group of elements obtained by the first device includes an element $S_k$ corresponding to the first subcarrier k, and the second group of elements generated by the first device based on the first group of elements includes an element $S_k$ corresponding to the first subcarrier k.

Step 602: The first device sends the first packet to the second device by using the first subcarrier included in each of the at least one pair of subcarriers.

The first device may send, on a transmit channel included in the first device, the first packet to the second device by using the first subcarrier included in each of the at least one pair of subcarriers.

Step 603: The third device generates a second packet, where the second packet includes a first group of elements and a second group of elements.

For the second subcarrier −k included in each of the at least one pair of subcarriers, the first group of elements includes an element corresponding to the second subcarrier −k, and the second group of elements includes an element corresponding to the second subcarrier −k. A symbol of the element that is in the first group of elements and that corresponds to the second subcarrier −k is opposite to a symbol of the element that is in the second group of elements and that corresponds to the second subcarrier −k.

In this step, the third device may obtain the first group of elements. The first group of elements includes the element corresponding to the second subcarrier −k. The third device obtains an element whose symbol is opposite to that of the element that is in the first group of elements and that corresponds to the second subcarrier −k, and uses the obtained element as the element that is in the second group of elements and that corresponds to the second subcarrier −k.

For example, for a second subcarrier −k included in any pair of subcarriers, the first group of elements obtained by the third device includes an element $S_{-k}$ corresponding to the second subcarrier −k. The second group of elements generated by the third device based on the first group of elements includes an element $-S_{-k}$ corresponding to the second subcarrier −k.

Step 604: The third device sends the second packet to the second device by using the second subcarrier included in each of the at least one pair of subcarriers.

The third device may send, on a transmit channel included in the third device, the second packet to the second device by using the second subcarrier included in each of the at least one pair of subcarriers.

Step 605: The second device receives the first packet and the second packet by using the at least one pair of subcarriers, and calculates, based on the first group of elements and the second group of elements that are included in the first packet and the first group of elements and the second group of elements that are included in the second packet, channels on which interference is canceled on the at least one pair of subcarriers.

The second device may receive, on a receive channel included in the second device, the first packet and the second packet by using the at least one pair of subcarriers.

For a first subcarrier k and a second subcarrier −k that are included in any pair of subcarriers, the first packet received by the second device includes a first group of elements and a second group of elements in which interference exists, the first group of elements in the first packet includes an element $R_k$ in which interference exists and that corresponds to the first subcarrier k, and the second group of elements in the first packet includes an element $R_{k'}$ in which interference exists and that corresponds to the first subcarrier k.

The second packet received by the second device includes a first group of elements and a second group of elements, the second group of elements in the second packet includes an element $R_{-k}$ in which interference exists and that corresponds to the second subcarrier −k and an element $R_{-k'}$ in which interference exists and that corresponds to the second subcarrier −k.

In this case, channels on which interference is canceled on the first subcarrier k and the second subcarrier −k are calculated based on the elements $R_k$ and $R_{k'}$ corresponding to the first subcarrier k and the elements $R_{-k}$ and $R_{-k'}$ corresponding to the second subcarrier −k and according to Formula (30):

$$\begin{cases} H_{1,k} = (R_k + R_{k'})/(2S_k) \\ H_{2,-k} = (R_k - R_{-k'})/(2S_{-k}) \end{cases} \quad (30)$$

In Formula (30), $H_{1,k}$ is a channel on which interference is canceled on the first subcarrier k, $H_{2,-k}$ is a channel on which interference is canceled on the second subcarrier −k, $S_k$ is an element that corresponds to the first subcarrier k and that is prestored by the second device, and $S_{-k}$ is an element that corresponds to the second subcarrier −k and that is prestored by the second device.

For each other pair of subcarriers in the at least one pair of subcarriers, an operation of this step is performed on each other pair of subcarriers, so that a channel on which interference is canceled on a first subcarrier included in each pair of subcarriers and a channel on which interference is canceled on a second subcarrier included in the pair of subcarriers can be measured.

A relationship shown in Formula (30) is obtained according to the following principle:

For a first subcarrier k and a second subcarrier −k that are included in any pair of subcarriers and the first group of elements and the second group of elements in the first packet sent by the first device, the second device prestores an element $S_k$ that is included in the first group of elements in the first packet and that corresponds to the first subcarrier k and an element $S_k$ that is included in the second group of elements in the first packet and that corresponds to the first subcarrier k. For the first group of elements and the second group of elements in the second packet sent by the third device, the second device prestores an element $S_{-k}$ that is included in the first group of elements in the second packet and that corresponds to the second subcarrier −k and an element $-S_{-k}$ that is included in the second group of elements in the second packet and that corresponds to the second subcarrier −k.

The elements (two $S_{-k}$) sent on the first subcarrier k by the first device, the elements $S_k$ and $-S_{-k}$ sent on the second subcarrier −k by the third device, the two elements ($R_k$ and $R_{k'}$) that are in the first packet received by the second device and that correspond to the first subcarrier k, and the two elements ($R_{-k}$ and $R_{-k'}$) that are in the second packet received by the second device and that corresponds to the second subcarrier −k meet a relationship shown in Formula (31):

$$\begin{bmatrix} R_k & R_{k'} \\ R^*_{-k} & R^*_{-k'} \end{bmatrix} = \begin{bmatrix} H_{1,k} + \xi^*_{1,t,k}\xi_{r,k}H^*_{1,-k} & \xi_{2,t,-k}H^*_{2,-k} + \xi^*_{r,k}H^*_{2,-k} \\ \xi^*_{1,t,-k}H^*_{1,-k} + \xi^*_{r,-k}H_{1,k} & \xi_{2,t,k}\xi^*_{r,-k}H_{2,k} + H^*_{2,-k} \end{bmatrix} \quad (31)$$

$$\begin{bmatrix} S_k & S_k \\ S^*_{-k} & -S^*_{-k} \end{bmatrix}$$

In Formula (31), $\xi^*_{1,t,k}$ is a conjugate signal of a first image interference signal generated on the first subcarrier k on the transmit channel of the first device, and $\xi^*_{1,t,-k}$ is a conjugate signal of a first image interference signal generated on the second subcarrier −k on the transmit channel of the first device. $\xi_{r,k}$ is a second image interference signal generated on the first subcarrier k on the receive channel of the second device, and $\xi^*_{r,-k}$ is a conjugate signal of a second image interference signal generated on the second subcarrier −k on the receive channel of the second device. $\xi_{2,t,-k}$ is a first image interference signal generated on the second subcarrier −k on the transmit channel of the third device, and $\xi_{2,t,k}$ is a first image interference signal generated on the first subcarrier k on the transmit channel of the third device. $H^*_{1,-k}$ is a conjugate signal of a spatial interference signal generated on the second subcarrier −k, and $H_{2,k}$ is a spatial interference signal generated on the first subcarrier k.

Generally, the image interference signal in the formula is a relatively small value, and a product of image interference signals is a smaller excessively small value, and can be ignored.

Therefore, Formula (31) is simplified as Formula (32):

$$\begin{bmatrix} R_k & R_{k'} \\ R^*_{-k} & R^*_{-k'} \end{bmatrix} = \begin{bmatrix} H_{1,k} & \xi_{2,t,k}H^*_{2,-k} + \xi_{r,k}H^*_{2,-k} \\ \xi^*_{1,t,-k}H^*_{1,-k} + \xi^*_{r,-k}H_{1,k} & H^*_{2,-k} \end{bmatrix} \quad (32)$$

$$\begin{bmatrix} S_k & S_k \\ S^*_{-k} & -S^*_{-k} \end{bmatrix}$$

Then Formula (32) is decomposed into the following two systems of equations:

$$\begin{cases} R_k = H_{1,k}S_k + \xi_{2,t,k}H_{2,k}S^*_{-k} + \xi_{r,k}H^*_{2,-k}S^*_{-k} & (33) \\ R_{-k} = \xi_{1,t,-k}H_{1,-k}S^*_k + \xi_{r,-k}H^*_{1,k}S^*_k + H_{2,-k}S_{-k} & (34) \end{cases}$$

$$\begin{cases} R_{k'} = H_{1,k}S_k - \xi_{2,t,k}H_{2,k}S^*_{-k} - \xi_{r,k}H^*_{2,-k}S^*_{-k} & (35) \\ R_{-k'} = \xi_{1,t,-k}H_{1,-k}S^*_k + \xi_{r,-k}H^*_{1,k}S^*_k - H_{2,-k}S_{-k} & (36) \end{cases}$$

(33)+(35) and (34)−(36) in the two systems of equations are performed to obtain a system of equations shown in Formula (37):

$$\begin{cases} R_k + R_{k'} = 2H_{1,k}S_k \\ R_{-k} - R_{-k'} = 2H_{2,-k}S_{-k} \end{cases} \quad (37)$$

The relationship shown in Formula (30) may be obtained based on the system of equations shown in Formula (37).

In this embodiment of this application, the first device generates the first packet, where the first group of elements in the first packet includes the element corresponding to the first subcarrier in each pair of subcarriers, and the second group of elements in the first packet includes the element corresponding to the first subcarrier, and sends the first packet to the second device. The third device generates the second packet, where the first group of elements in the second packet includes the element corresponding to the second subcarrier in each pair of subcarriers, and the second group of elements in the second packet includes the element corresponding to the second subcarrier, and sends the second packet to the second device. In this case, the second device may calculate, by using the first group of elements and the second group of elements in the first packet and the first group of elements and the second group of elements in the second packet, the channels on which interference is canceled on the at least one pair of subcarriers, and the calculation process may be implemented by using a computing resource such as a processor of the second device. Therefore, no hardware circuits need to be separately disposed in the first device, the second device, and the third device to cancel interference on a channel, so that costs and power consumption of the devices are reduced. Because interference can be canceled, accuracy of calculating the channel by the second device can be further improved.

Figure 19:
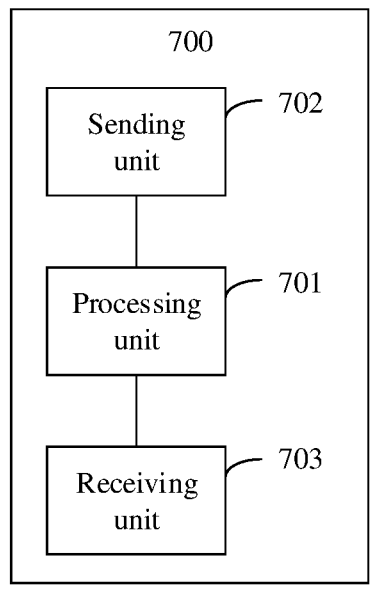
FIG. 19 is a schematic diagram of a structure of an interference cancellation apparatus according to an embodiment of this application.

Referring to FIG. 19, an embodiment of this application provides an interference cancellation apparatus 700. The apparatus 700 may be deployed on the first device in the foregoing embodiment shown in FIG. 9, FIG. 10, FIG. 11, or FIG. 12. The apparatus 700 includes:

a processing unit 701, configured to generate a first packet, where the first packet includes a first group of elements, a second group of elements, and user data, and the first group of elements is different from the second group of elements; and a sending unit 702, configured to send the first packet to a second device by using at least one pair of subcarriers, where two subcarriers in one pair of subcarriers are symmetrical with respect to a direct current subcarrier, and the first packet is used by the second device to cancel interference in the user data based on the first group of elements and the second group of elements.

Optionally, there are a plurality of second devices, and the processing unit 701 is configured to:

obtain a joint interference cancellation coefficient of the at least one pair of subcarriers;

for any one of the plurality of second devices, perform, based on the joint interference cancellation coefficient, spatial mapping on a first group of elements, a second group of elements, and user data that are to be sent to the any second device; and generate a first packet to be sent to the any second device, where the first packet includes the first group of elements, the second group of elements, and the user data that are obtained after the spatial mapping.

Optionally, the processing unit 701 is configured to:

obtain a spatial mapping matrix based on the joint interference cancellation coefficient; and perform, based on the spatial mapping matrix, spatial mapping on the first group of elements, the second group of elements, and the user data that are to be sent to the any second device.

Optionally, the joint interference cancellation coefficient includes an interference cancellation coefficient between the apparatus 700 and each second device, and the apparatus 700 further includes a receiving unit 703;

the processing unit 701 is configured to generate a second packet, where the second packet includes a third group of elements and a fourth group of elements, and the third group of elements is different from the fourth group of elements;

the sending unit 702 is further configured to send the second packet to each second device by using the at least one pair of subcarriers, where the second packet is used to indicate each second device to obtain an interference cancellation coefficient between the second device and the apparatus 700 based on the third group of elements and the fourth group of elements; and the receiving unit 703 is configured to receive the interference cancellation coefficient that is sent by each second device and that is between the second device and the apparatus 700.

Optionally, the processing unit 701 is configured to:

measure a joint channel between the apparatus 700 and the plurality of second devices; and obtain the joint interference cancellation coefficient of the at least one pair of subcarriers based on the joint channel.

Optionally, the receiving unit 703 is configured to: for any one of the plurality of second devices, receive, by using the at least one pair of subcarriers, a third packet sent by the any second device, where the third packet includes a third group of elements and a fourth group of elements; and the processing unit 701 is further configured to determine the joint channel between the apparatus 700 and the plurality of second devices based on the third group of elements and the fourth group of elements that are included in the third packet sent by each of the plurality of second devices.

Optionally, for a first subcarrier and a second subcarrier that are included in any one of the at least one pair of subcarriers, a matrix including at least one element that is in the first group of elements and that corresponds to the first subcarrier, at least one element that is in the first group of elements and that corresponds to the second subcarrier, at least one element that is in the second group of elements and that corresponds to the first subcarrier, and at least one element that is in the second group of elements and that corresponds to the second subcarrier has an inverse matrix.

Optionally, the at least one element that is in the first group of elements and that corresponds to the first subcarrier is the same as or different from the at least one element that is in the second group of elements and that corresponds to the first subcarrier; and the at least one element that is in the first group of elements and that corresponds to the second subcarrier is different from the at least one element that is in the second group of elements and that corresponds to the second subcarrier.

Optionally, a symbol of the at least one element that is in the first group of elements and that corresponds to the first subcarrier is opposite to a symbol of the at least one element that is in the second group of elements and that corresponds to the first subcarrier; and/or a symbol of the at least one element that is in the first group of elements and that corresponds to the second subcarrier is opposite to a symbol of the at least one element that is in the second group of elements and that corresponds to the second subcarrier.

In this embodiment of this application, the processing unit generates the first packet. The first packet includes the first group of elements, the second group of elements, and the user data, and the first group of elements is different from the second group of elements. The sending unit sends the first packet to the second device by using the at least one pair of subcarriers. Two subcarriers in one pair of subcarriers are symmetrical with respect to the direct current subcarrier, and the first packet is used to indicate the second device to cancel the interference in the user data based on the first group of elements and the second group of elements. Because the first packet includes the first group of elements and the second group of elements, after receiving the first packet, the second device performs interference cancellation on the user data in the first packet based on the first group of elements and the second group of elements in the first packet. Therefore, hardware circuits configured to cancel interference may not need to be disposed in the apparatus and the second device, so that costs and power consumption of the device can be reduced.

Figure 20:
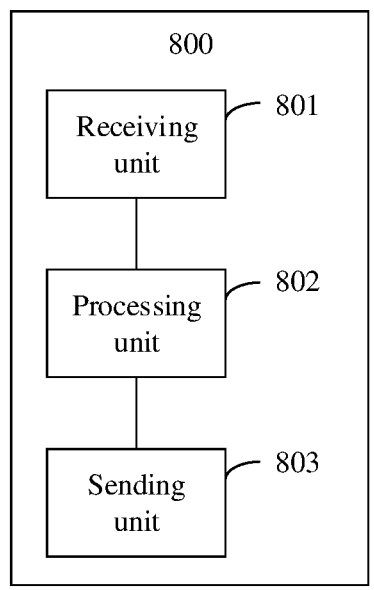
FIG. 20 is a schematic diagram of a structure of another interference cancellation apparatus according to an embodiment of this application.

Referring to FIG. 20, an embodiment of this application provides an interference cancellation apparatus. The apparatus 800 may be deployed on the second device in the foregoing embodiment shown in FIG. 9, FIG. 10, FIG. 11, or FIG. 12. The apparatus 800 includes:

a receiving unit 801, configured to receive, by using at least one pair of subcarriers, a first packet sent by a first device, where the first packet includes a first group of elements, a second group of elements, and user data, and two subcarriers in one pair of subcarriers are symmetrical with respect to a direct current subcarrier; and a processing unit 802, configured to perform interference cancellation on the user data based on the first group of elements and the second group of elements.

Optionally, the apparatus 800 further includes a sending unit 803;

the receiving unit 801 is further configured to receive, by using the at least one pair of subcarriers, a second packet sent by the first device, where the second packet includes a third group of elements and a fourth group of elements;

the processing unit 802 is further configured to determine an interference cancellation coefficient between the apparatus and the first device based on the third group of elements and the fourth group of elements; and the sending unit 803 is configured to send the interference cancellation coefficient to the first device.

Optionally, the sending unit is configured to send a third packet to the first device by using the at least one pair of subcarriers. The third packet includes a third group of elements and a fourth group of elements, and the third group of elements is different from the fourth group of elements.

In this embodiment of this application, the receiving unit receives, by using the at least one pair of subcarriers, the first packet sent by the first device. The first packet includes the first group of elements, the second group of elements, and the user data, and two subcarriers in one pair of subcarriers are symmetrical with respect to the direct current subcarrier. The processing unit performs interference cancellation on the user data based on the first group of elements and the second group of elements. Because the first packet includes the first group of elements and the second group of elements, after the receiving unit receives the first packet, the processing unit performs interference cancellation on the user data in the first packet based on the first group of elements and the second group of elements in the first packet. Therefore, a hardware circuit configured to cancel interference may not need to be disposed, so that costs and power consumption of the device can be reduced.

Figure 21:
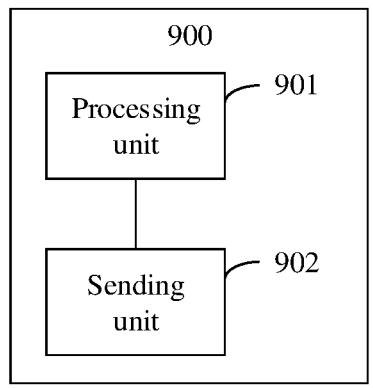
FIG. 21 is a schematic diagram of a structure of another interference cancellation apparatus according to an embodiment of this application.

Referring to FIG. 21, an embodiment of this application provides an interference cancellation apparatus 900. The apparatus 900 may be deployed on the first device in the foregoing embodiment shown in FIG. 13 or FIG. 18. The apparatus 900 includes:
- a processing unit 901, configured to generate a packet, where the packet includes a first group of elements and a second group of elements of at least one pair of subcarriers, two subcarriers in one pair of subcarriers are symmetrical with respect to a direct current subcarrier, an element that is in the first group of elements and that corresponds to one subcarrier in the pair of subcarriers is the same as an element that is in the second group of elements and that corresponds to the subcarrier, and a symbol of an element that is in the first group of elements and that corresponds to the other subcarrier in the pair of subcarriers is opposite to a symbol of an element that is in the second group of elements and that corresponds to the other subcarrier; and
- a sending unit 902, configured to send the packet to a second device by using the at least one pair of subcarriers, where the packet is used to indicate the second device to calculate channels on which interference is canceled on the at least one pair of subcarriers.

In this embodiment of this application, the processing unit generates the packet. The packet includes the first group of elements and the second group of elements of the at least one pair of subcarriers. Because in the packet, an element that is in the first group of elements and that corresponds to one subcarrier in one pair of subcarriers is the same as an element that is in the second group of elements and that corresponds to the subcarrier, and a symbol of an element that is in the first group of elements and that corresponds to the other subcarrier in the pair of subcarriers is opposite to a symbol of an element that is in the second group of elements and that corresponds to the other subcarrier, after receiving the packet, the second device may calculate, by using the first group of elements and the second group of elements that are included in the packet, the channels on which interference is canceled on the at least one pair of subcarriers, and the calculation process may be implemented by using a computing resource such as a processor of the device. Therefore, no hardware circuit needs to be separately disposed in the device to cancel interference on a channel, so that costs and power consumption of the device are reduced.

Figure 22:
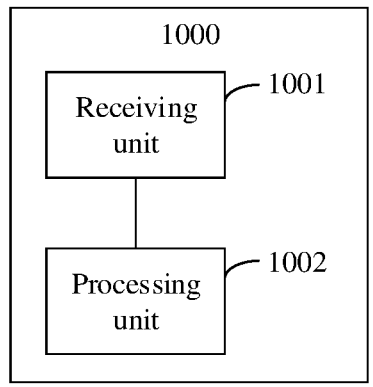
FIG. 22 is a schematic diagram of a structure of another interference cancellation apparatus according to an embodiment of this application.

Referring to FIG. 22, an embodiment of this application provides an interference cancellation apparatus 1000. The apparatus 1000 may be deployed on the second device in the foregoing embodiment shown in FIG. 13 or FIG. 18. The apparatus 1000 includes:
- a receiving unit 1001, configured to receive a packet by using at least one pair of subcarriers, where the packet includes a first group of elements and a second group of elements, and two subcarriers in one pair of subcarriers are symmetrical with respect to a direct current subcarrier; and
- a processing unit 1002, configured to calculate, based on the first group of elements and the second group of elements, channels on which interference is canceled on the at least one pair of subcarriers.

Optionally, the processing unit 1002 is configured to: for any one of the at least one pair of subcarriers, calculate, according to the following formula, a channel $H_k$ on which interference is canceled on a first subcarrier included in the any pair of subcarriers and a channel $H_{-k}$ on which interference is canceled on a second subcarrier included in the any pair of subcarriers:

$$\begin{cases} H_k = (R_{k(LTF1)} + R_{k(LTF2)})/(2S_k) \\ H_{-k} = (R_{-k(LTF1)} - R_{-k(LTF2)})/(2S_{-k}) \end{cases}$$

k represents the first subcarrier, −k represents the second subcarrier, $S_k$ represents a locally prestored element corresponding to the first subcarrier, $S_{-k}$ represents a locally prestored element corresponding to the second subcarrier, $R_{k(LTF1)}$ represents an element that is in the first group of elements and that corresponds to the first subcarrier, $R_{k(LTF2)}$ represents an element that is in the second group of elements and that corresponds to the first subcarrier, $R_{-k(LTF1)}$ represents an element that is in the first group of elements and that corresponds to the second subcarrier, and $R_{-k\ (LTF2)}$ represents an element that is in the second group of elements and that corresponds to the second subcarrier.

Optionally, the receiving unit 1001 is configured to: receive, by using the at least one pair of subcarriers, a first packet sent by a first device and a second packet sent by a third device. The first packet includes one half of the first group of elements and one half of the second group of elements, the second packet includes the other half of the first group of elements and the other half of the second group of elements, the first device occupies one subcarrier in each pair of subcarriers, and the third device occupies the other subcarrier in each pair of subcarriers.

Optionally, the processing unit 1002 is further configured to: allocate, to the first device and the third device, subcarriers that are symmetrical with respect to the direct current subcarrier.

In this embodiment of this application, the receiving unit receives the packet by using the at least one pair of subcarriers. The packet includes the first group of elements and the second group of elements, and two subcarriers in one pair of subcarriers are symmetrical with respect to the direct current subcarrier. The processing unit calculates, based on the first group of elements and the second group of elements, the channels on which interference is canceled on the at least one pair of subcarriers. Because the processing unit may calculate, by using the first group of elements and the second group of elements, the channels on which interference is canceled on the at least one pair of subcarriers, no hardware circuit needs to be separately disposed in the apparatus to cancel interference on a channel, so that costs and power consumption of the apparatus are reduced.

Figure 23:
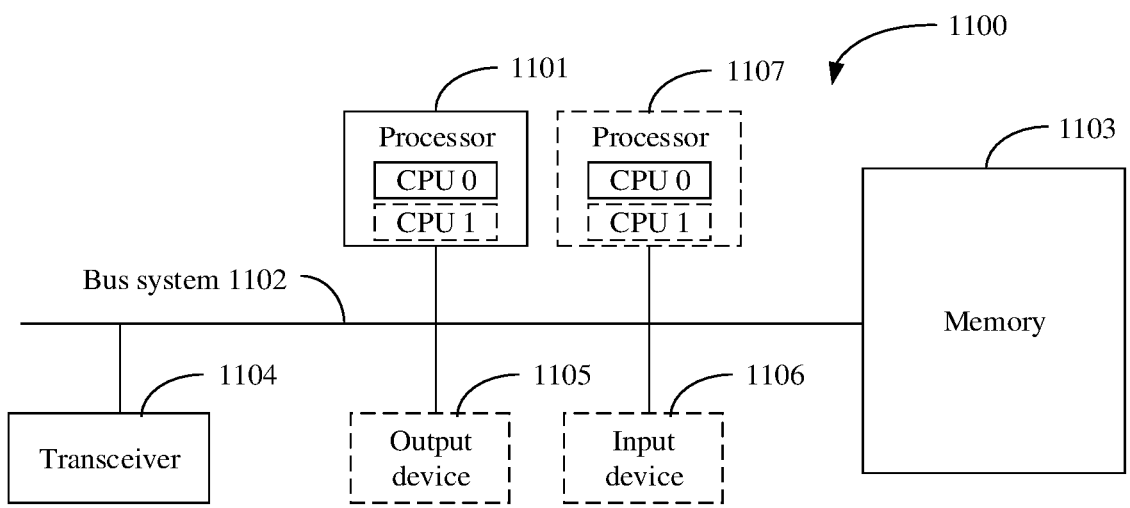
FIG. 23 is a schematic diagram of a structure of another interference cancellation apparatus according to an embodiment of this application.

FIG. 23 is a schematic diagram of an interference cancellation apparatus 1100 according to an embodiment of this application. The apparatus 1100 includes at least one processor 1101, a bus system 1102, a memory 1103, and at least one transceiver 1104.

The apparatus 1100 is an apparatus of a hardware structure, and may be configured to implement the function modules in the apparatus 700 shown in FIG. 19. For example, a person skilled in the art may be aware that the processing unit 701 in the apparatus 700 shown in FIG. 19 may be implemented by using the at least one processor 1101 by invoking code in the memory 1103, and the sending unit 702 and the receiving unit 703 in the apparatus 700 shown in FIG. 19 may be implemented by using the transceiver 1104.

Optionally, the apparatus 1100 may be further configured to implement functions of the first device in any one of the foregoing embodiments.

Optionally, the processor 1101 may be a general-purpose central processing unit (CPU), a microprocessor, an application-specific integrated circuit (ASIC), or one or more integrated circuits configured to control program execution in the solutions of this application.

The bus system 1102 may include a path for transmitting information between the foregoing components.

The transceiver 1104 is configured to communicate with another device or a communications network.

The memory 1103 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital versatile disc, a Blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may independently exist, and connect to the processor by using the bus. Alternatively, the memory and the processor may be integrated.

The memory 1103 is configured to store application program code for executing the solutions in this application, and the processor 1101 controls the execution. The processor 1101 is configured to execute the application program code stored in the memory 1103, to implement a function in the method in the patent.

During specific implementation, in an embodiment, the processor 1101 may include one or more CPUs, for example, a CPU 0 and a CPU 1 in FIG. 23.

During specific implementation, in an embodiment, the apparatus 1100 may include a plurality of processors, for example, the processor 1101 and a processor 1107 in FIG. 23. Each of these processors may be a single-core (single-CPU) processor or a multi-core (multi-CPU) processor. The processor herein may be one or more devices, circuits and/or processing cores configured to process data (for example, a computer program instruction).

During specific implementation, in an embodiment, the apparatus 1100 may further include an output device 1105 and an input device 1106. The output device 1105 communicates with the processor 1101, and may display information in a plurality of manners. For example, the output device 1105 may be a liquid crystal display (LCD), or the like. The input device 1106 communicates with the processor 1101, and may receive an input of a user in a plurality of manners. For example, the input device 1106 may be a touchscreen device or a sensor device.

Figure 24:
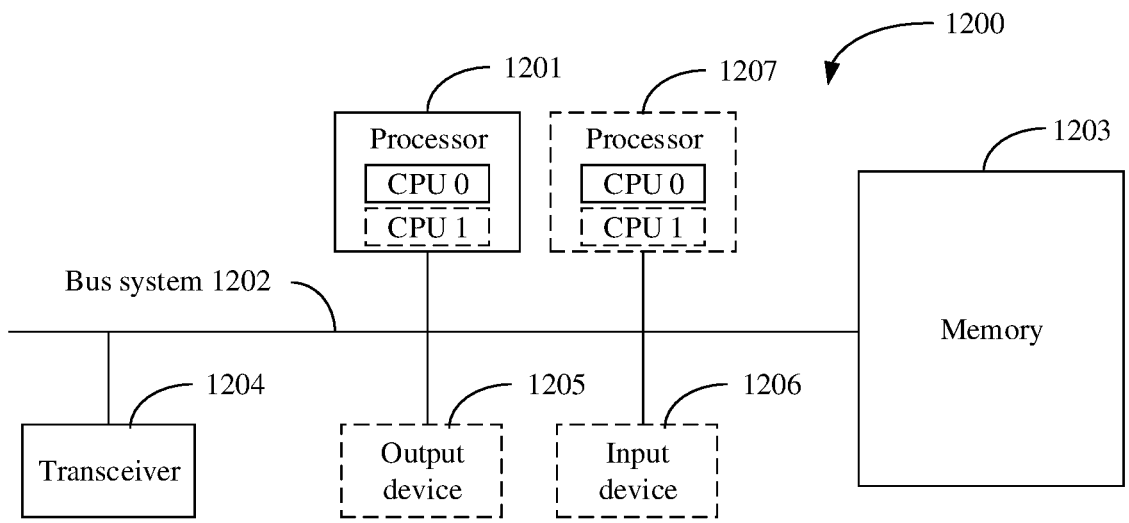
FIG. 24 is a schematic diagram of a structure of another interference cancellation apparatus according to an embodiment of this application.

FIG. 24 is a schematic diagram of an interference cancellation apparatus 1200 according to an embodiment of this application. The apparatus 1200 includes at least one processor 1201, a bus system 1202, a memory 1203, and at least one transceiver 1204.

The apparatus 1200 is an apparatus of a hardware structure, and may be configured to implement the function modules in the apparatus 800 shown in FIG. 20. For example, a person skilled in the art may be aware that the processing unit 802 in the apparatus 800 shown in FIG. 20 may be implemented by using the at least one processor 1201 by invoking code in the memory 1203, and the receiving unit 801 and the sending unit 803 in the apparatus 800 shown in FIG. 20 may be implemented by using the transceiver 1204.

Optionally, the apparatus 1200 may be further configured to implement functions of the second device in any one of the foregoing embodiments.

Optionally, the processor 1201 may be a general-purpose central processing unit (CPU), a microprocessor, an application-specific integrated circuit (ASIC), or one or more integrated circuits configured to control program execution in the solutions of this application.

The bus system 1202 may include a path for transmitting information between the foregoing components.

The transceiver 1204 is configured to communicate with another device or a communications network.

The memory 1203 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital versatile disc, a Blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may independently exist, and connect to the processor by using the bus. Alternatively, the memory and the processor may be integrated.

The memory 1203 is configured to store application program code for performing the solutions of this application, and the processor 1201 controls the execution. The processor 1201 is configured to execute the application program code stored in the memory 1203, to implement a function in the method in this patent.

During specific implementation, in an embodiment, the processor 1201 may include one or more CPUs, for example, a CPU 0 and a CPU 1 in FIG. 23.

During specific implementation, in an embodiment, the apparatus 1200 may include a plurality of processors, for example, the processor 1201 and a processor 1207 in FIG. 24. Each of these processors may be a single-core (single-CPU) processor or a multi-core (multi-CPU) processor. The processor herein may be one or more devices, circuits and/or processing cores configured to process data (for example, a computer program instruction).

During specific implementation, in an embodiment, the apparatus 1200 may further include an output device 1205 and an input device 1206. The output device 1205 communicates with the processor 1201, and may display information in a plurality of manners. For example, the output device 1205 may be a liquid crystal display (LCD), or the like. The input device 1206 communicates with the processor 1201 and may receive a user input in a plurality of manners. For example, the input device 1206 may be a touchscreen device or a sensor device.

Figure 25:
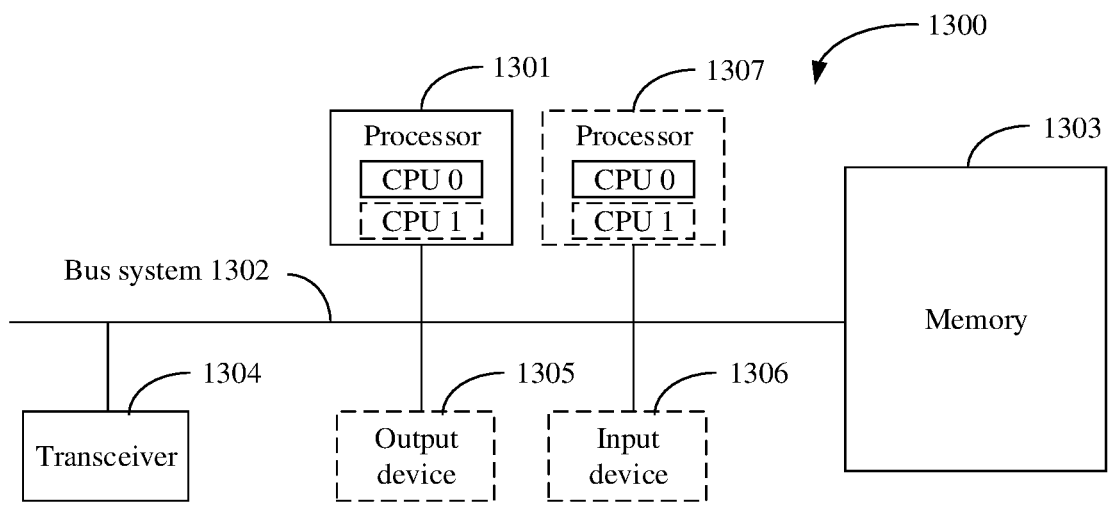
FIG. 25 is a schematic diagram of a structure of another interference cancellation apparatus according to an embodiment of this application.

FIG. 25 is a schematic diagram of an interference cancellation apparatus 1300 according to an embodiment of this application. The apparatus 1300 includes at least one processor 1301, a bus system 1302, a memory 1303, and at least one transceiver 1304.

The apparatus 1300 is an apparatus of a hardware structure, and may be configured to implement the function modules in the apparatus 900 shown in FIG. 21. For example, a person skilled in the art may be aware that the processing unit 901 in the apparatus 900 shown in FIG. 21 may be implemented by using the at least one processor 1301 by invoking code in the memory 1303, and the sending unit 902 in the apparatus 900 shown in FIG. 21 may be implemented by using the transceiver 1304.

Optionally, the apparatus 1300 may be further configured to implement functions of the first device in any one of the foregoing embodiments.

Optionally, the processor 1301 may be a general-purpose central processing unit (CPU), a microprocessor, an application-specific integrated circuit (ASIC), or one or more integrated circuits for controlling program execution of the solutions of this application.

The bus system 1302 may include a path for transmitting information between the foregoing components.

The transceiver 1304 is configured to communicate with another device or a communications network.

The memory 1303 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may independently exist, and connect to the processor by using the bus. Alternatively, the memory and the processor may be integrated.

The memory 1303 is configured to store application code for executing the solutions in this application, and the processor 1301 controls the execution. The processor 1301 is configured to execute the application program code stored in the memory 1303, to implement a function in the method in this patent.

During specific implementation, in an embodiment, the processor 1301 may include one or more CPUs, for example, a CPU 0 and a CPU 1 in FIG. 24.

During specific implementation, in an embodiment, the apparatus 1300 may include a plurality of processors, for example, the processor 1301 and a processor 1307 in FIG. 25. Each of these processors may be a single-core (single-CPU) processor or a multi-core (multi-CPU) processor. The processor herein may be one or more devices, circuits and/or processing cores configured to process data (for example, a computer program instruction).

During specific implementation, in an embodiment, the apparatus 1300 may further include an output device 1305 and an input device 1306. The output device 1305 communicates with the processor 1301, and may display information in a plurality of manners. For example, the output device 1305 may be a liquid crystal display (LCD), or the like. The input device 1306 communicates with the processor 1301, and may receive user input in a plurality of manners. For example, the input device 1306 may be a touchscreen device or a sensor device.

Figure 26:
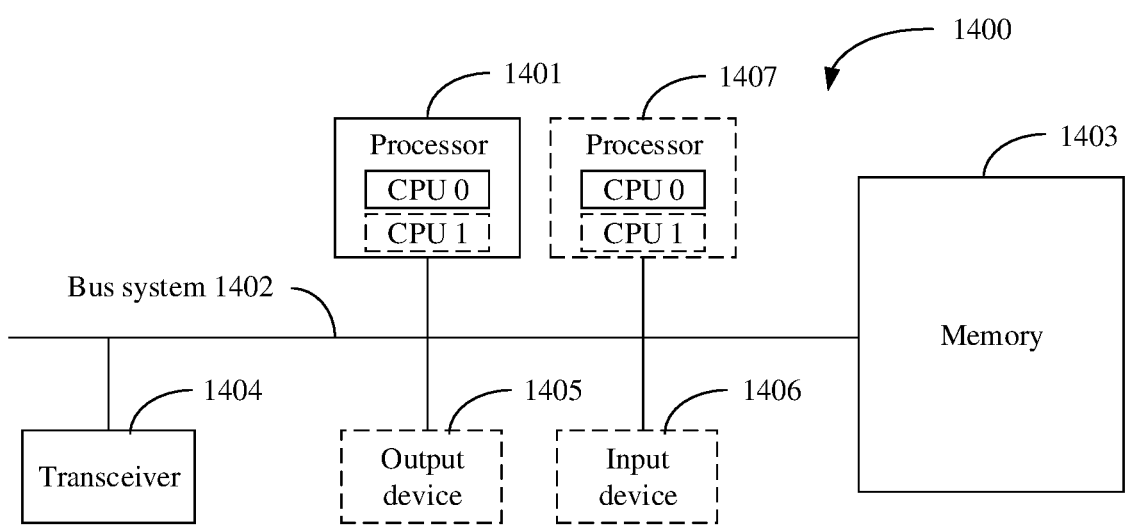
FIG. 26 is a schematic diagram of a structure of another interference cancellation apparatus according to an embodiment of this application.

FIG. 26 is a schematic diagram of an interference cancellation apparatus 1400 according to an embodiment of this application. The apparatus 1400 includes at least one processor 1401, a bus system 1402, a memory 1403, and at least one transceiver 1404.

The apparatus 1400 is an apparatus of a hardware structure, and may be configured to implement the function modules in the apparatus woo shown in FIG. 22. For example, a person skilled in the art may be aware that the processing unit 1002 in the apparatus moo shown in FIG. 22 may be implemented by using the at least one processor 1401 by invoking code in the memory 1403, and the receiving unit low in the apparatus woo shown in FIG. 22 may be implemented by using the transceiver 1404.

Optionally, the apparatus 1400 may be further configured to implement functions of the second device in any one of the foregoing embodiments.

Optionally, the processor 1401 may be a general-purpose central processing unit (CPU), a microprocessor, an application-specific integrated circuit (ASIC), or one or more integrated circuits for controlling program execution of the solutions of this application.

The bus system 1402 may include a path for transmitting information between the foregoing components.

The transceiver 1404 is configured to communicate with another device or a communications network.

The memory 1403 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may independently exist, and connect to the processor by using the bus. Alternatively, the memory and the processor may be integrated.

The memory 1403 is configured to store application code for executing the solutions of this application, and the execution is controlled by the processor 1401. The processor 1401 is configured to execute the application code stored in the memory 1403, to implement functions in the method in this patent.

During specific implementation, in an embodiment, the processor 1401 may include one or more CPUs, for example, a CPU 0 and a CPU 1 in FIG. 25.

During specific implementation, in an embodiment, the apparatus 1400 may include a plurality of processors, for example, the processor 1401 and a processor 1407 in FIG. 26. Each of these processors may be a single-core (single-CPU) processor or a multi-core (multi-CPU) processor. The processor herein may be one or more devices, circuits and/or processing cores configured to process data (for example, a computer program instruction).

During specific implementation, in an embodiment, the apparatus 1400 may further include an output device 1405 and an input device 1406. The output device 1405 communicates with the processor 1401, and may display information in a plurality of manners. For example, the output device 1405 may be a liquid crystal display (LCD), or the like. The input device 1406 communicates with the processor 1401, and may receive an input of a user in a plurality of manners. For example, the input device 1406 may be a touchscreen device or a sensor device.

The foregoing descriptions are merely an embodiment of this application, but are not intended to limit this application. Any modification, equivalent replacement, or improvement made without departing from the principle of this application should fall within the protection scope of this application.

What is claimed is:

1. An interference cancellation method, the method comprising:
   generating, by a first device, a first packet, wherein the first packet comprises a first group of elements, a second group of elements, and user data, the first group of elements being different from the second group of elements; and
   sending, by the first device, the first packet to a second device by using at least one pair of subcarriers, wherein two subcarriers in the at least one pair of subcarriers are symmetrical with respect to a direct current subcarrier, and wherein the first packet is usable by the second device to cancel interference in the user data based on the first group of elements and the second group of elements,
   wherein there are a plurality of second devices, and
   wherein generating the first packet comprises:
      obtaining a joint interference cancellation coefficient of the at least one pair of subcarriers,
      for any one of the plurality of second devices, performing, based on the joint interference cancellation coefficient, spatial mapping on a first group of elements, a second group of elements, and user data that are to be sent to any of the second devices, and
      generating a first packet to be sent to any of the second devices, wherein the first packet comprises the first group of elements, the second group of elements, and the user data that are obtained after the spatial mapping.

2. The method according to claim 1, wherein performing, based on the joint interference cancellation coefficient, spatial mapping on the first group of elements, the second group of elements, and the user data that are to be sent to any of the second devices comprises:
   obtaining a spatial mapping matrix based on the joint interference cancellation coefficient, and
   performing, based on the spatial mapping matrix, spatial mapping on the first group of elements, the second group of elements, and the user data that are to be sent to any of the second devices.

3. The method according to claim 1,
   wherein the joint interference cancellation coefficient comprises an interference cancellation coefficient between the first device and each second device, and
   wherein obtaining the joint interference cancellation coefficient of the at least one pair of subcarriers comprises:
      generating a second packet, wherein the second packet comprises a third group of elements and a fourth group of elements, the third group of elements being different from the fourth group of elements,
      sending the second packet to each second device by using the at least one pair of subcarriers, wherein the second packet is usable to indicate to each second device to obtain the interference cancellation coefficient between the second device and the first device based on the third group of elements and the fourth group of elements, and
      receiving the interference cancellation coefficient from each second device, the interference cancellation coefficient being between the second device and the first device.

4. The method according to claim 1, wherein obtaining the joint interference cancellation coefficient of the at least one pair of subcarriers comprises:
   measuring a joint channel between the first device and the plurality of second devices, and
   obtaining the joint interference cancellation coefficient of the at least one pair of subcarriers based on the joint channel.

5. The method according to claim 4, wherein measuring the joint channel between the first device and the plurality of second devices comprises:
   for any one of the plurality of second devices, receiving, by using the at least one pair of subcarriers, a third packet from any of the second devices, wherein the third packet comprises a third group of elements and a fourth group of elements, and
   determining the joint channel between the first device and the plurality of second devices based on the third group of elements and the fourth group of elements that are included in the third packet received from each of the plurality of second devices.

6. The method according to claim 1, wherein, for a first subcarrier and a second subcarrier that are included in any one of the at least one pair of subcarriers, a matrix comprising, at least one element that is in the first group of elements and that corresponds to the first subcarrier, at least one element that is in the first group of elements and that corresponds to the second subcarrier, at least one element that is in the second group of elements and that corresponds to the first subcarrier, and at least one element that is in the second group of elements and that corresponds to the second subcarrier, includes an inverse matrix.

7. The method according to claim 6,
   wherein the at least one element that is in the first group of elements and that corresponds to the first subcarrier is the same as or different from the at least one element that is in the second group of elements and that corresponds to the first subcarrier, and
   wherein the at least one element that is in the first group of elements and that corresponds to the second subcarrier is different from the at least one element that is in the second group of elements and that corresponds to the second subcarrier.

8. An interference cancellation method, the method comprising:
   receiving, by a second device by using at least one pair of subcarriers, a first packet from a first device, wherein the first packet comprises a first group of elements, a second group of elements, and user data, and wherein two subcarriers in one pair of subcarriers are symmetrical with respect to a direct current subcarrier;
   performing, by the second device, interference cancellation on the user data based on the first group of elements and the second group of elements; and
   before receiving the first packet from the first device:
      receiving, by using the at least one pair of subcarriers, a second packet from the first device, wherein the second packet comprises a third group of elements and a fourth group of elements;
      determining an interference cancellation coefficient between the second device and the first device based on the third group of elements and the fourth group of elements; and sending the interference cancellation coefficient to the first device.

9. An interference cancellation apparatus comprising:
a processor configured to generate a first packet, wherein the first packet comprises a first group of elements, a second group of elements, and user data, the first group of elements being different from the second group of elements; and
a sender configured to send the first packet to a second device by using at least one pair of subcarriers, wherein two subcarriers in the at least one pair of subcarriers are symmetrical with respect to a direct current subcarrier, and wherein the first packet is usable by the second device to cancel interference in the user data based on the first group of elements and the second group of elements,
wherein, for a first subcarrier and a second subcarrier that are included in any one of the at least one pair of subcarriers, a matrix, comprising at least one element that is in the first group of elements and that corresponds to the first subcarrier, at least one element that is in the first group of elements and that corresponds to the second subcarrier, at least one element that is in the second group of elements and that corresponds to the first subcarrier, and at least one element that is in the second group of elements and that corresponds to the second subcarrier, includes an inverse matrix.

10. The apparatus according to claim 9,
wherein there are a plurality of second devices, and
wherein the processor is configured to:
obtain a joint interference cancellation coefficient of the at least one pair of subcarriers,
for any one of the plurality of second devices, perform, based on the joint interference cancellation coefficient, spatial mapping on a first group of elements, a second group of elements, and user data that are to be sent to any of the second devices, and
generate a first packet to be sent to any of the second devices, wherein the first packet comprises the first group of elements, the second group of elements, and the user data that are obtained after the spatial mapping.

11. The apparatus according to claim 10, wherein the processor is configured to:
obtain a spatial mapping matrix based on the joint interference cancellation coefficient, and
perform, based on the spatial mapping matrix, spatial mapping on the first group of elements, the second group of elements, and the user data that are to be sent to any of the second devices.

12. The apparatus according to claim 10,
wherein the joint interference cancellation coefficient comprises an interference cancellation coefficient between the apparatus and each second device,
wherein the apparatus further comprises a receiver,
wherein the processor is configured to generate a second packet, the second packet comprising a third group of elements and a fourth group of elements, and the third group of elements being different from the fourth group of elements,
wherein the sender is further configured to send the second packet to each second device by using the at least one pair of subcarriers, the second packet being used to indicate to each second device to obtain the interference cancellation coefficient between the second device and the apparatus based on the third group of elements and the fourth group of elements, and
wherein the receiver is configured to receive the interference cancellation coefficient from each second device, the interference cancellation coefficient being between the second device and the apparatus.

13. The apparatus according to claim 10, wherein the processor is configured to:
measure a joint channel between the apparatus and the plurality of second devices; and
obtain the joint interference cancellation coefficient of the at least one pair of subcarriers based on the joint channel.

14. The apparatus according to claim 13, further comprising a receiver configured to, for any one of the plurality of second devices, receive, by using the at least one pair of subcarriers, a third packet from any of the second devices, wherein the third packet comprises a third group of elements and a fourth group of elements,
wherein the processor is further configured to determine the joint channel between the apparatus and the plurality of second devices based on the third group of elements and the fourth group of elements that are included in the third packet from each of the plurality of second devices.

15. The apparatus according to claim 9,
wherein the at least one element that is in the first group of elements and that corresponds to the first subcarrier is the same as or different from the at least one element that is in the second group of elements and that corresponds to the first subcarrier, and
wherein the at least one element that is in the first group of elements and that corresponds to the second subcarrier is different from the at least one element that is in the second group of elements and that corresponds to the second subcarrier.

16. An interference cancellation apparatus comprising:
a receiver configured to receive, by using at least one pair of subcarriers, a first packet from a first device, wherein the first packet comprises a first group of elements, a second group of elements, and user data, and two subcarriers in one pair of subcarriers are symmetrical with respect to a direct current subcarrier;
a processor configured to perform interference cancellation on the user data based on the first group of elements and the second group of elements; and
a sender,
wherein the receiver is further configured to receive, by using the at least one pair of subcarriers, a second packet from the first device, wherein the second packet comprises a third group of elements and a fourth group of elements,
wherein the processor is further configured to determine an interference cancellation coefficient between the apparatus and the first device based on the third group of elements and the fourth group of elements, and
wherein the sender is configured to send the interference cancellation coefficient to the first device.

* * * * *